(12) United States Patent
Block et al.

(10) Patent No.: US 12,105,724 B1
(45) Date of Patent: Oct. 1, 2024

(54) TOKENIZED HTTP EVENT COLLECTOR

(71) Applicant: Splunk Inc., San Francisco, CA (US)

(72) Inventors: Glenn Block, Seattle, WA (US); Patrick Lane Ogdin, Ann Arbor, MI (US)

(73) Assignee: Splunk Inc., San Francisco, CA (US)

( * ) Notice: Subject to any disclaimer, the term of this patent is extended or adjusted under 35 U.S.C. 154(b) by 348 days.

(21) Appl. No.: 17/225,900

(22) Filed: Apr. 8, 2021

Related U.S. Application Data

(63) Continuation of application No. 16/189,124, filed on Nov. 13, 2018, now Pat. No. 10,984,013, which is a continuation of application No. 15/011,651, filed on Jan. 31, 2016, now Pat. No. 10,169,434.

(51) Int. Cl.
*G06F 16/00* (2019.01)
*G06F 16/22* (2019.01)
*G06F 16/25* (2019.01)

(52) U.S. Cl.
CPC ........ *G06F 16/254* (2019.01); *G06F 16/2228* (2019.01)

(58) Field of Classification Search
CPC .......................... G06F 16/254; G06F 16/2228
USPC ........................................................ 707/602
See application file for complete search history.

(56) References Cited

U.S. PATENT DOCUMENTS

| | | |
|---|---|---|
| 5,796,952 A | 8/1998 | Davis et al. |
| 6,446,135 B1 | 9/2002 | Koppolu et al. |
| 7,653,742 B1 | 1/2010 | Bhargava et al. |
| 7,849,502 B1 | 12/2010 | Bloch et al. |
| 7,873,710 B2 | 1/2011 | Kiley et al. |
| 7,908,397 B1 | 3/2011 | Chen et al. |
| 7,937,344 B2 | 5/2011 | Baum et al. |
| 8,112,425 B2 | 2/2012 | Baum et al. |
| 8,682,925 B1 | 3/2014 | Marquardt et al. |
| 8,751,529 B2 | 6/2014 | Zhang et al. |
| 8,788,525 B2 | 7/2014 | Neels et al. |
| 9,026,674 B1 | 5/2015 | Kanna et al. |

(Continued)

OTHER PUBLICATIONS

Vaid, Workshop on Managing Systems via log Analysis and Machine Learning Techniques (SLAML '10),;login: vol. 36, No. 1, Oct. 3, 2010, Vancouver, BC, Canada.

(Continued)

*Primary Examiner* — Alexandria Y Bromell
(74) *Attorney, Agent, or Firm* — Knobbe, Martens, Olson & Bear, LLP

(57) ABSTRACT

A data intake and query system receives raw machine via an internet protocol (IP) such as the hypertext transfer protocol (HTTP). The system has configurable global settings for the received raw machine data that determine properties such as the metadata that is associated with raw machine data. Each event is associated with a token, which is also configurable and provides settings such as metadata settings for the raw machine data. The raw machine data is stored as events based on the metadata. Electronic devices that generate raw machine data may transmit the raw machine data to the data intake and query system within HTTP messages. The HTTP messages may also include settings such as metadata for the raw machine data. The raw machine data is stored as events based on the global metadata settings, token metadata settings, and HTTP message metadata settings.

20 Claims, 32 Drawing Sheets

(56) References Cited

U.S. PATENT DOCUMENTS

| | | | |
|---|---|---|---|
| 9,128,779 B1 | 9/2015 | Gladkikh et al. | |
| 9,215,240 B2 | 12/2015 | Merza et al. | |
| 9,286,413 B1 | 3/2016 | Coates et al. | |
| 9,397,861 B1 | 7/2016 | Tovino et al. | |
| 9,516,053 B1 | 12/2016 | Muddu et al. | |
| 9,596,150 B2 | 3/2017 | Kalus et al. | |
| 9,635,011 B1* | 4/2017 | Wu | H04L 63/0807 707/707 |
| 9,686,159 B2 | 6/2017 | Poe | |
| RE46,852 E | 5/2018 | Petrovykh | |
| 10,127,258 B2 | 11/2018 | Lamas et al. | |
| 10,169,651 B2 | 1/2019 | Block et al. | |
| 10,257,059 B2 | 4/2019 | Dickey | |
| 10,331,677 B1* | 6/2019 | Horowitz | G06F 16/22 707/707 |
| 10,534,791 B1 | 1/2020 | Block et al. | |
| 10,880,366 B1 | 12/2020 | Chen et al. | |
| 10,984,013 B1 | 4/2021 | Block et al. | |
| 11,093,476 B1 | 8/2021 | Neeman et al. | |
| 11,386,113 B2 | 7/2022 | Block et al. | |
| 2002/0048269 A1 | 4/2002 | Hong et al. | |
| 2002/0053033 A1 | 5/2002 | Cooper et al. | |
| 2002/0138566 A1 | 9/2002 | Leach et al. | |
| 2002/0138582 A1 | 9/2002 | Chandra et al. | |
| 2003/0217162 A1 | 11/2003 | Fu et al. | |
| 2003/0225924 A1 | 12/2003 | Jung et al. | |
| 2004/0044912 A1 | 3/2004 | Connary et al. | |
| 2004/0088423 A1 | 5/2004 | Miller et al. | |
| 2004/0181693 A1 | 9/2004 | Milliot et al. | |
| 2004/0186918 A1 | 9/2004 | Lonnfors et al. | |
| 2006/0036644 A1 | 2/2006 | Cheslow | |
| 2006/0036720 A1 | 2/2006 | Faulk, Jr. | |
| 2007/0064680 A1 | 3/2007 | Savchenko et al. | |
| 2007/0067383 A1 | 3/2007 | Savchenko et al. | |
| 2007/0067479 A1 | 3/2007 | Angelov | |
| 2007/0067494 A1 | 3/2007 | Savchenko et al. | |
| 2007/0074169 A1 | 3/2007 | Chess et al. | |
| 2007/0124577 A1 | 3/2007 | Nielsen et al. | |
| 2007/0094671 A1 | 4/2007 | Stephens et al. | |
| 2007/0118491 A1 | 5/2007 | Baum et al. | |
| 2007/0156756 A1 | 7/2007 | Stoyanova | |
| 2007/0156859 A1 | 7/2007 | Savchenko et al. | |
| 2007/0240208 A1 | 10/2007 | Yu et al. | |
| 2007/0265947 A1 | 11/2007 | Schimpf et al. | |
| 2008/0063154 A1 | 3/2008 | Tamari et al. | |
| 2008/0215546 A1 | 9/2008 | Baum et al. | |
| 2008/0222248 A1 | 9/2008 | Eberlein et al. | |
| 2008/0307056 A1 | 12/2008 | Videlov | |
| 2010/0029308 A1 | 2/2010 | Tims et al. | |
| 2010/0070620 A1 | 3/2010 | Awadallah et al. | |
| 2010/0106562 A1 | 4/2010 | Taylor et al. | |
| 2010/0235762 A1 | 9/2010 | Laiho et al. | |
| 2011/0113048 A1 | 5/2011 | Njemanze | |
| 2011/0124319 A1 | 5/2011 | Fu | |
| 2011/0125847 A1 | 5/2011 | Cocheu et al. | |
| 2011/0138052 A1 | 6/2011 | Caplan et al. | |
| 2011/0276408 A1 | 11/2011 | Toole | |
| 2011/0302653 A1 | 12/2011 | Frantz et al. | |
| 2011/0307580 A1 | 12/2011 | Fullett | |
| 2012/0136926 A1 | 5/2012 | Dillon | |
| 2012/0197928 A1 | 8/2012 | Zhang et al. | |
| 2012/0197934 A1 | 8/2012 | Zhang et al. | |
| 2012/0198057 A1 | 8/2012 | Ennis, Jr. et al. | |
| 2012/0271902 A1 | 10/2012 | Baliga et al. | |
| 2013/0145222 A1 | 6/2013 | Birdsall | |
| 2013/0191500 A1 | 7/2013 | Shafi et al. | |
| 2013/0219397 A1 | 8/2013 | Adams et al. | |
| 2013/0232164 A1 | 9/2013 | Bigney et al. | |
| 2013/0318236 A1 | 11/2013 | Coates et al. | |
| 2013/0318603 A1 | 11/2013 | Merza | |
| 2013/0318604 A1 | 11/2013 | Coates et al. | |
| 2013/0326620 A1 | 12/2013 | Merza et al. | |
| 2013/0332445 A1 | 12/2013 | Opalinski et al. | |
| 2014/0074889 A1 | 3/2014 | Neels et al. | |
| 2014/0101134 A1 | 4/2014 | Bohrer et al. | |
| 2014/0201838 A1* | 7/2014 | Varsanyi | G06F 21/552 726/23 |
| 2014/0223011 A1 | 8/2014 | Smith et al. | |
| 2014/0304407 A1 | 10/2014 | Moon | |
| 2015/0067185 A1 | 3/2015 | Tamblin et al. | |
| 2015/0149879 A1 | 5/2015 | Miller et al. | |
| 2015/0180891 A1 | 6/2015 | Seward et al. | |
| 2015/0213631 A1 | 7/2015 | Vander Broek | |
| 2015/0215177 A1 | 7/2015 | Pietrowicz et al. | |
| 2015/0293954 A1 | 10/2015 | Hsiao et al. | |
| 2015/0341212 A1 | 11/2015 | Hsiao et al. | |
| 2015/0372855 A1 | 12/2015 | Kushmerick et al. | |
| 2015/0373043 A1 | 12/2015 | Wang et al. | |
| 2016/0196131 A1* | 7/2016 | Searle | H04L 65/40 717/173 |
| 2016/0224577 A1 | 8/2016 | Miller | |
| 2016/0248644 A1 | 8/2016 | Dontcheva et al. | |
| 2016/0275593 A1 | 9/2016 | Cosano-Martinez et al. | |
| 2016/0294614 A1* | 10/2016 | Searle | H04L 67/34 707/707 |
| 2016/0321352 A1 | 11/2016 | Patel et al. | |
| 2016/0350091 A1* | 12/2016 | Khot | G06F 16/9024 707/707 |
| 2016/0350093 A1* | 12/2016 | Walker | G06F 21/57 707/707 |
| 2016/0350153 A1* | 12/2016 | Khot | G06F 9/4843 707/707 |
| 2016/0350303 A1* | 12/2016 | Fischer | G06F 16/2452 707/707 |
| 2016/0350367 A1* | 12/2016 | Fischer | G06F 16/256 707/707 |
| 2016/0359872 A1 | 12/2016 | Yadav et al. | |
| 2016/0373293 A1 | 12/2016 | Kushmerick et al. | |
| 2017/0069043 A1 | 3/2017 | Doyle et al. | |
| 2017/0199727 A1 | 7/2017 | Lau | |
| 2017/0201495 A1 | 7/2017 | Cooley | |
| 2017/0371568 A1 | 12/2017 | Aravot et al. | |
| 2018/0004820 A1 | 1/2018 | Hao et al. | |
| 2018/0041500 A1* | 2/2018 | Menahem | G06F 40/18 707/707 |
| 2019/0098106 A1 | 3/2019 | Mungel et al. | |
| 2020/0097484 A1 | 3/2020 | Block | |
| 2020/0220875 A1* | 7/2020 | Harguindeguy | H04L 63/101 707/707 |
| 2022/0414119 A1 | 12/2022 | Block et al. | |

OTHER PUBLICATIONS

Bitincka, Ledion et al., "Optimizing Data Analysis with a Semi-structured Time Series Database," self-published, first presented at "Workshop on Managing Systems via Log Analysis and Machine Learning Techniques (SLAML)", Vancouver, British Columbia, Oct. 3, 2010.

Carraso, David, "Exploring Splunk," published by CITO Research, New York, NY, Apr. 2012.

SLAML 10 Reports, Workshop On Managing Systems via Log Analysis and Machine Learning Techniques, ;login: Feb. 2011 Conference Reports.

Splunk Cloud 8.0.2004 User Manual, available online, retrieved May 20, 2020 from docs.splunk.com.

Splunk Enterprise 8.0.0 Overview, available online, retrieved May 20, 2020 from docs.splunk.com.

Splunk Quick Reference Guide, updated 2019, available online at https://www.splunk.com/pdfs/solution-guides/splunk-quick-reference-guide.pdf, retrieved May 20, 2020.

Schmidt et al., "The Enterprise Service Bus: Making service-oriented architecture real," IMB Systems Journal (Year: 2005).

U.S. Appl. No. 18/494,312, filed Oct. 25, 2023, Block et al.

\* cited by examiner

FIG. 6A

| Data Summary | | | | |
|---|---|---|---|---|
| Hosts (5) | Sources (8) | Sourcetypes (3) | | |
| filter | | | | |
| Host ≎ | ≎ | Count ≎ | Last Update ≎ | |
| mailsv | | 9,829 | 4/29/14 1:32:47.000 PM | |
| vendor_sales | | 30,244 | 4/29/14 1:32:46.000 PM | |
| www1 | | 24,221 | 4/29/14 1:32:44.000 PM | |
| www2 | | 22,596 | 4/29/14 1:32:47.000 PM | |
| www3 | | 22,975 | 4/29/14 1:32:45.000 PM | |

FIG. 6B

| Event Collector | 2002 | 2004 | 2006 | | |
|---|---|---|---|---|---|
| 3 Tokens | Filter | Global Settings | New Token | | |
| Name | Action | Token Value | Source Type | Index | Status |
| Token 1 | Edit Disable Delete | EF403E4E-C8E3-4D2F-909A-FB2741445CDE | Default | Main | Enabled |
| Token 2 | Edit Disable Delete | F712DF1B-9EA6-6A1D-4324-2DE2EF34792F | Default | Default | Enabled |
| Token 3 | Edit Disable Delete | 3A829D4D-AE62-19DA-EF42-CC213492E33 | Default | Default | Enabled |

FIG. 20

```
Curl -k https://localhost:8088/services/collector -H 'Authorization: Splunk EF403E4E-
C8E3-4D2F-909A-FB2741445CDE' -d '{"event":"event3",
"time":1450127100,"host":"foo1"}{"event":{"message":"event4"},
"time":1450127194,"host":"foo2"}'
```

FIG. 21

TOKENIZED HTTP EVENT COLLECTOR

INCORPORATION BY REFERENCE TO ANY PRIORITY APPLICATIONS

Any and all applications for which a foreign or domestic priority claim is identified in the Application Data Sheet as filed with the present application are incorporated by reference under 37 CFR 1.57 and made a part of this specification. This application is a continuation of U.S. patent application Ser. No. 16/189,124, filed on Nov. 13, 2018, entitled TOKENIZED EVENT COLLECTOR, which is a continuation of U.S. patent application Ser. No. 15/011,651, filed on Jan. 31, 2016, entitled TOKENIZED HTTP EVENT COLLECTOR, each of which is hereby incorporated herein by reference in its entirety.

BACKGROUND

The proliferation of internet-connected devices has greatly increased the number of devices that are acquiring and sending data over networks. Such devices are often operated in varied environments and are frequently operated by relatively unsophisticated consumers. Thus, many internet-connected devices have limited access to a dedicated or complex communications infrastructure for purposes of data storage and analysis. These devices may, however, have access to a network such as the internet. Thus, it may be possible for this large number of internet-connected to devices to provide data to a data storage system.

In addition to lacking access to a complex communication infrastructure, many internet-connected devices may operate only a limited number of applications, or may have limited processing capability to operate parallel monitoring and logging applications. Adding traditional data logging functionality to such devices may compromise performance or add significantly to development time. Unlike large-scale commercial operations and complex technical installations, developers of many internet-connected devices may have limited time or ability to create or integrate large-scale data storage functionality in or with their devices.

Even if developers of the large number of internet-connected devices could provide the data that they are gathering to a data storage system, it quickly becomes extremely difficult to process, secure, store, and query such a large volume of data in a secure manner. With fast-changing technologies, configurations that were recently acceptable or ideal may not function well with the data provided from new and different types of internet-connected devices. Because of the large volumes of data and the changing nature of data provided by internet-connected devices, data storage systems may be unable to scale across new technologies and devices.

BRIEF DESCRIPTION OF THE DRAWINGS

In the drawings:

FIG. 6A illustrates a search screen in accordance with the disclosed embodiments;

FIG. 6B illustrates a data summary dialog that enables a user to select various data sources in accordance with the disclosed embodiments;

FIG. 20 illustrates an exemplary event collector user interface in accordance with some embodiments of the present disclosure;

FIG. 21 illustrates an exemplary HTTP message utilizing token-based authentication and a custom JSON in accordance with some embodiments of the present disclosure;

DETAILED DESCRIPTION

Figure 1:
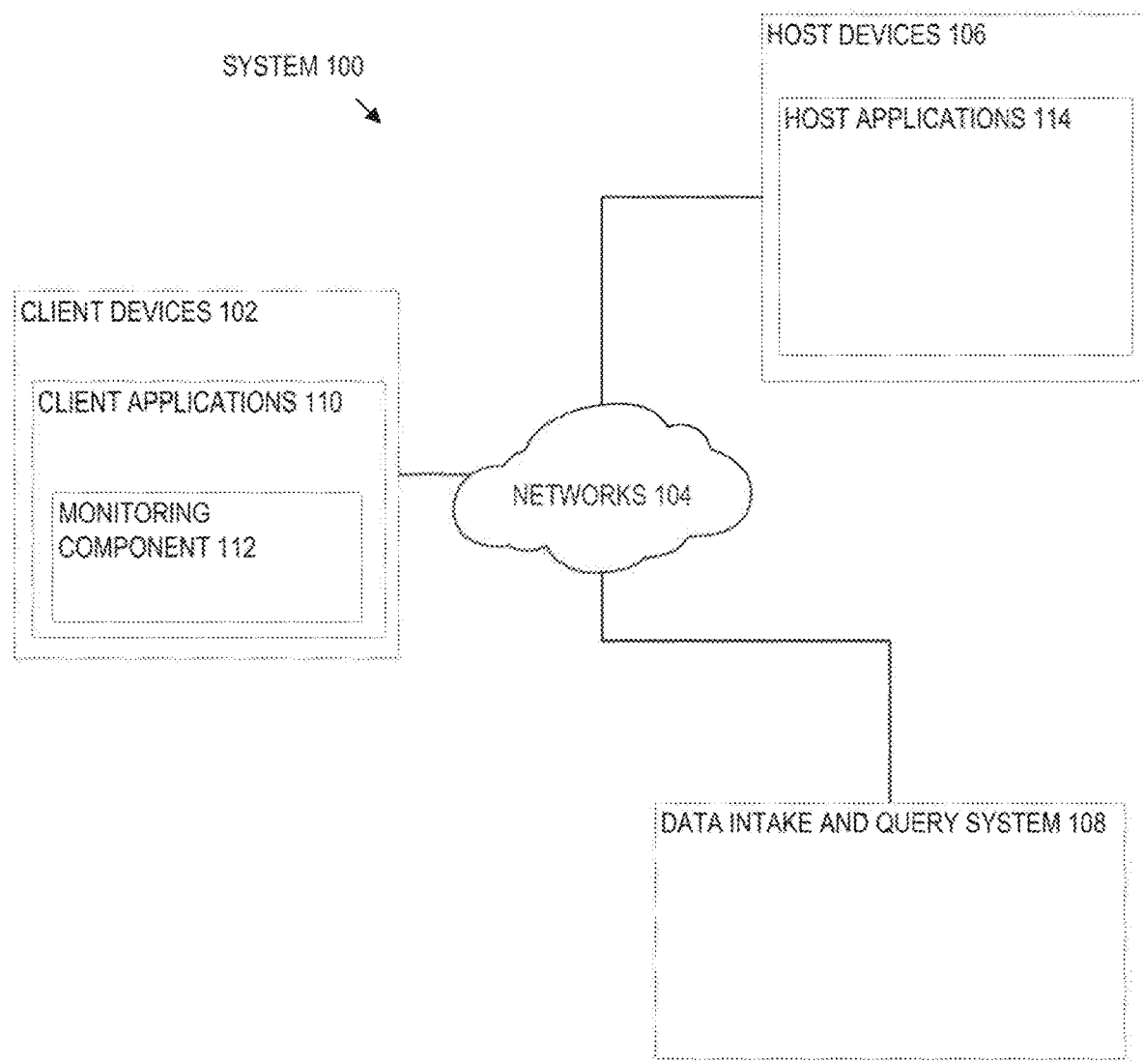
FIG. 1 illustrates a networked computer environment in which an embodiment may be implemented.

A device may be a data source that generates raw machine data for storage as events at a data intake and query system. The raw machine data and event metadata may be provided to one or more event collectors via a standard internet protocol such as the Hypertext Transfer Protocol (HTTP). The data intake and query system may include multiple configuration interfaces to facilitate the configuration of the system. A global event settings interface may provide global settings for metadata such as source type or index. These global event settings may be applied to all data that is processed by an installation of the system unless those settings are overridden.

The system may also include an interface for the creation and configuration of tokens. Tokens are distributed to data sources, and by providing a token, the device sending the message indicates to the event collector that it is authentic. Tokens may be distributed in various ways, for example, such that similar devices share the same token. The token also has its own event settings, including for event metadata. These settings may override the global event settings in the event that they conflict.

The data source has a variety of ways to send raw machine to an event collector via a HTTP message. In some embodiments, raw machine data may be sent as raw data, with the HTTP message URI or text including raw machine data that includes information such as text delimiters, which may be used to identify fields and metadata. In some embodiments, a data source may utilize a custom message format such as a custom JavaScript Object Notation (JSON). This may include information that identifies raw machine data and event settings (e.g., metadata) within the text of the HTTP message. The event settings provided in the HTTP message may override both the global event settings and the token event settings.

When an event collector receives a HTTP message, it may access the token identifier provided in the message to authenticate the communication and to access the token event settings. The event collector may then extract the raw machine data and event settings from the HTTP message to generate an event for storage at an indexer. The event may then be indexed at the indexer based on the global event settings, token event settings, and message event settings.

1.0. General Overview

Modern data centers and other computing environments can comprise anywhere from a few host computer systems to thousands of systems configured to process data, service requests from remote clients, and perform numerous other computational tasks. During operation, various components within these computing environments often generate significant volumes of machine-generated data. For example, machine data is generated by various components in the information technology (IT) environments, such as servers, sensors, routers, mobile devices, Internet of Things (IoT) devices, etc. Machine-generated data can include system logs, network packet data, sensor data, application program data, error logs, stack traces, system performance data, etc. In general, machine-generated data can also include performance data, diagnostic information, and many other types of data that can be analyzed to diagnose performance problems, monitor user interactions, and to derive other insights.

A number of tools are available to analyze machine data, that is, machine-generated data. In order to reduce the size of the potentially vast amount of machine data that may be generated, many of these tools typically pre-process the data based on anticipated data-analysis needs. For example, pre-specified data items may be extracted from the machine data and stored in a database to facilitate efficient retrieval and analysis of those data items at search time. However, the rest of the machine data typically is not saved and discarded during pre-processing. As storage capacity becomes progressively cheaper and more plentiful, there are fewer incentives to discard these portions of machine data and many reasons to retain more of the data.

This plentiful storage capacity is presently making it feasible to store massive quantities of minimally processed machine data for later retrieval and analysis. In general, storing minimally processed machine data and performing analysis operations at search time can provide greater flexibility because it enables an analyst to search all of the machine data, instead of searching only a pre-specified set of data items. This may enable an analyst to investigate different aspects of the machine data that previously were unavailable for analysis.

However, analyzing and searching massive quantities of machine data presents a number of challenges.

These challenges can be addressed by using an event-based data intake and query system, such as the SPLUNK® ENTERPRISE system developed by Splunk Inc. of San Francisco, California. The SPLUNK® ENTERPRISE system is the leading platform for providing real-time operational intelligence that enables organizations to collect, index, and search machine-generated data from various websites, applications, servers, networks, and mobile devices that power their businesses. The SPLUNK® ENTERPRISE system is particularly useful for analyzing data which is commonly found in system log files, network data, and other data input sources. Although many of the techniques described herein are explained with reference to a data intake and query system similar to the SPLUNK® ENTERPRISE system, these techniques are also applicable to other types of data systems.

In the SPLUNK® ENTERPRISE system, machine-generated data are collected and stored as "events". An event comprises a portion of the machine-generated data and is associated with a specific point in time. For example, events may be derived from "time series data," where the time series data comprises a sequence of data points (e.g., performance measurements from a computer system, etc.) that are associated with successive points in time. In general, each event can be associated with a timestamp that is derived from the raw data in the event, determined through interpolation between temporally proximate events having known timestamps, or determined based on other configurable rules for associating timestamps with events, etc.

In some instances, machine data can have a predefined format, where data items with specific data formats are stored at predefined locations in the data. For example, the machine data may include data stored as fields in a database table. In other instances, machine data may not have a predefined format, that is, the data is not at fixed, predefined locations, but the data does have repeatable patterns and is not random. This means that some machine data can comprise various data items of different data types and that may be stored at different locations within the data. For example, when the data source is an operating system log, an event can include one or more lines from the operating system log containing raw data that includes different types of performance and diagnostic information associated with a specific point in time.

Examples of components which may generate machine data from which events can be derived include, but are not limited to, web servers, application servers, databases, firewalls, routers, operating systems, and software applications that execute on computer systems, mobile devices, sensors, Internet of Things (IOT) devices, etc. The data generated by such data sources can include, for example and without limitation, server log files, activity log files, configuration files, messages, network packet data, performance measurements, sensor measurements, etc.

The SPLUNK® ENTERPRISE system uses flexible schema to specify how to extract information from the event data. A flexible schema may be developed and redefined as needed. Note that a flexible schema may be applied to event data "on the fly," when it is needed (e.g., at search time, index time, ingestion time, etc.). When the schema is not applied to event data until search time it may be referred to as a "late-binding schema."

During operation, the SPLUNK® ENTERPRISE system starts with raw input data (e.g., one or more system logs, streams of network packet data, sensor data, application program data, error logs, stack traces, system performance data, etc.). The system divides this raw data into blocks (e.g., buckets of data, each associated with a specific time frame, etc.), and parses the raw data to produce timestamped events. The system stores the timestamped events in a data store. The system enables users to run queries against the stored data to, for example, retrieve events that meet criteria specified in a query, such as containing certain keywords or having specific values in defined fields. As used herein throughout, data that is part of an event is referred to as "event data". In this context, the term "field" refers to a location in the event data containing one or more values for a specific data item. As will be described in more detail herein, the fields are defined by extraction rules (e.g., regular expressions) that derive one or more values from the portion of raw machine data in each event that has a particular field specified by an extraction rule. The set of values so produced are semantically-related (such as IP address), even though the raw machine data in each event may be in different formats (e.g., semantically-related values may be in different positions in the events derived from different sources).

As noted above, the SPLUNK® ENTERPRISE system utilizes a late-binding schema to event data while performing queries on events. One aspect of a late-binding schema is applying "extraction rules" to event data to extract values for specific fields during search time. More specifically, the extraction rules for a field can include one or more instructions that specify how to extract a value for the field from the event data. An extraction rule can generally include any type of instruction for extracting values from data in events. In some cases, an extraction rule comprises a regular expression where a sequence of characters form a search pattern, in which case the rule is referred to as a "regex rule." The system applies the regex rule to the event data to extract values for associated fields in the event data by searching the event data for the sequence of characters defined in the regex rule.

In the SPLUNK® ENTERPRISE system, a field extractor may be configured to automatically generate extraction rules for certain field values in the events when the events are being created, indexed, or stored, or possibly at a later time. Alternatively, a user may manually define extraction rules for fields using a variety of techniques. In contrast to a conventional schema for a database system, a late-binding schema is not defined at data ingestion time. Instead, the late-binding schema can be developed on an ongoing basis until the time a query is actually executed. This means that extraction rules for the fields in a query may be provided in the query itself, or may be located during execution of the query. Hence, as a user learns more about the data in the events, the user can continue to refine the late-binding schema by adding new fields, deleting fields, or modifying the field extraction rules for use the next time the schema is used by the system. Because the SPLUNK® ENTERPRISE system maintains the underlying raw data and uses late-binding schema for searching the raw data, it enables a user to continue investigating and learn valuable insights about the raw data.

In some embodiments, a common field name may be used to reference two or more fields containing equivalent data items, even though the fields may be associated with different types of events that possibly have different data formats and different extraction rules. By enabling a common field name to be used to identify equivalent fields from different types of events generated by disparate data sources, the system facilitates use of a "common information model" (CIM) across the disparate data sources (further discussed with respect to FIG. 5).

2.0. Operating Environment

FIG. 1 illustrates a networked computer system 100 in which an embodiment may be implemented. Those skilled in the art would understand that FIG. 1 represents one example of a networked computer system and other embodiments may use different arrangements.

The networked computer system 100 comprises one or more computing devices. These one or more computing devices comprise any combination of hardware and software configured to implement the various logical components described herein. For example, the one or more computing devices may include one or more memories that store instructions for implementing the various components described herein, one or more hardware processors configured to execute the instructions stored in the one or more memories, and various data repositories in the one or more memories for storing data structures utilized and manipulated by the various components.

In an embodiment, one or more client devices 102 are coupled to one or more host devices 106 and a data intake and query system 108 via one or more networks 104. Networks 104 broadly represent one or more LANs, WANs, cellular networks (e.g., LTE, HSPA, 3G, and other cellular technologies), and/or networks using any of wired, wireless, terrestrial microwave, or satellite links, and may include the public Internet.

2.1. Host Devices

In the illustrated embodiment, a system 100 includes one or more host devices 106. Host devices 106 may broadly include any number of computers, virtual machine instances, and/or data centers that are configured to host or execute one or more instances of host applications 114. In general, a host device 106 may be involved, directly or indirectly, in processing requests received from client devices 102. Each host device 106 may comprise, for example, one or more of a network device, a web server, an application server, a database server, etc. A collection of host devices 106 may be configured to implement a network-based service. For example, a provider of a network-based service may configure one or more host devices 106 and host applications 114 (e.g., one or more web servers, application servers, database servers, etc.) to collectively implement the network-based application.

In general, client devices 102 communicate with one or more host applications 114 to exchange information. The communication between a client device 102 and a host application 114 may, for example, be based on the Hypertext Transfer Protocol (HTTP) or any other network protocol. Content delivered from the host application 114 to a client device 102 may include, for example, HTML documents, media content, etc. The communication between a client device 102 and host application 114 may include sending various requests and receiving data packets. For example, in general, a client device 102 or application running on a client device may initiate communication with a host application 114 by making a request for a specific resource (e.g., based on an HTTP request), and the application server may respond with the requested content stored in one or more response packets.

In the illustrated embodiment, one or more of host applications 114 may generate various types of performance data during operation, including event logs, network data, sensor data, and other types of machine-generated data. For example, a host application 114 comprising a web server may generate one or more web server logs in which details of interactions between the web server and any number of client devices 102 is recorded. As another example, a host device 106 comprising a router may generate one or more router logs that record information related to network traffic managed by the router. As yet another example, a host application 114 comprising a database server may generate one or more logs that record information related to requests sent from other host applications 114 (e.g., web servers or application servers) for data managed by the database server.

2.2. Client Devices

Client devices 102 of FIG. 1 represent any computing device capable of interacting with one or more host devices 106 via a network 104. Examples of client devices 102 may include, without limitation, smart phones, tablet computers, handheld computers, wearable devices, laptop computers, desktop computers, servers, portable media players, gaming devices, and so forth. In general, a client device 102 can provide access to different content, for instance, content provided by one or more host devices 106, etc. Each client device 102 may comprise one or more client applications 110, described in more detail in a separate section hereinafter.

2.3. Client Device Applications

In an embodiment, each client device 102 may host or execute one or more client applications 110 that are capable of interacting with one or more host devices 106 via one or more networks 104. For instance, a client application 110 may be or comprise a web browser that a user may use to navigate to one or more websites or other resources provided by one or more host devices 106. As another example, a client application 110 may comprise a mobile application or "app." For example, an operator of a network-based service hosted by one or more host devices 106 may make available one or more mobile apps that enable users of client devices 102 to access various resources of the network-based service. As yet another example, client applications 110 may include background processes that perform various operations without direct interaction from a user. A client application 110 may include a "plug-in" or "extension" to another application, such as a web browser plug-in or extension.

In an embodiment, a client application 110 may include a monitoring component 112. At a high level, the monitoring component 112 comprises a software component or other logic that facilitates generating performance data related to a client device's operating state, including monitoring network traffic sent and received from the client device and collecting other device and/or application-specific information. Monitoring component 112 may be an integrated component of a client application 110, a plug-in, an extension, or any other type of add-on component. Monitoring component 112 may also be a stand-alone process.

In one embodiment, a monitoring component 112 may be created when a client application 110 is developed, for example, by an application developer using a software development kit (SDK). The SDK may include custom monitoring code that can be incorporated into the code implementing a client application 110. When the code is converted to an executable application, the custom code implementing the monitoring functionality can become part of the application itself.

In some cases, an SDK or other code for implementing the monitoring functionality may be offered by a provider of a data intake and query system, such as a system 108. In such cases, the provider of the system 108 can implement the custom code so that performance data generated by the monitoring functionality is sent to the system 108 to facilitate analysis of the performance data by a developer of the client application or other users.

In an embodiment, the custom monitoring code may be incorporated into the code of a client application 110 in a number of different ways, such as the insertion of one or more lines in the client application code that call or otherwise invoke the monitoring component 112. As such, a developer of a client application 110 can add one or more lines of code into the client application 110 to trigger the monitoring component 112 at desired points during execution of the application. Code that triggers the monitoring component may be referred to as a monitor trigger. For instance, a monitor trigger may be included at or near the beginning of the executable code of the client application 110 such that the monitoring component 112 is initiated or triggered as the application is launched, or included at other points in the code that correspond to various actions of the client application, such as sending a network request or displaying a particular interface.

In an embodiment, the monitoring component 112 may monitor one or more aspects of network traffic sent and/or received by a client application 110. For example, the monitoring component 112 may be configured to monitor data packets transmitted to and/or from one or more host applications 114. Incoming and/or outgoing data packets can be read or examined to identify network data contained within the packets, for example, and other aspects of data packets can be analyzed to determine a number of network performance statistics. Monitoring network traffic may enable information to be gathered particular to the network performance associated with a client application 110 or set of applications.

In an embodiment, network performance data refers to any type of data that indicates information about the network and/or network performance. Network performance data may include, for instance, a URL requested, a connection type (e.g., HTTP, HTTPS, etc.), a connection start time, a connection end time, an HTTP status code, request length, response length, request headers, response headers, connection status (e.g., completion, response time(s), failure, etc.), and the like. Upon obtaining network performance data indicating performance of the network, the network performance data can be transmitted to a data intake and query system 108 for analysis.

Upon developing a client application 110 that incorporates a monitoring component 112, the client application 110 can be distributed to client devices 102. Applications generally can be distributed to client devices 102 in any manner, or they can be pre-loaded. In some cases, the application may be distributed to a client device 102 via an application marketplace or other application distribution system. For instance, an application marketplace or other application distribution system might distribute the application to a client device based on a request from the client device to download the application.

Examples of functionality that enables monitoring performance of a client device are described in U.S. patent application Ser. No. 14/524,748, entitled "UTILIZING PACKET HEADERS TO MONITOR NETWORK TRAFFIC IN ASSOCIATION WITH A CLIENT DEVICE", filed on 27 Oct. 2014, and which is hereby incorporated by reference in its entirety for all purposes.

In an embodiment, the monitoring component 112 may also monitor and collect performance data related to one or more aspects of the operational state of a client application 110 and/or client device 102. For example, a monitoring component 112 may be configured to collect device performance information by monitoring one or more client device operations, or by making calls to an operating system and/or one or more other applications executing on a client device 102 for performance information. Device performance information may include, for instance, a current wireless signal strength of the device, a current connection type and network carrier, current memory performance information, a geographic location of the device, a device orientation, and any other information related to the operational state of the client device.

In an embodiment, the monitoring component 112 may also monitor and collect other device profile information including, for example, a type of client device, a manufacturer and model of the device, versions of various software applications installed on the device, and so forth.

In general, a monitoring component 112 may be configured to generate performance data in response to a monitor trigger in the code of a client application 110 or other triggering application event, as described above, and to store the performance data in one or more data records. Each data record, for example, may include a collection of field-value pairs, each field-value pair storing a particular item of performance data in association with a field for the item. For example, a data record generated by a monitoring component 112 may include a "networkLatency" field (not shown in the Figure) in which a value is stored. This field indicates a network latency measurement associated with one or more network requests. The data record may include a "state" field to store a value indicating a state of a network connection, and so forth for any number of aspects of collected performance data.

2.4. Data Server System

Figure 2:
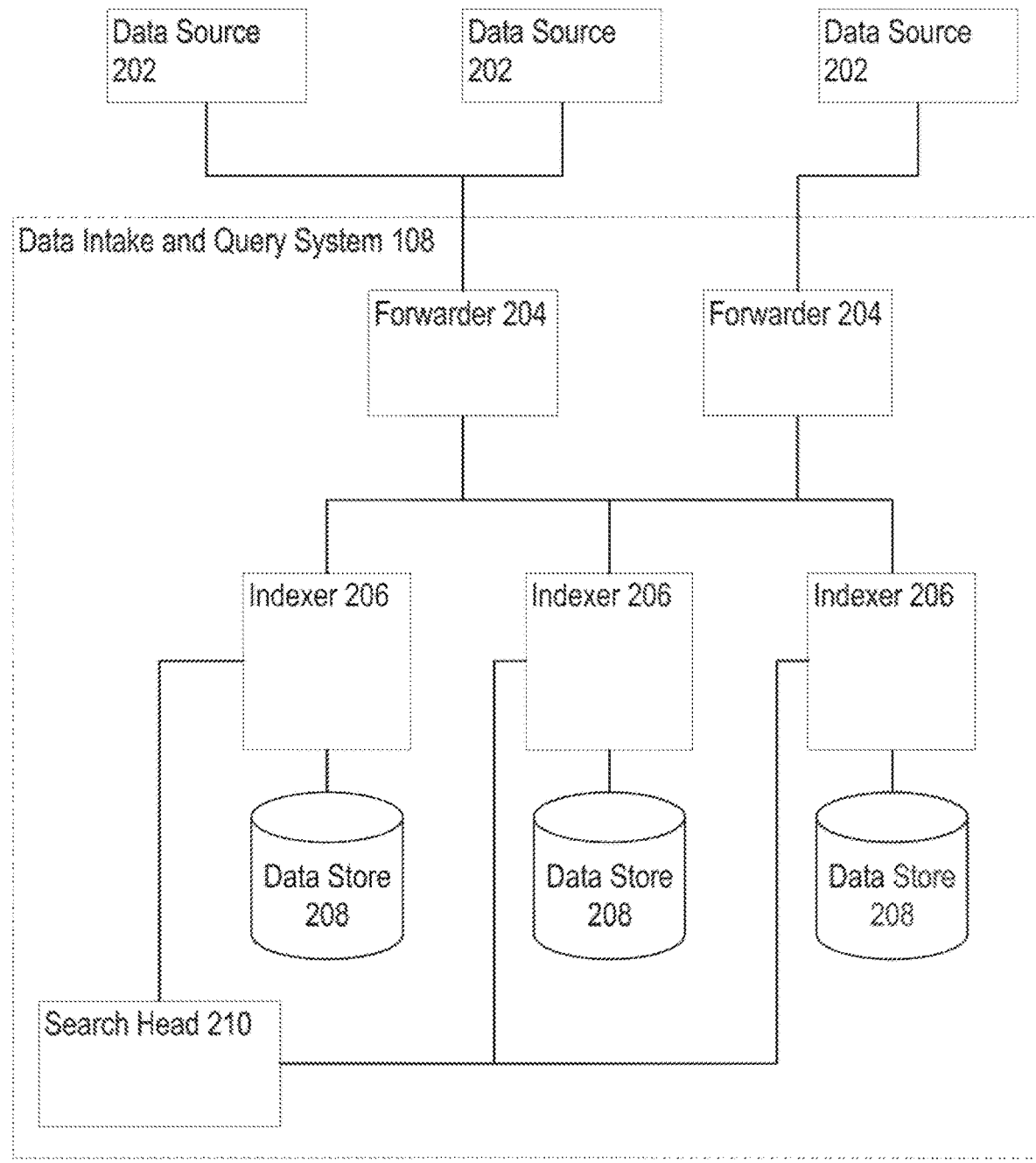
FIG. 2 illustrates a block diagram of an example data intake and query system in which an embodiment may be implemented.

FIG. 2 depicts a block diagram of an exemplary data intake and query system 108, similar to the SPLUNK® ENTERPRISE system. System 108 includes one or more forwarders 204 that receive data from a variety of input data sources 202, and one or more indexers 206 that process and store the data in one or more data stores 208. These forwarders and indexers can comprise separate computer systems, or may alternatively comprise separate processes executing on one or more computer systems.

Each data source 202 broadly represents a distinct source of data that can be consumed by a system 108. Examples of a data source 202 include, without limitation, data files, directories of files, data sent over a network, event logs, registries, etc.

During operation, the forwarders 204 identify which indexers 206 receive data collected from a data source 202 and forward the data to the appropriate indexers. Forwarders 204 can also perform operations on the data before forwarding, including removing extraneous data, detecting timestamps in the data, parsing data, indexing data, routing data based on criteria relating to the data being routed, and/or performing other data transformations.

In an embodiment, a forwarder 204 may comprise a service accessible to client devices 102 and host devices 106 via a network 104. For example, one type of forwarder 204 may be capable of consuming vast amounts of real-time data from a potentially large number of client devices 102 and/or host devices 106. The forwarder 204 may, for example, comprise a computing device which implements multiple data pipelines or "queues" to handle forwarding of network data to indexers 206. A forwarder 204 may also perform many of the functions that are performed by an indexer. For example, a forwarder 204 may perform keyword extractions on raw data or parse raw data to create events. A forwarder 204 may generate time stamps for events. Additionally or alternatively, a forwarder 204 may perform routing of events to indexers. Data store 208 may contain events derived from machine data from a variety of sources all pertaining to the same component in an IT environment, and this data may be produced by the machine in question or by other components in the IT environment.

2.5. Data Ingestion

Figure 3:
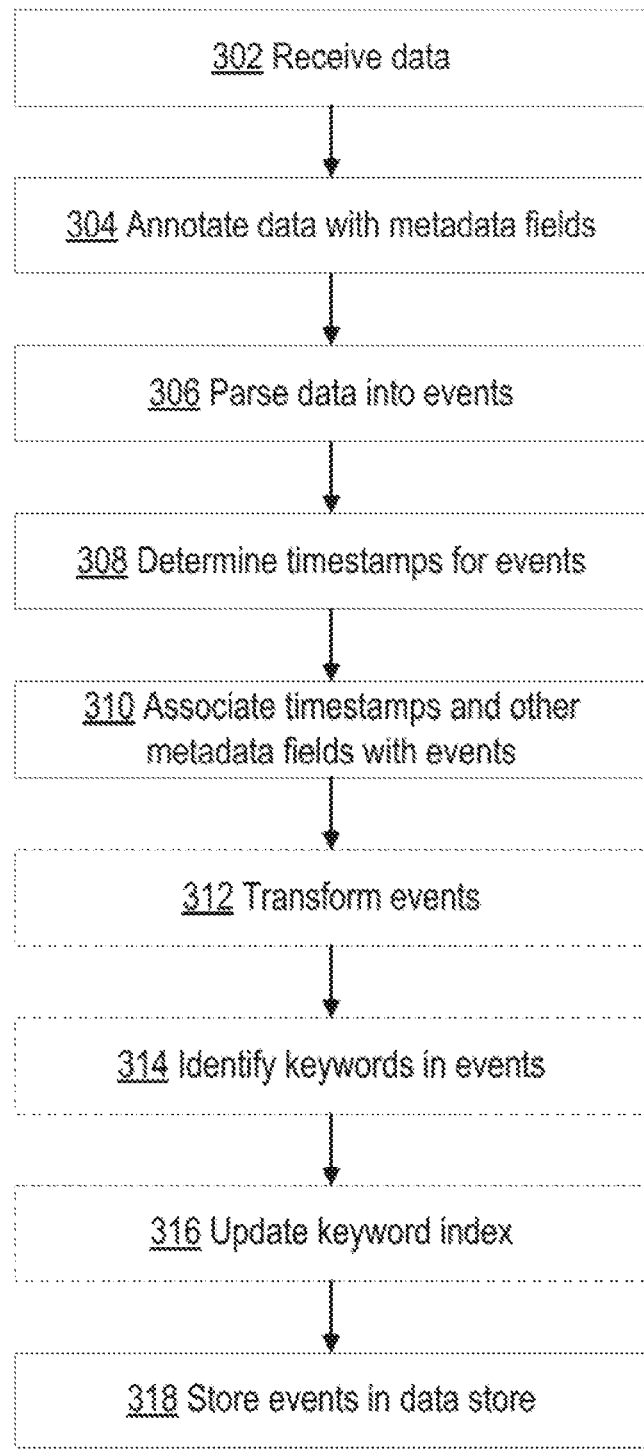
FIG. 3 is a flow diagram that illustrates how indexers process, index, and store data received from forwarders in accordance with the disclosed embodiments.

FIG. 3 depicts a flow chart illustrating an example data flow performed by Data Intake and Query system 108, in accordance with the disclosed embodiments. The data flow illustrated in FIG. 3 is provided for illustrative purposes only; those skilled in the art would understand that one or more of the steps of the processes illustrated in FIG. 3 may be removed or the ordering of the steps may be changed. Furthermore, for the purposes of illustrating a clear example, one or more particular system components are described in the context of performing various operations during each of the data flow stages. For example, a forwarder is described as receiving and processing data during an input phase; an indexer is described as parsing and indexing data during parsing and indexing phases; and a search head is described as performing a search query during a search phase. However, other system arrangements and distributions of the processing steps across system components may be used.

2.5.1. Input

At block 302, a forwarder receives data from an input source, such as a data source 202 shown in FIG. 2. A forwarder initially may receive the data as a raw data stream generated by the input source. For example, a forwarder may receive a data stream from a log file generated by an application server, from a stream of network data from a network device, or from any other source of data. In one embodiment, a forwarder receives the raw data and may segment the data stream into "blocks", or "buckets," possibly of a uniform data size, to facilitate subsequent processing steps.

At block 304, a forwarder or other system component annotates each block generated from the raw data with one or more metadata fields. These metadata fields may, for example, provide information related to the data block as a whole and may apply to each event that is subsequently derived from the data in the data block. For example, the metadata fields may include separate fields specifying each of a host, a source, and a source type related to the data block. A host field may contain a value identifying a host name or IP address of a device that generated the data. A source field may contain a value identifying a source of the data, such as a pathname of a file or a protocol and port related to received network data. A source type field may contain a value specifying a particular source type label for the data. Additional metadata fields may also be included during the input phase, such as a character encoding of the data, if known, and possibly other values that provide information relevant to later processing steps. In an embodiment, a forwarder forwards the annotated data blocks to another system component (typically an indexer) for further processing.

The SPLUNK® ENTERPRISE system allows forwarding of data from one SPLUNK® ENTERPRISE instance to another, or even to a third-party system. SPLUNK® ENTERPRISE system can employ different types of forwarders in a configuration.

In an embodiment, a forwarder may contain the essential components needed to forward data. It can gather data from a variety of inputs and forward the data to a SPLUNK® ENTERPRISE server for indexing and searching. It also can tag metadata (e.g., source, source type, host, etc.).

Additionally or optionally, in an embodiment, a forwarder has the capabilities of the aforementioned forwarder as well as additional capabilities. The forwarder can parse data before forwarding the data (e.g., associate a time stamp with a portion of data and create an event, etc.) and can route data based on criteria such as source or type of event. It can also index data locally while forwarding the data to another indexer.

2.5.2. Parsing

At block 306, an indexer receives data blocks from a forwarder and parses the data to organize the data into events. In an embodiment, to organize the data into events, an indexer may determine a source type associated with each data block (e.g., by extracting a source type label from the metadata fields associated with the data block, etc.) and refer to a source type configuration corresponding to the identified source type. The source type definition may include one or more properties that indicate to the indexer to automatically determine the boundaries of events within the data. In general, these properties may include regular expression-based rules or delimiter rules where, for example, event boundaries may be indicated by predefined characters or character strings. These predefined characters may include punctuation marks or other special characters including, for example, carriage returns, tabs, spaces, line breaks, etc. If a source type for the data is unknown to the indexer, an indexer may infer a source type for the data by examining the structure of the data. Then, it can apply an inferred source type definition to the data to create the events.

At block 308, the indexer determines a timestamp for each event. Similar to the process for creating events, an indexer may again refer to a source type definition associated with the data to locate one or more properties that indicate instructions for determining a timestamp for each event. The properties may, for example, instruct an indexer to extract a time value from a portion of data in the event, to interpolate time values based on timestamps associated with temporally proximate events, to create a timestamp based on a time the event data was received or generated, to use the timestamp of a previous event, or use any other rules for determining timestamps.

At block 310, the indexer associates with each event one or more metadata fields including a field containing the timestamp (in some embodiments, a timestamp may be included in the metadata fields) determined for the event. These metadata fields may include a number of "default fields" that are associated with all events, and may also include one more custom fields as defined by a user. Similar to the metadata fields associated with the data blocks at block 304, the default metadata fields associated with each event may include a host, source, and source type field including or in addition to a field storing the timestamp.

At block 312, an indexer may optionally apply one or more transformations to data included in the events created at block 306. For example, such transformations can include removing a portion of an event (e.g., a portion used to define event boundaries, extraneous characters from the event, other extraneous text, etc.), masking a portion of an event (e.g., masking a credit card number), removing redundant portions of an event, etc. The transformations applied to event data may, for example, be specified in one or more configuration files and referenced by one or more source type definitions.

2.5.3. Indexing

At blocks 314 and 316, an indexer can optionally generate a keyword index to facilitate fast keyword searching for event data. To build a keyword index, at block 314, the indexer identifies a set of keywords in each event. At block 316, the indexer includes the identified keywords in an index, which associates each stored keyword with reference pointers to events containing that keyword (or to locations within events where that keyword is located, other location identifiers, etc.). When an indexer subsequently receives a keyword-based query, the indexer can access the keyword index to quickly identify events containing the keyword.

In some embodiments, the keyword index may include entries for name-value pairs found in events, where a name-value pair can include a pair of keywords connected by a symbol, such as an equals sign or colon. This way, events containing these name-value pairs can be quickly located. In some embodiments, fields can automatically be generated for some or all of the name-value pairs at the time of indexing. For example, if the string "dest=10.0.1.2" is found in an event, a field named "dest" may be created for the event, and assigned a value of "10.0.1.2".

At block 318, the indexer stores the events with an associated timestamp in a data store 208. Timestamps enable a user to search for events based on a time range. In one embodiment, the stored events are organized into "buckets," where each bucket stores events associated with a specific time range based on the timestamps associated with each event. This may not only improve time-based searching, but also allows for events with recent timestamps, which may have a higher likelihood of being accessed, to be stored in a faster memory to facilitate faster retrieval. For example, buckets containing the most recent events can be stored in flash memory rather than on a hard disk.

Each indexer 206 may be responsible for storing and searching a subset of the events contained in a corresponding data store 208. By distributing events among the indexers and data stores, the indexers can analyze events for a query in parallel. For example, using map-reduce techniques, each indexer returns partial responses for a subset of events to a search head that combines the results to produce an answer for the query. By storing events in buckets for specific time ranges, an indexer may further optimize data retrieval process by searching buckets corresponding to time ranges that are relevant to a query.

Moreover, events and buckets can also be replicated across different indexers and data stores to facilitate high availability and disaster recovery as described in U.S. patent application Ser. No. 14/266,812, entitled "Site-Based Search Affinity", filed on 30 Apr. 2014, and in U.S. patent application Ser. No. 14/266,817, entitled "Multi-Site Clustering", also filed on 30 Apr. 2014, each of which is hereby incorporated by reference in its entirety for all purposes.

2.6. Query Processing

Figure 4:
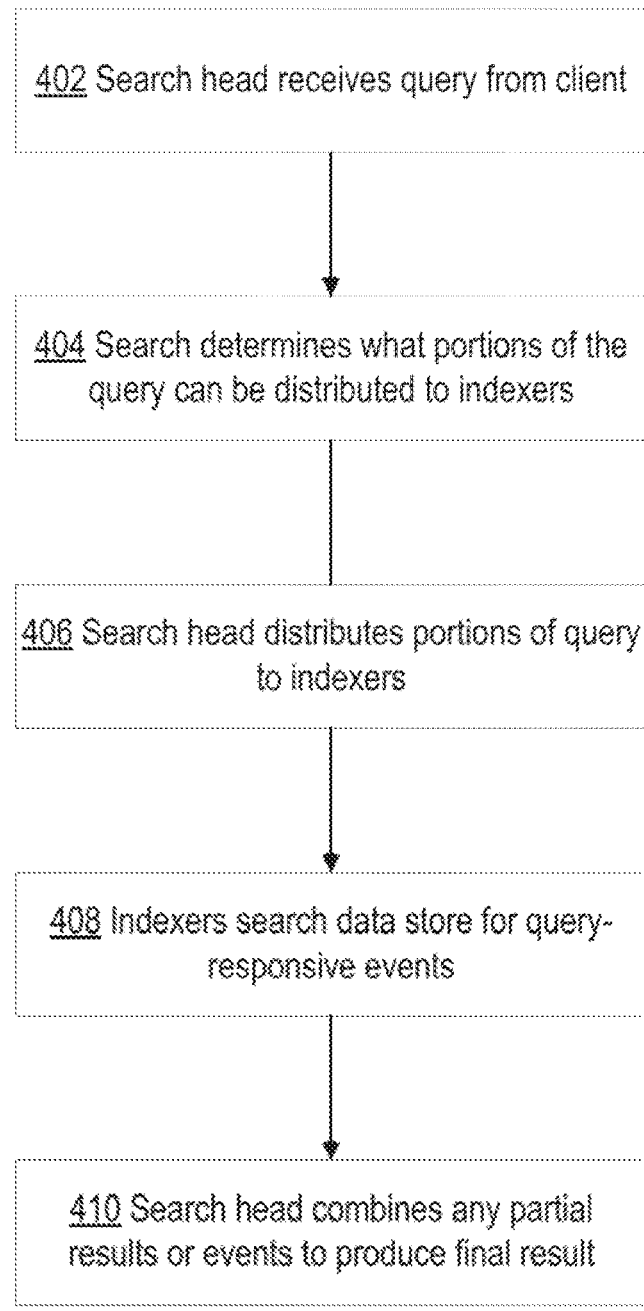
FIG. 4 is a flow diagram that illustrates how a search head and indexers perform a search query in accordance with the disclosed embodiments.

FIG. 4 is a flow diagram that illustrates an exemplary process that a search head and one or more indexers may perform during a search query. At block 402, a search head receives a search query from a client. At block 404, the search head analyzes the search query to determine what portion(s) of the query can be delegated to indexers and what portions of the query can be executed locally by the search head. At block 406, the search head distributes the determined portions of the query to the appropriate indexers. In an embodiment, a search head cluster may take the place of an independent search head where each search head in the search head cluster coordinates with peer search heads in the search head cluster to schedule jobs, replicate search results, update configurations, fulfill search requests, etc. In an embodiment, the search head (or each search head) communicates with a master node (also known as a cluster master, not shown in FIG.) that provides the search head with a list of indexers to which the search head can distribute the determined portions of the query. The master node maintains a list of active indexers and can also designate which indexers may have responsibility for responding to queries over certain sets of events. A search head may communicate with the master node before the search head distributes queries to indexers to discover the addresses of active indexers.

At block 408, the indexers to which the query was distributed, search data stores associated with them for events that are responsive to the query. To determine which events are responsive to the query, the indexer searches for events that match the criteria specified in the query. These criteria can include matching keywords or specific values for certain fields. The searching operations at block 408 may use the late-binding schema to extract values for specified fields from events at the time the query is processed. In an embodiment, one or more rules for extracting field values may be specified as part of a source type definition. The indexers may then either send the relevant events back to the search head, or use the events to determine a partial result, and send the partial result back to the search head.

At block 410, the search head combines the partial results and/or events received from the indexers to produce a final result for the query. This final result may comprise different types of data depending on what the query requested. For example, the results can include a listing of matching events returned by the query, or some type of visualization of the data from the returned events. In another example, the final result can include one or more calculated values derived from the matching events.

The results generated by the system 108 can be returned to a client using different techniques. For example, one technique streams results or relevant events back to a client in real-time as they are identified. Another technique waits to report the results to the client until a complete set of results (which may include a set of relevant events or a result based on relevant events) is ready to return to the client. Yet another technique streams interim results or relevant events back to the client in real-time until a complete set of results is ready, and then returns the complete set of results to the client. In another technique, certain results are stored as "search jobs" and the client may retrieve the results by referring the search jobs.

The search head can also perform various operations to make the search more efficient. For example, before the search head begins execution of a query, the search head can determine a time range for the query and a set of common keywords that all matching events include. The search head may then use these parameters to query the indexers to obtain a superset of the eventual results. Then, during a filtering stage, the search head can perform field-extraction operations on the superset to produce a reduced set of search results. This speeds up queries that are performed on a periodic basis.

2.7. Field Extraction

The search head 210 allows users to search and visualize event data extracted from raw machine data received from homogenous data sources. It also allows users to search and visualize event data extracted from raw machine data received from heterogeneous data sources. The search head 210 includes various mechanisms, which may additionally reside in an indexer 206, for processing a query. Splunk Processing Language (SPL), used in conjunction with the SPLUNK® ENTERPRISE system, can be utilized to make a query. SPL is a pipelined search language in which a set of inputs is operated on by a first command in a command line, and then a subsequent command following the pipe symbol "|" operates on the results produced by the first command, and so on for additional commands. Other query languages, such as the Structured Query Language ("SQL"), can be used to create a query.

In response to receiving the search query, search head 210 uses extraction rules to extract values for the fields associated with a field or fields in the event data being searched. The search head 210 obtains extraction rules that specify how to extract a value for certain fields from an event. Extraction rules can comprise regex rules that specify how to extract values for the relevant fields. In addition to specifying how to extract field values, the extraction rules may also include instructions for deriving a field value by performing a function on a character string or value retrieved by the extraction rule. For example, a transformation rule may truncate a character string, or convert the character string into a different data format. In some cases, the query itself can specify one or more extraction rules.

The search head 210 can apply the extraction rules to event data that it receives from indexers 206. Indexers 206 may apply the extraction rules to events in an associated data store 208. Extraction rules can be applied to all the events in a data store, or to a subset of the events that have been filtered based on some criteria (e.g., event time stamp values, etc.). Extraction rules can be used to extract one or more values for a field from events by parsing the event data and examining the event data for one or more patterns of characters, numbers, delimiters, etc., that indicate where the field begins and, optionally, ends.

Figure 5:
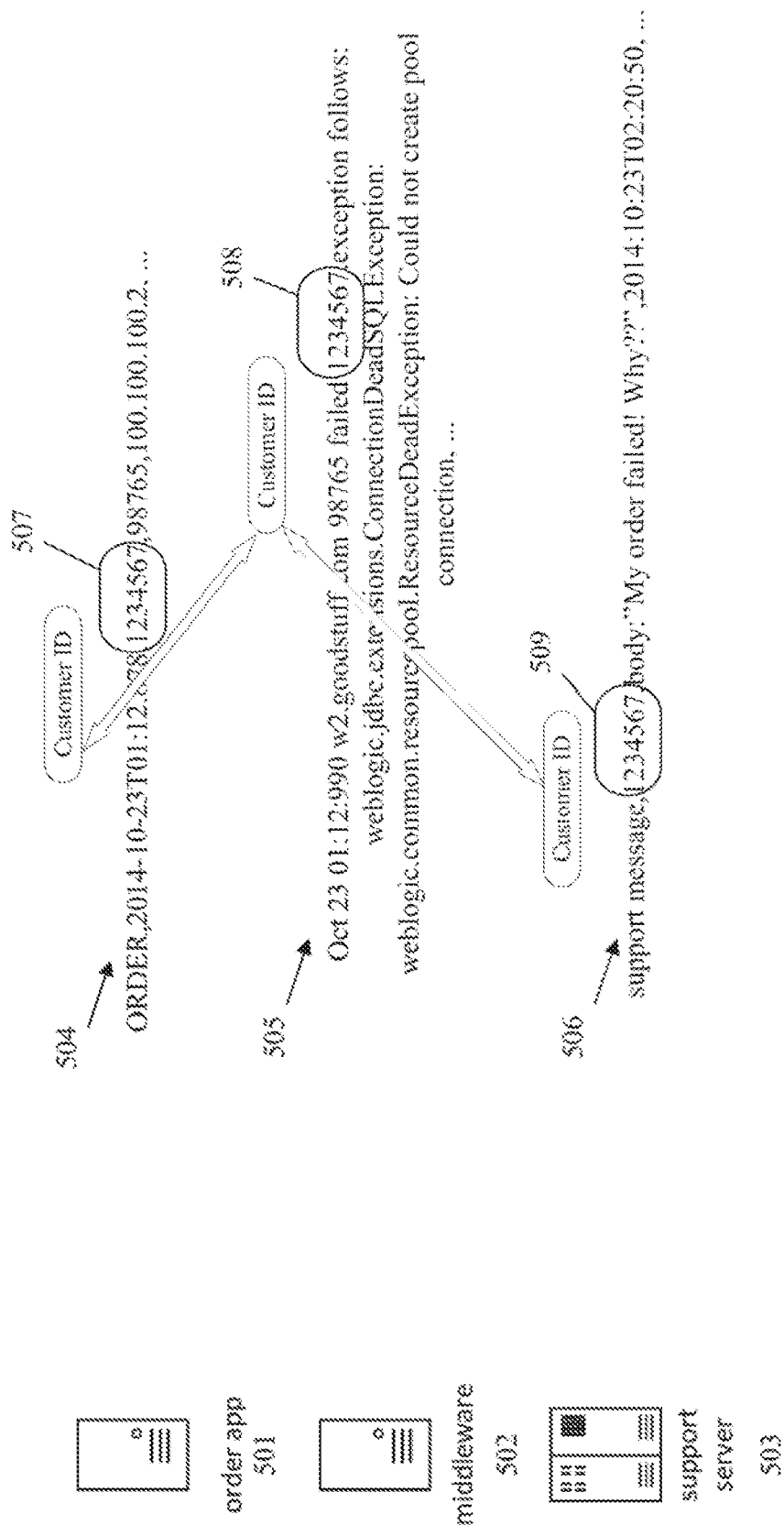
FIG. 5 illustrates a scenario where a common customer ID is found among log data received from three disparate sources in accordance with the disclosed embodiments.

FIG. 5 illustrates an example of raw machine data received from disparate data sources. In this example, a user submits an order for merchandise using a vendor's shopping application program 501 running on the user's system. In this example, the order was not delivered to the vendor's server due to a resource exception at the destination server that is detected by the middleware code 502. The user then sends a message to the customer support 503 to complain about the order failing to complete. The three systems 501, 502, and 503 are disparate systems that do not have a common logging format. The order application 501 sends log data 504 to the SPLUNK® ENTERPRISE system in one format, the middleware code 502 sends error log data 505 in a second format, and the support server 503 sends log data 506 in a third format.

Using the log data received at one or more indexers 206 from the three systems the vendor can uniquely obtain an insight into user activity, user experience, and system behavior. The search head 210 allows the vendor's administrator to search the log data from the three systems that one or more indexers 206 are responsible for searching, thereby obtaining correlated information, such as the order number and corresponding customer ID number of the person placing the order. The system also allows the administrator to see a visualization of related events via a user interface. The administrator can query the search head 210 for customer ID field value matches across the log data from the three systems that are stored at the one or more indexers 206. The customer ID field value exists in the data gathered from the three systems, but the customer ID field value may be located in different areas of the data given differences in the architecture of the systems—there is a semantic relationship between the customer ID field values generated by the three systems. The search head 210 requests event data from the one or more indexers 206 to gather relevant event data from the three systems. It then applies extraction rules to the event data in order to extract field values that it can correlate. The search head may apply a different extraction rule to each set of events from each system when the event data format differs among systems. In this example, the user interface can display to the administrator the event data corresponding to the common customer ID field values 507, 508, and 509, thereby providing the administrator with insight into a customer's experience.

Note that query results can be returned to a client, a search head, or any other system component for further processing. In general, query results may include a set of one or more events, a set of one or more values obtained from the events, a subset of the values, statistics calculated based on the values, a report containing the values, or a visualization, such as a graph or chart, generated from the values.

2.8. Example Search Screen

Figure 6A:
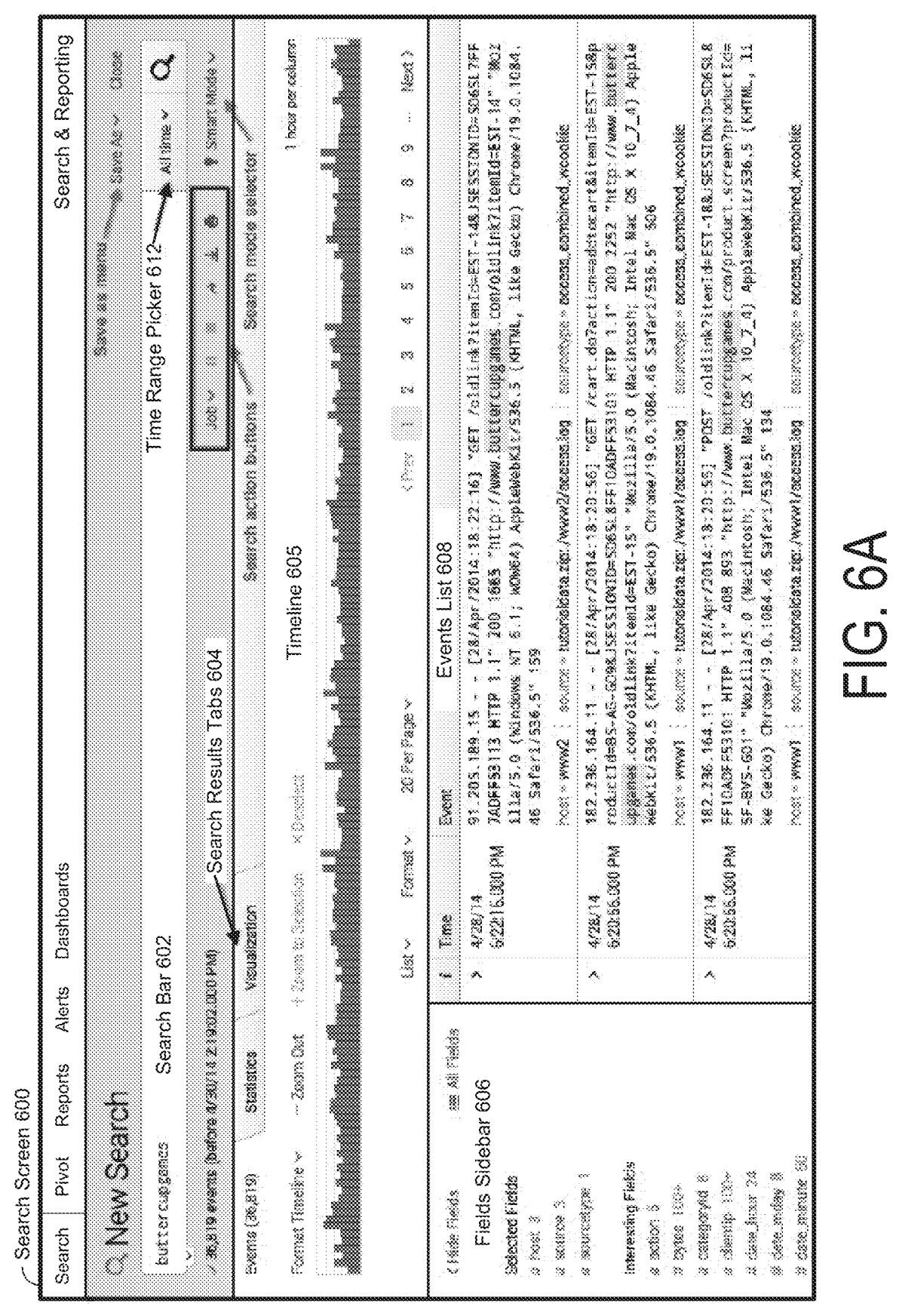

FIG. 6A illustrates an example search screen 600 in accordance with the disclosed embodiments. Search screen 600 includes a search bar 602 that accepts user input in the form of a search string. It also includes a time range picker 612 that enables the user to specify a time range for the search. For "historical searches" the user can select a specific time range, or alternatively a relative time range, such as "today," "yesterday" or "last week." For "real-time searches," the user can select the size of a preceding time window to search for real-time events. Search screen 600 also initially displays a "data summary" dialog as is illustrated in FIG. 6B that enables the user to select different sources for the event data, such as by selecting specific hosts and log files.

After the search is executed, the search screen 600 in FIG. 6A can display the results through search results tabs 604, wherein search results tabs 604 includes: an "events tab" that displays various information about events returned by the search; a "statistics tab" that displays statistics about the search results; and a "visualization tab" that displays various visualizations of the search results. The events tab illustrated in FIG. 6A displays a timeline graph 605 that graphically illustrates the number of events that occurred in one-hour intervals over the selected time range. It also displays an events list 608 that enables a user to view the raw data in each of the returned events. It additionally displays a fields sidebar 606 that includes statistics about occurrences of specific fields in the returned events, including "selected fields" that are pre-selected by the user, and "interesting fields" that are automatically selected by the system based on pre-specified criteria.

2.9. Data Models

A data model is a hierarchically structured search-time mapping of semantic knowledge about one or more datasets. It encodes the domain knowledge necessary to build a variety of specialized searches of those datasets. Those searches, in turn, can be used to generate reports.

A data model is composed of one or more "objects" (or "data model objects") that define or otherwise correspond to a specific set of data.

Objects in data models can be arranged hierarchically in parent/child relationships. Each child object represents a subset of the dataset covered by its parent object. The top-level objects in data models are collectively referred to as "root objects."

Child objects have inheritance. Data model objects are defined by characteristics that mostly break down into constraints and attributes. Child objects inherit constraints and attributes from their parent objects and have additional constraints and attributes of their own. Child objects provide a way of filtering events from parent objects. Because a child object always provides an additional constraint in addition to the constraints it has inherited from its parent object, the dataset it represents is always a subset of the dataset that its parent represents.

For example, a first data model object may define a broad set of data pertaining to e-mail activity generally, and another data model object may define specific datasets within the broad dataset, such as a subset of the e-mail data pertaining specifically to e-mails sent. Examples of data models can include electronic mail, authentication, databases, intrusion detection, malware, application state, alerts, compute inventory, network sessions, network traffic, performance, audits, updates, vulnerabilities, etc. Data models and their objects can be designed by knowledge managers in an organization, and they can enable downstream users to quickly focus on a specific set of data. For example, a user can simply select an "e-mail activity" data model object to access a dataset relating to e-mails generally (e.g., sent or received), or select an "e-mails sent" data model object (or data sub-model object) to access a dataset relating to e-mails sent.

A data model object may be defined by (1) a set of search constraints, and (2) a set of fields. Thus, a data model object can be used to quickly search data to identify a set of events and to identify a set of fields to be associated with the set of events. For example, an "e-mails sent" data model object may specify a search for events relating to e-mails that have been sent, and specify a set of fields that are associated with the events. Thus, a user can retrieve and use the "e-mails sent" data model object to quickly search source data for events relating to sent e-mails, and may be provided with a listing of the set of fields relevant to the events in a user interface screen.

A child of the parent data model may be defined by a search (typically a narrower search) that produces a subset of the events that would be produced by the parent data model's search. The child's set of fields can include a subset of the set of fields of the parent data model and/or additional fields. Data model objects that reference the subsets can be arranged in a hierarchical manner, so that child subsets of events are proper subsets of their parents. A user iteratively applies a model development tool (not shown in FIG.) to prepare a query that defines a subset of events and assigns an object name to that subset. A child subset is created by further limiting a query that generated a parent subset. A late-binding schema of field extraction rules is associated with each object or subset in the data model.

Data definitions in associated schemas can be taken from the common information model (CIM) or can be devised for a particular schema and optionally added to the CIM. Child objects inherit fields from parents and can include fields not present in parents. A model developer can select fewer extraction rules than are available for the sources returned by the query that defines events belonging to a model. Selecting a limited set of extraction rules can be a tool for simplifying and focusing the data model, while allowing a user flexibility to explore the data subset. Development of a data model is further explained in U.S. Pat. Nos. 8,788,525 and 8,788,526, both entitled "DATA MODEL FOR MACHINE DATA FOR SEMANTIC SEARCH", both issued on 22 Jul. 2014, U.S. Pat. No. 8,983,994, entitled "GENERATION OF A DATA MODEL FOR SEARCHING MACHINE DATA", issued on 17 Mar. 2015, U.S. patent application Ser. No. 14/611,232, entitled "GENERATION OF A DATA MODEL APPLIED TO QUERIES", filed on 31 Jan. 2015, and U.S. patent application Ser. No. 14/815,884, entitled "GENERATION OF A DATA MODEL APPLIED TO OBJECT QUERIES", filed on 31 Jul. 2015, each of which is hereby incorporated by reference in its entirety for all purposes. See, also, Knowledge Manager Manual, Build a Data Model, Splunk Enterprise 6.1.3 pp. 150-204 (Aug. 25, 2014).

A data model can also include reports. One or more report formats can be associated with a particular data model and be made available to run against the data model. A user can use child objects to design reports with object datasets that already have extraneous data pre-filtered out. In an embodiment, the data intake and query system 108 provides the user with the ability to produce reports (e.g., a table, chart, visualization, etc.) without having to enter SPL, SQL, or other query language terms into a search screen. Data models are used as the basis for the search feature.

Data models may be selected in a report generation interface. The report generator supports drag-and-drop organization of fields to be summarized in a report. When a model is selected, the fields with available extraction rules are made available for use in the report. The user may refine and/or filter search results to produce more precise reports. The user may select some fields for organizing the report and select other fields for providing detail according to the report organization. For example, "region" and "salesperson" are fields used for organizing the report and sales data can be summarized (subtotaled and totaled) within this organization. The report generator allows the user to specify one or more fields within events and apply statistical analysis on values extracted from the specified one or more fields. The report generator may aggregate search results across sets of events and generate statistics based on aggregated search results. Building reports using the report generation interface is further explained in U.S. patent application Ser. No. 14/503,335, entitled "GENERATING REPORTS FROM UNSTRUCTURED DATA", filed on 30 Sep. 2014, and which is hereby incorporated by reference in its entirety for all purposes, and in Pivot Manual, Splunk Enterprise 6.1.3 (Aug. 4, 2014). Data visualizations also can be generated in a variety of formats, by reference to the data model. Reports, data visualizations, and data model objects can be saved and associated with the data model for future use. The data model object may be used to perform searches of other data.

FIGS. 12, 13, and 7A-7D illustrate a series of user interface screens where a user may select report generation options using data models. The report generation process may be driven by a predefined data model object, such as a data model object defined and/or saved via a reporting application or a data model object obtained from another source. A user can load a saved data model object using a report editor. For example, the initial search query and fields used to drive the report editor may be obtained from a data model object. The data model object that is used to drive a report generation process may define a search and a set of fields. Upon loading of the data model object, the report generation process may enable a user to use the fields (e.g., the fields defined by the data model object) to define criteria for a report (e.g., filters, split rows/columns, aggregates, etc.) and the search may be used to identify events (e.g., to identify events responsive to the search) used to generate the report. That is, for example, if a data model object is selected to drive a report editor, the graphical user interface of the report editor may enable a user to define reporting criteria for the report using the fields associated with the selected data model object, and the events used to generate the report may be constrained to the events that match, or otherwise satisfy, the search constraints of the selected data model object.

Figure 12:
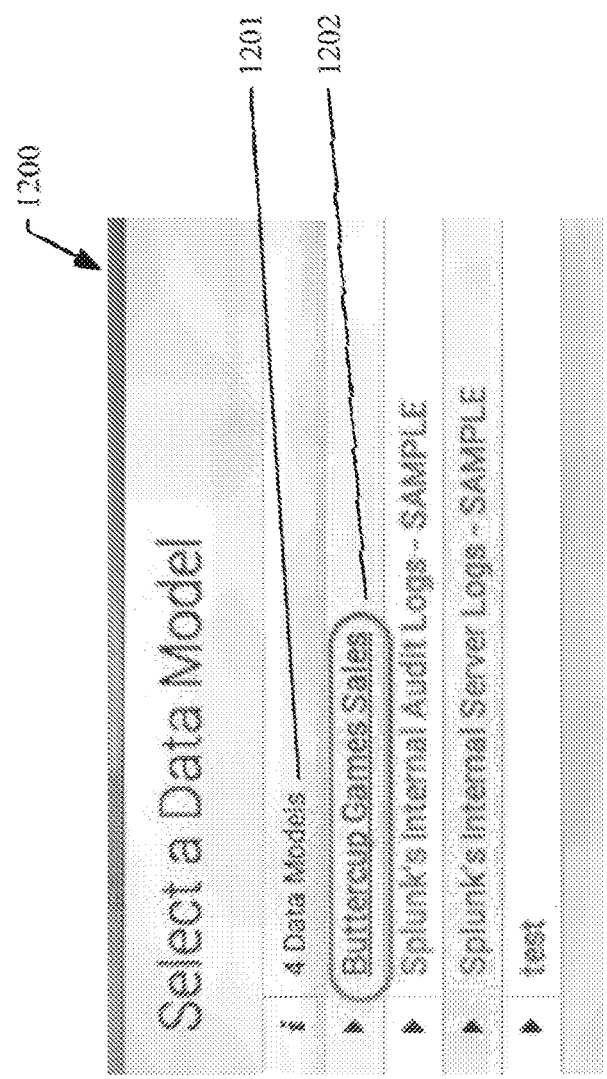
FIGS. 12-14 illustrate a series of user interface screens for an example data model-driven report generation interface in accordance with the disclosed embodiments.

The selection of a data model object for use in driving a report generation may be facilitated by a data model object selection interface. FIG. 12 illustrates an example interactive data model selection graphical user interface 1200 of a report editor that displays a listing of available data models 1201. The user may select one of the data models 1202.

Figure 13:
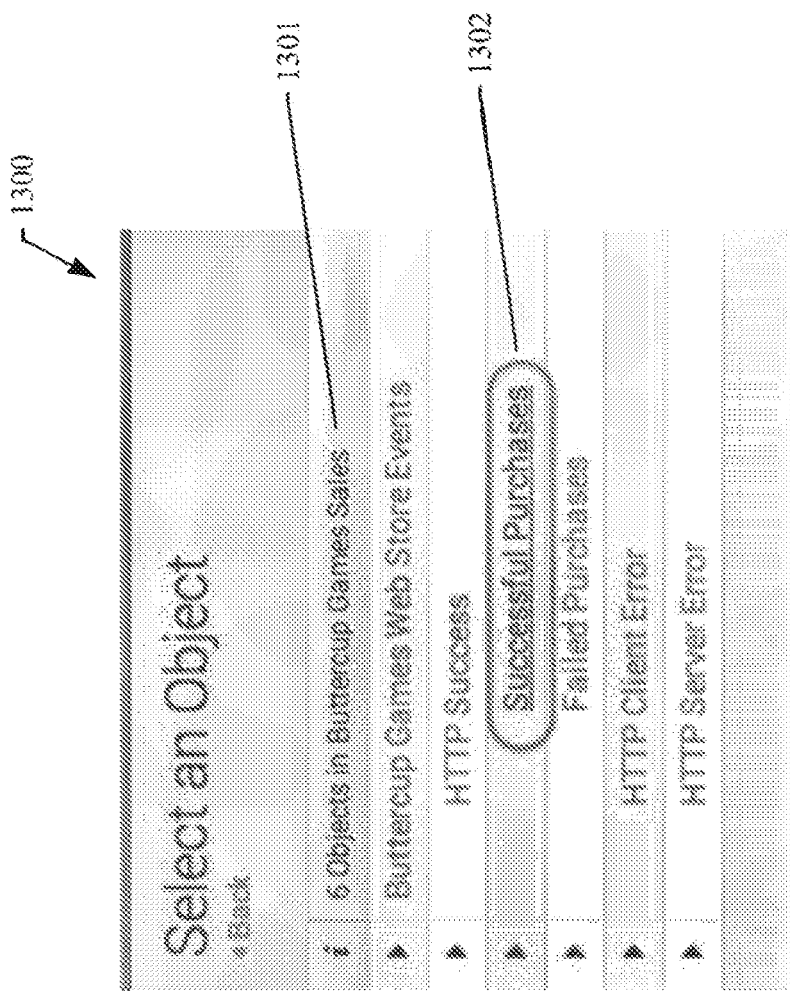

FIG. 13 illustrates an example data model object selection graphical user interface 1300 that displays available data objects 1301 for the selected data object model 1202. The user may select one of the displayed data model objects 1302 for use in driving the report generation process.

Figure 7A:
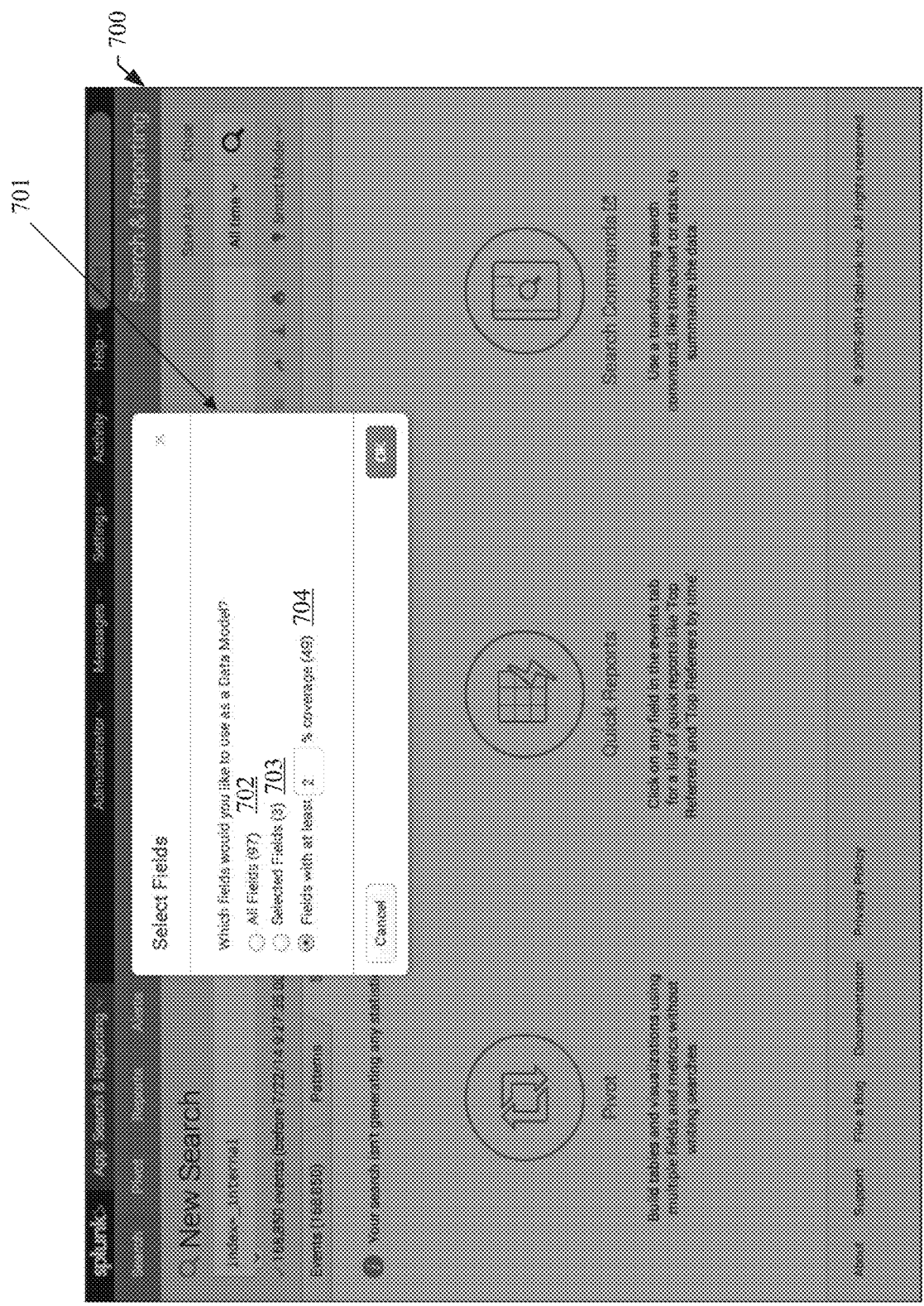
FIGS. 7A-7D illustrate a series of user interface screens for an example data model-driven report generation interface in accordance with the disclosed embodiments.

Once a data model object is selected by the user, a user interface screen 700 shown in FIG. 7A may display an interactive listing of automatic field identification options 701 based on the selected data model object. For example, a user may select one of the three illustrated options (e.g., the "All Fields" option 702, the "Selected Fields" option 703, or the "Coverage" option (e.g., fields with at least a specified % of coverage) 704). If the user selects the "All Fields" option 702, all of the fields identified from the events that were returned in response to an initial search query may be selected. That is, for example, all of the fields of the identified data model object fields may be selected. If the user selects the "Selected Fields" option 703, only the fields from the fields of the identified data model object fields that are selected by the user may be used. If the user selects the "Coverage" option 704, only the fields of the identified data model object fields meeting a specified coverage criteria may be selected. A percent coverage may refer to the percentage of events returned by the initial search query that a given field appears in. Thus, for example, if an object dataset includes 10,000 events returned in response to an initial search query, and the "avg_age" field appears in 854 of those 10,000 events, then the "avg_age" field would have a coverage of 8.54% for that object dataset. If, for example, the user selects the "Coverage" option and specifies a coverage value of 2%, only fields having a coverage value equal to or greater than 2% may be selected. The number of fields corresponding to each selectable option may be displayed in association with each option. For example, "97" displayed next to the "All Fields" option 702 indicates that 97 fields will be selected if the "All Fields" option is selected. The "3" displayed next to the "Selected Fields" option 703 indicates that 3 of the 97 fields will be selected if the "Selected Fields" option is selected. The "49" displayed next to the "Coverage" option 704 indicates that 49 of the 97 fields (e.g., the 49 fields having a coverage of 2% or greater) will be selected if the "Coverage" option is selected. The number of fields corresponding to the "Coverage" option may be dynamically updated based on the specified percent of coverage.

Figure 7B:
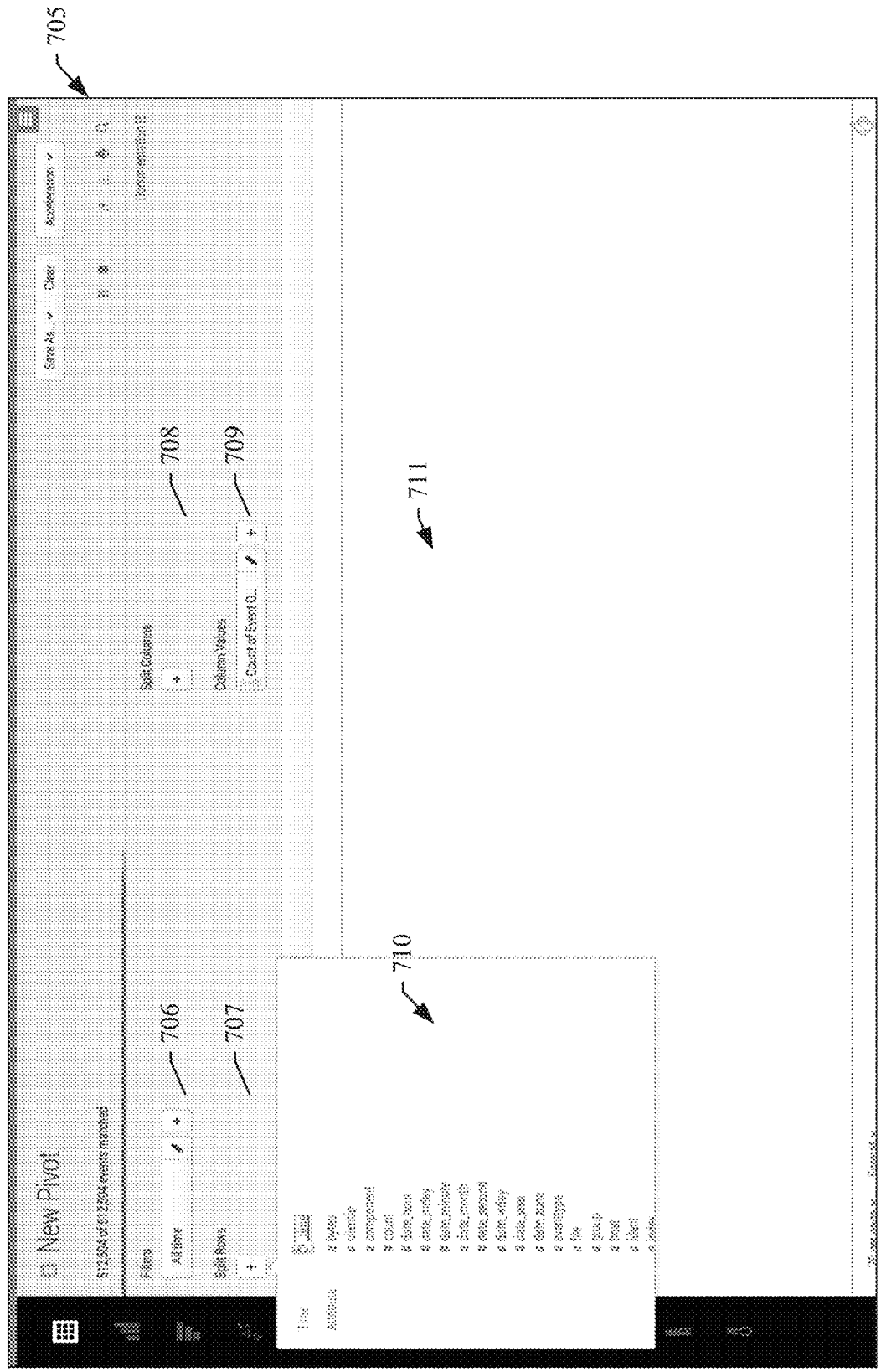
Figure 7C:
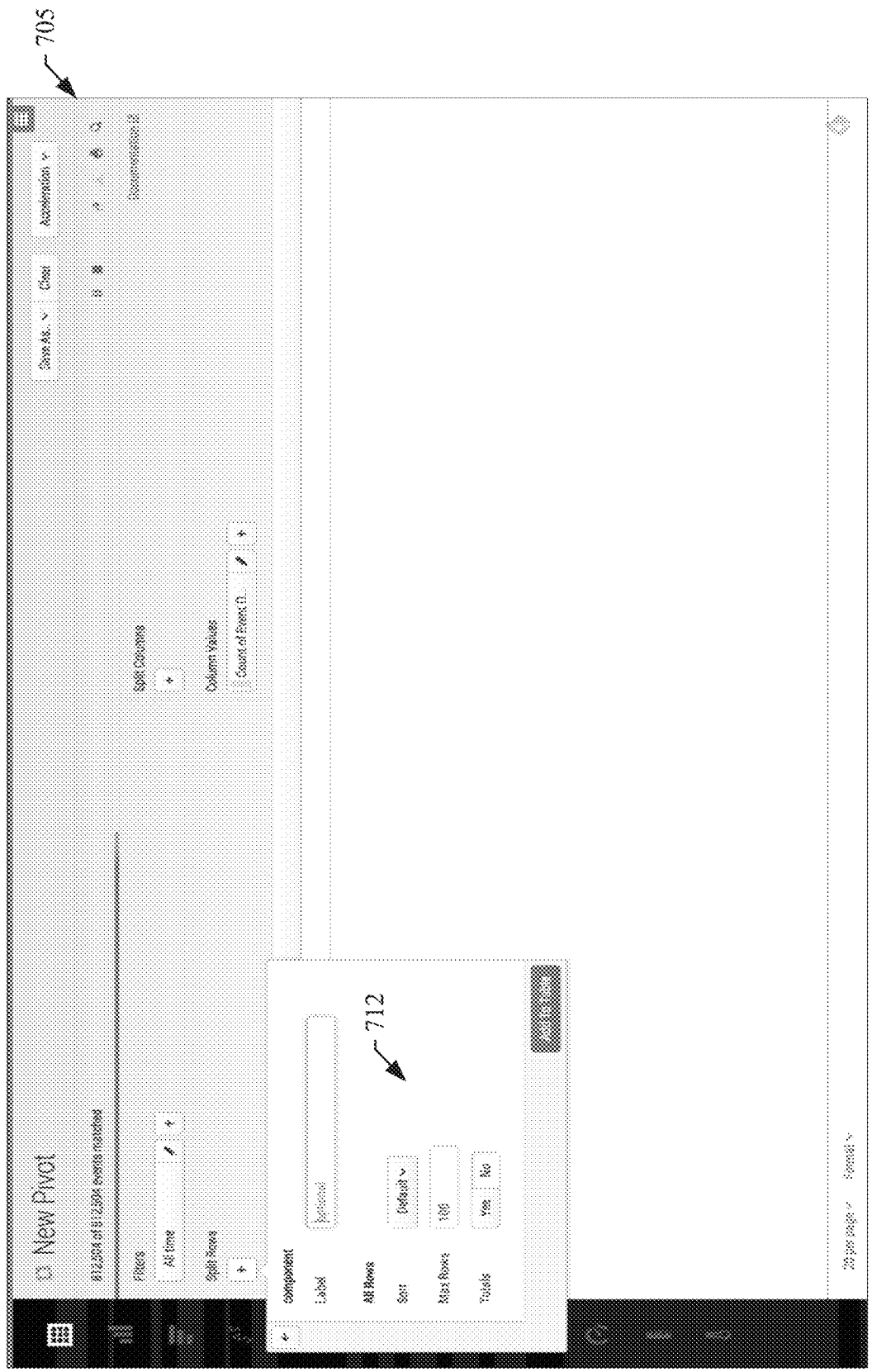

FIG. 7B illustrates an example graphical user interface screen (also called the pivot interface) 705 displaying the reporting application's "Report Editor" page. The screen may display interactive elements for defining various elements of a report. For example, the page includes a "Filters" element 706, a "Split Rows" element 707, a "Split Columns" element 708, and a "Column Values" element 709. The page may include a list of search results 711. In this example, the Split Rows element 707 is expanded, revealing a listing of fields 710 that can be used to define additional criteria (e.g., reporting criteria). The listing of fields 710 may correspond to the selected fields (attributes). That is, the listing of fields 710 may list only the fields previously selected, either automatically and/or manually by a user. FIG. 7C illustrates a formatting dialogue 712 that may be displayed upon selecting a field from the listing of fields 710. The dialogue can be used to format the display of the results of the selection (e.g., label the column to be displayed as "component").

Figure 7D:
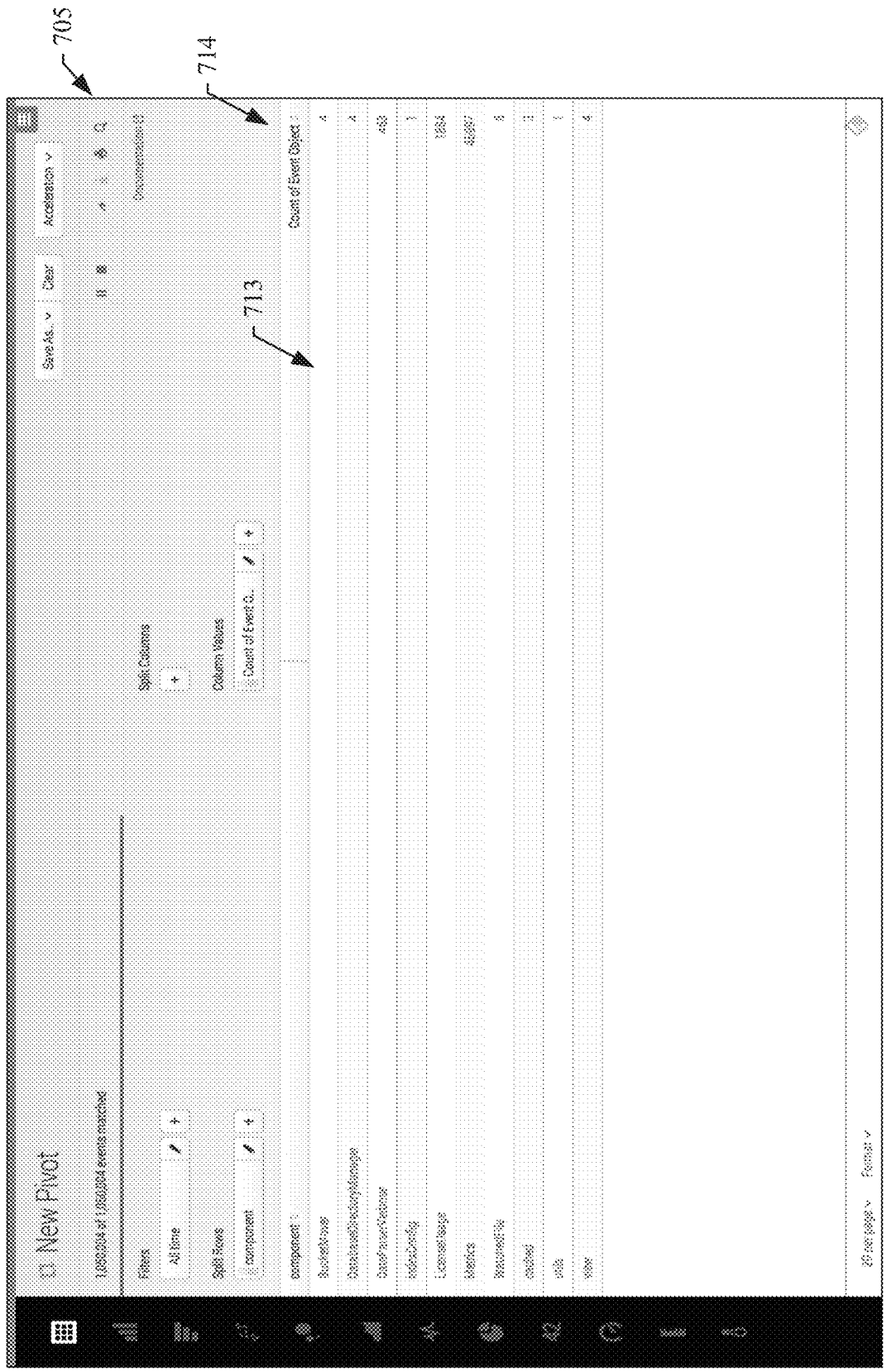

FIG. 7D illustrates an example graphical user interface screen 705 including a table of results 713 based on the selected criteria including splitting the rows by the "component" field. A column 714 having an associated count for each component listed in the table may be displayed that indicates an aggregate count of the number of times that the particular field-value pair (e.g., the value in a row) occurs in the set of events responsive to the initial search query.

Figure 14:

FIG. 14 illustrates an example graphical user interface screen 1400 that allows the user to filter search results and to perform statistical analysis on values extracted from specific fields in the set of events. In this example, the top ten product names ranked by price are selected as a filter 1401 that causes the display of the ten most popular products sorted by price. Each row is displayed by product name and price 1402. This results in each product displayed in a column labeled "product name" along with an associated price in a column labeled "price" 1406. Statistical analysis of other fields in the events associated with the ten most popular products have been specified as column values 1403. A count of the number of successful purchases for each product is displayed in column 1404. This statistics may be produced by filtering the search results by the product name, finding all occurrences of a successful purchase in a field within the events and generating a total of the number of occurrences. A sum of the total sales is displayed in column 1405, which is a result of the multiplication of the price and the number of successful purchases for each product.

Figure 15:
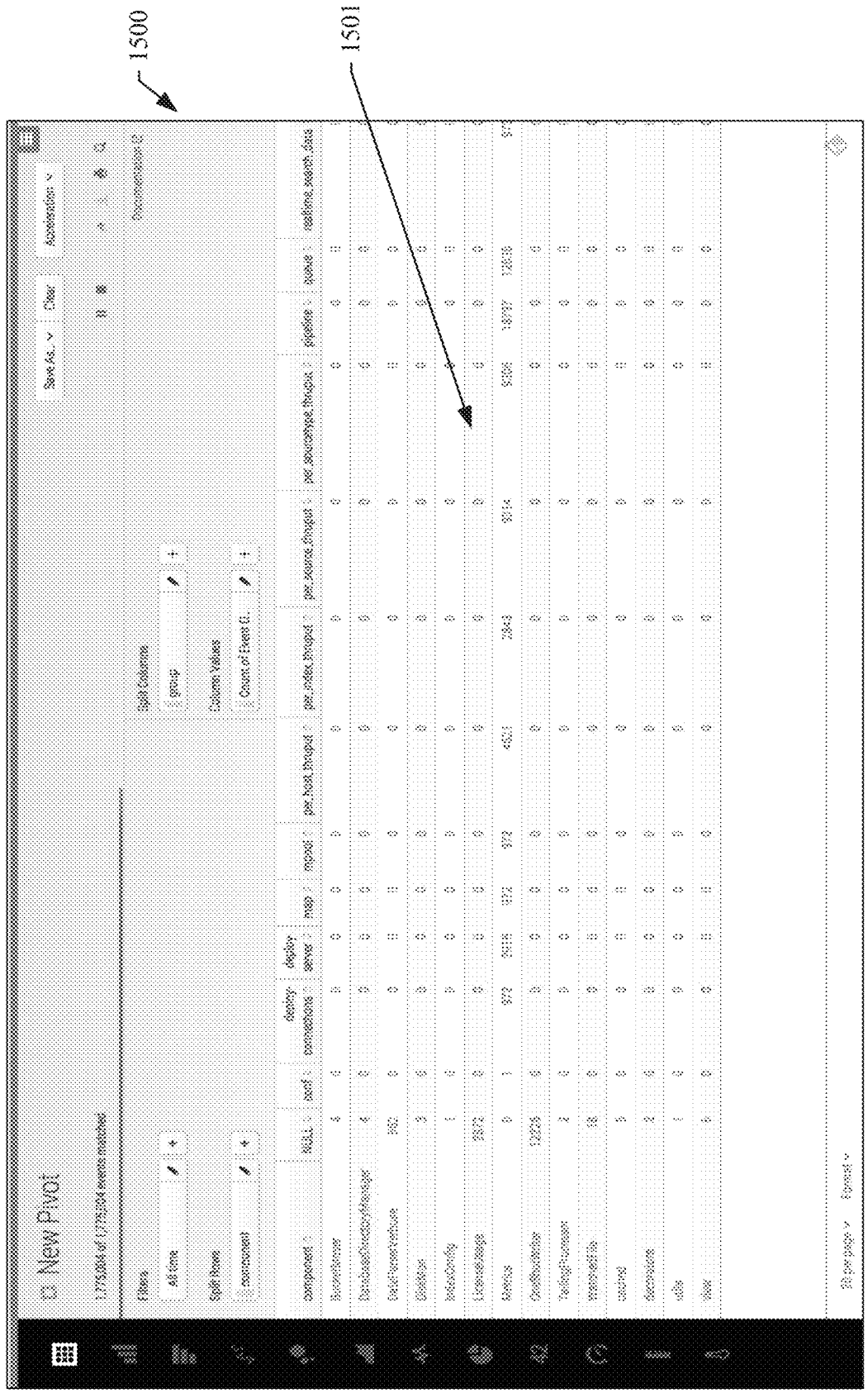
FIGS. 15-17 illustrate example visualizations generated by a reporting application in accordance with the disclosed embodiments.
Figure 16:
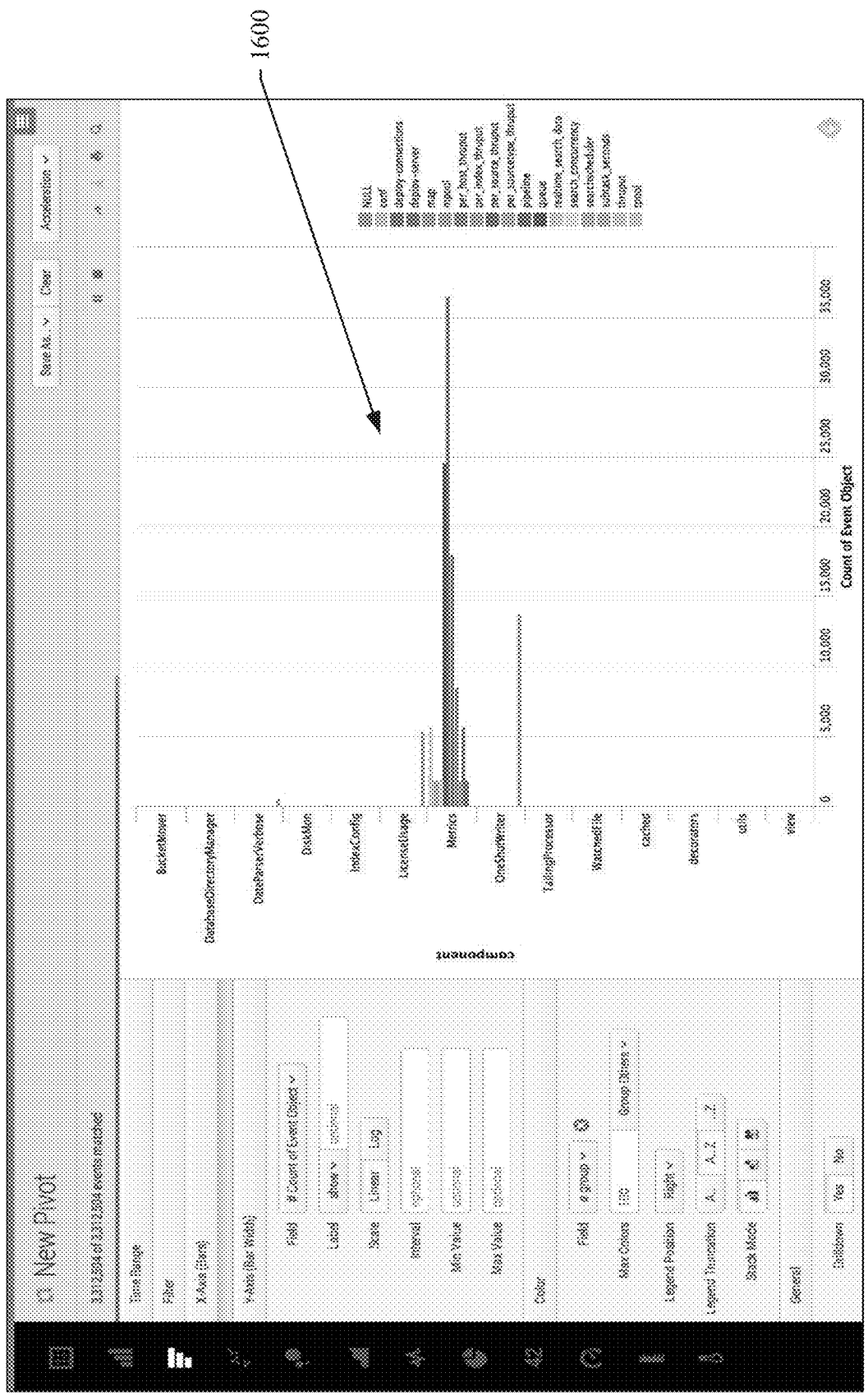
Figure 17:
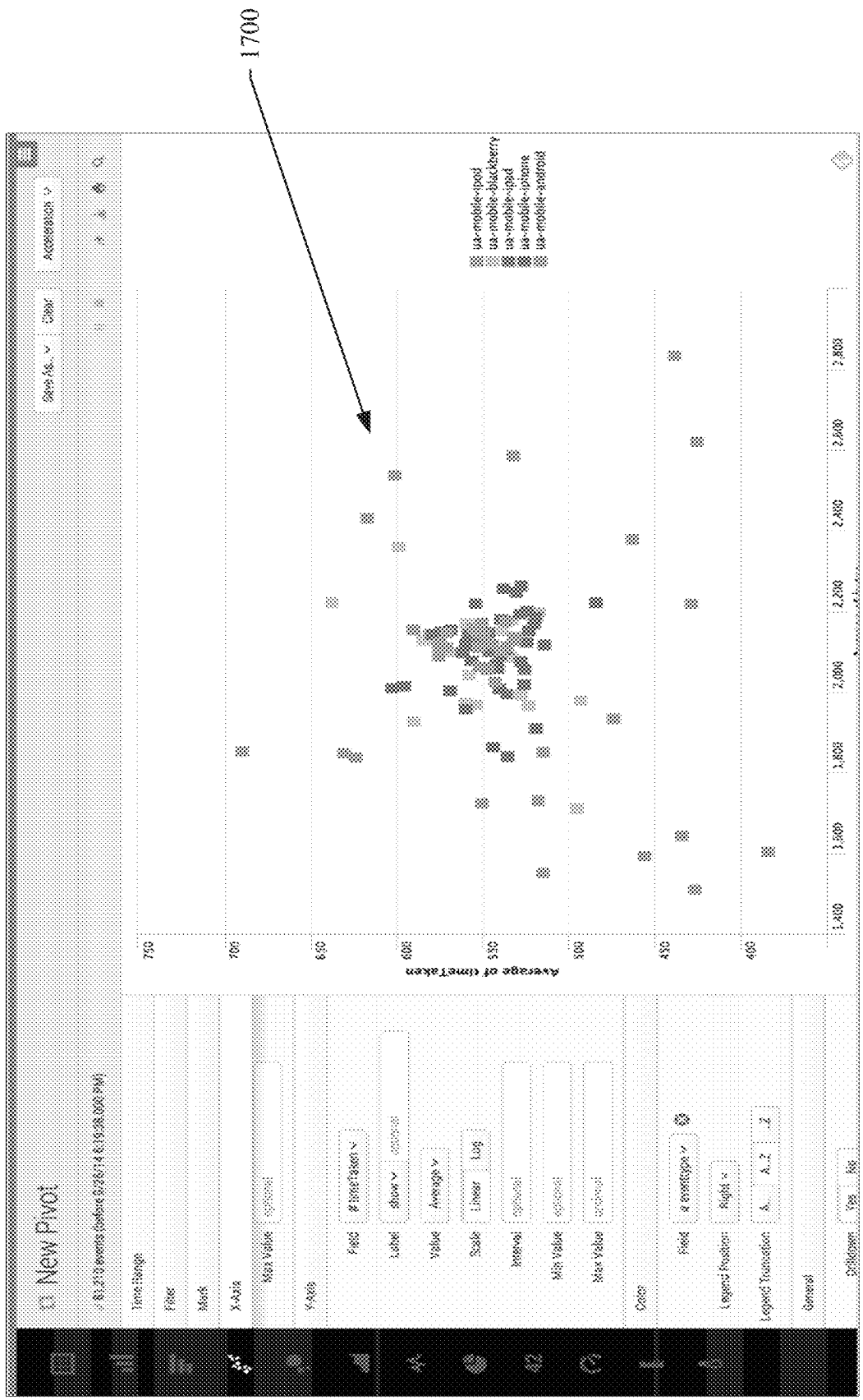

The reporting application allows the user to create graphical visualizations of the statistics generated for a report. For example, FIG. 15 illustrates an example graphical user interface 1500 that displays a set of components and associated statistics 1501. The reporting application allows the user to select a visualization of the statistics in a graph (e.g., bar chart, scatter plot, area chart, line chart, pie chart, radial gauge, marker gauge, filler gauge, etc.). FIG. 16 illustrates an example of a bar chart visualization 1600 of an aspect of the statistical data 1501. FIG. 17 illustrates a scatter plot visualization 1700 of an aspect of the statistical data 1501.

2.10. Acceleration Technique

The above-described system provides significant flexibility by enabling a user to analyze massive quantities of minimally processed data "on the fly" at search time instead of storing pre-specified portions of the data in a database at ingestion time. This flexibility enables a user to see valuable insights, correlate data, and perform subsequent queries to examine interesting aspects of the data that may not have been apparent at ingestion time.

However, performing extraction and analysis operations at search time can involve a large amount of data and require a large number of computational operations, which can cause delays in processing the queries. Advantageously, SPLUNK® ENTERPRISE system employs a number of unique acceleration techniques that have been developed to speed up analysis operations performed at search time. These techniques include: (1) performing search operations in parallel across multiple indexers; (2) using a keyword index; (3) using a high performance analytics store; and (4) accelerating the process of generating reports. These novel techniques are described in more detail below.

2.10.1. Aggregation Technique

Figure 8:
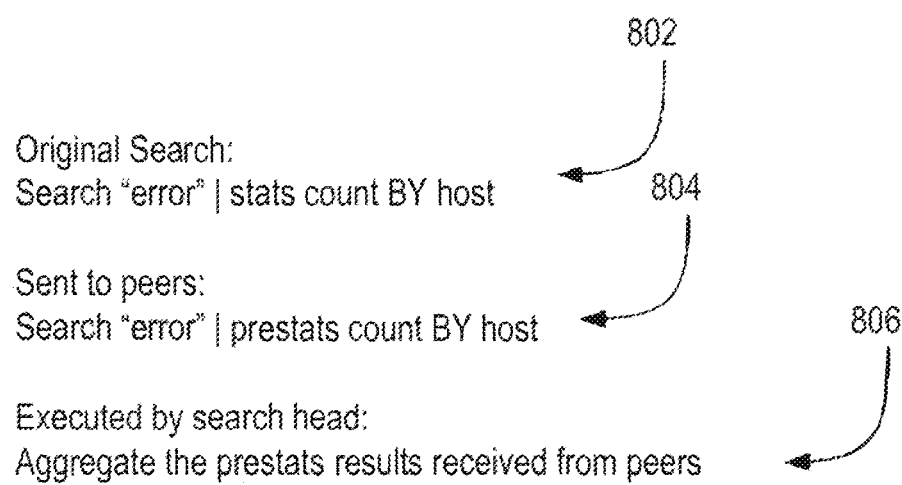
FIG. 8 illustrates an example search query received from a client and executed by search peers in accordance with the disclosed embodiments.

To facilitate faster query processing, a query can be structured such that multiple indexers perform the query in parallel, while aggregation of search results from the multiple indexers is performed locally at the search head. For example, FIG. 8 illustrates how a search query 802 received from a client at a search head 210 can split into two phases, including: (1) subtasks 804 (e.g., data retrieval or simple filtering) that may be performed in parallel by indexers 206 for execution, and (2) a search results aggregation operation 806 to be executed by the search head when the results are ultimately collected from the indexers.

During operation, upon receiving search query 802, a search head 210 determines that a portion of the operations involved with the search query may be performed locally by the search head. The search head modifies search query 802 by substituting "stats" (create aggregate statistics over results sets received from the indexers at the search head) with "prestats" (create statistics by the indexer from local results set) to produce search query 804, and then distributes search query 804 to distributed indexers, which are also referred to as "search peers." Note that search queries may generally specify search criteria or operations to be performed on events that meet the search criteria. Search queries may also specify field names, as well as search criteria for the values in the fields or operations to be performed on the values in the fields. Moreover, the search head may distribute the full search query to the search peers as illustrated in FIG. 4, or may alternatively distribute a modified version (e.g., a more restricted version) of the search query to the search peers. In this example, the indexers are responsible for producing the results and sending them to the search head. After the indexers return the results to the search head, the search head aggregates the received results 806 to form a single search result set. By executing the query in this manner, the system effectively distributes the computational operations across the indexers while minimizing data transfers.

2.10.2. Keyword Index

As described above with reference to the flow charts in FIG. 3 and FIG. 4, data intake and query system 108 can construct and maintain one or more keyword indices to quickly identify events containing specific keywords. This technique can greatly speed up the processing of queries involving specific keywords. As mentioned above, to build a keyword index, an indexer first identifies a set of keywords. Then, the indexer includes the identified keywords in an index, which associates each stored keyword with references to events containing that keyword, or to locations within events where that keyword is located. When an indexer subsequently receives a keyword-based query, the indexer can access the keyword index to quickly identify events containing the keyword.

2.10.3. High Performance Analytics Store

To speed up certain types of queries, some embodiments of system 108 create a high performance analytics store, which is referred to as a "summarization table," that contains entries for specific field-value pairs. Each of these entries keeps track of instances of a specific value in a specific field in the event data and includes references to events containing the specific value in the specific field. For example, an example entry in a summarization table can keep track of occurrences of the value "94107" in a "ZIP code" field of a set of events and the entry includes references to all of the events that contain the value "94107" in the ZIP code field. This optimization technique enables the system to quickly process queries that seek to determine how many events have a particular value for a particular field. To this end, the system can examine the entry in the summarization table to count instances of the specific value in the field without having to go through the individual events or perform data extractions at search time. Also, if the system needs to process all events that have a specific field-value combination, the system can use the references in the summarization table entry to directly access the events to extract further information without having to search all of the events to find the specific field-value combination at search time.

In some embodiments, the system maintains a separate summarization table for each of the above-described time-specific buckets that stores events for a specific time range. A bucket-specific summarization table includes entries for specific field-value combinations that occur in events in the specific bucket. Alternatively, the system can maintain a separate summarization table for each indexer. The indexer-specific summarization table includes entries for the events in a data store that are managed by the specific indexer. Indexer-specific summarization tables may also be bucket-specific.

The summarization table can be populated by running a periodic query that scans a set of events to find instances of a specific field-value combination, or alternatively instances of all field-value combinations for a specific field. A periodic query can be initiated by a user, or can be scheduled to occur automatically at specific time intervals. A periodic query can also be automatically launched in response to a query that asks for a specific field-value combination.

In some cases, when the summarization tables may not cover all of the events that are relevant to a query, the system can use the summarization tables to obtain partial results for the events that are covered by summarization tables, but may also have to search through other events that are not covered by the summarization tables to produce additional results. These additional results can then be combined with the partial results to produce a final set of results for the query. The summarization table and associated techniques are described in more detail in U.S. Pat. No. 8,682,925, entitled "DISTRIBUTED HIGH PERFORMANCE ANALYTICS STORE", issued on 25 Mar. 2014, U.S. patent application Ser. No. 14/170,159, entitled "SUPPLEMENTING A HIGH PERFORMANCE ANALYTICS STORE WITH EVALUATION OF INDIVIDUAL EVENTS TO RESPOND TO AN EVENT QUERY", filed on 31 Jan. 2014, and U.S. patent application Ser. No. 14/815,973, entitled "STORAGE MEDIUM AND CONTROL DEVICE", filed on 21 Feb. 2014, each of which is hereby incorporated by reference in its entirety.

2.10.4. Accelerating Report Generation

In some embodiments, a data server system such as the SPLUNK® ENTERPRISE system can accelerate the process of periodically generating updated reports based on query results. To accelerate this process, a summarization engine automatically examines the query to determine whether generation of updated reports can be accelerated by creating intermediate summaries. If reports can be accelerated, the summarization engine periodically generates a summary covering data obtained during a latest non-overlapping time period. For example, where the query seeks events meeting a specified criteria, a summary for the time period includes only events within the time period that meet the specified criteria. Similarly, if the query seeks statistics calculated from the events, such as the number of events that match the specified criteria, then the summary for the time period includes the number of events in the period that match the specified criteria.

In addition to the creation of the summaries, the summarization engine schedules the periodic updating of the report associated with the query. During each scheduled report update, the query engine determines whether intermediate summaries have been generated covering portions of the time period covered by the report update. If so, then the report is generated based on the information contained in the summaries. Also, if additional event data has been received and has not yet been summarized, and is required to generate the complete report, the query can be run on this additional event data. Then, the results returned by this query on the additional event data, along with the partial results obtained from the intermediate summaries, can be combined to generate the updated report. This process is repeated each time the report is updated. Alternatively, if the system stores events in buckets covering specific time ranges, then the summaries can be generated on a bucket-by-bucket basis. Note that producing intermediate summaries can save the work involved in re-running the query for previous time periods, so advantageously only the newer event data needs to be processed while generating an updated report. These report acceleration techniques are described in more detail in U.S. Pat. No. 8,589,403, entitled "COMPRESSED JOURNALING IN EVENT TRACKING FILES FOR METADATA RECOVERY AND REPLICATION", issued on 19 Nov. 2013, U.S. Pat. No. 8,412,696, entitled "REAL TIME SEARCHING AND REPORTING", issued on 2 Apr. 2011, and U.S. Pat. Nos. 8,589,375 and 8,589,432, both also entitled "REAL TIME SEARCHING AND REPORTING", both issued on 19 Nov. 2013, each of which is hereby incorporated by reference in its entirety.

2.11. Security Features

The SPLUNK® ENTERPRISE platform provides various schemas, dashboards and visualizations that simplify developers' task to create applications with additional capabilities. One such application is the SPLUNK® APP FOR ENTERPRISE SECURITY, which performs monitoring and alerting operations and includes analytics to facilitate identifying both known and unknown security threats based on large volumes of data stored by the SPLUNK® ENTERPRISE system. SPLUNK® APP FOR ENTERPRISE SECURITY provides the security practitioner with visibility into security-relevant threats found in the enterprise infrastructure by capturing, monitoring, and reporting on data from enterprise security devices, systems, and applications. Through the use of SPLUNK® ENTERPRISE searching and reporting capabilities, SPLUNK® APP FOR ENTERPRISE SECURITY provides a top-down and bottom-up view of an organization's security posture.

The SPLUNK® APP FOR ENTERPRISE SECURITY leverages SPLUNK® ENTERPRISE search-time normalization techniques, saved searches, and correlation searches to provide visibility into security-relevant threats and activity and generate notable events for tracking. The App enables the security practitioner to investigate and explore the data to find new or unknown threats that do not follow signature-based patterns.

Conventional Security Information and Event Management (SIEM) systems that lack the infrastructure to effectively store and analyze large volumes of security-related data. Traditional SIEM systems typically use fixed schemas to extract data from pre-defined security-related fields at data ingestion time and storing the extracted data in a relational database. This traditional data extraction process (and associated reduction in data size) that occurs at data ingestion time inevitably hampers future incident investigations that may need original data to determine the root cause of a security issue, or to detect the onset of an impending security threat.

In contrast, the SPLUNK® APP FOR ENTERPRISE SECURITY system stores large volumes of minimally processed security-related data at ingestion time for later retrieval and analysis at search time when a live security threat is being investigated. To facilitate this data retrieval process, the SPLUNK® APP FOR ENTERPRISE SECURITY provides pre-specified schemas for extracting relevant values from the different types of security-related event data and enables a user to define such schemas.

The SPLUNK® APP FOR ENTERPRISE SECURITY can process many types of security-related information. In general, this security-related information can include any information that can be used to identify security threats. For example, the security-related information can include network-related information, such as IP addresses, domain names, asset identifiers, network traffic volume, uniform resource locator strings, and source addresses. The process of detecting security threats for network-related information is further described in U.S. Pat. No. 8,826,434, entitled "SECURITY THREAT DETECTION BASED ON INDICATIONS IN BIG DATA OF ACCESS TO NEWLY REGISTERED DOMAINS", issued on 2 Sep. 2014, U.S. patent application Ser. No. 13/956,252, entitled "INVESTIGATIVE AND DYNAMIC DETECTION OF POTENTIAL SECURITY-THREAT INDICATORS FROM EVENTS IN BIG DATA", filed on 31 Jul. 2013, U.S. patent application Ser. No. 14/445,018, entitled "GRAPHIC DISPLAY OF SECURITY THREATS BASED ON INDICATIONS OF ACCESS TO NEWLY REGISTERED DOMAINS", filed on 28 Jul. 2014, U.S. patent application Ser. No. 14/445,023, entitled "SECURITY THREAT DETECTION OF NEWLY REGISTERED DOMAINS", filed on 28 Jul. 2014, U.S. patent application Ser. No. 14/815,971, entitled "SECURITY THREAT DETECTION USING DOMAIN NAME ACCESSES", filed on 1 Aug. 2015, and U.S. patent application Ser. No. 14/815,972, entitled "SECURITY THREAT DETECTION USING DOMAIN NAME REGISTRATIONS", filed on 1 Aug. 2015, each of which is hereby incorporated by reference in its entirety for all purposes. Security-related information can also include malware infection data and system configuration information, as well as access control information, such as login/logout information and access failure notifications. The security-related information can originate from various sources within a data center, such as hosts, virtual machines, storage devices and sensors. The security-related information can also originate from various sources in a network, such as routers, switches, email servers, proxy servers, gateways, firewalls and intrusion-detection systems.

During operation, the SPLUNK® APP FOR ENTERPRISE SECURITY facilitates detecting "notable events" that are likely to indicate a security threat. These notable events can be detected in a number of ways: (1) a user can notice a correlation in the data and can manually identify a corresponding group of one or more events as "notable;" or (2) a user can define a "correlation search" specifying criteria for a notable event, and every time one or more events satisfy the criteria, the application can indicate that the one or more events are notable. A user can alternatively select a pre-defined correlation search provided by the application. Note that correlation searches can be run continuously or at regular intervals (e.g., every hour) to search for notable events. Upon detection, notable events can be stored in a dedicated "notable events index," which can be subsequently accessed to generate various visualizations containing security-related information. Also, alerts can be generated to notify system operators when important notable events are discovered.

Figure 9A:
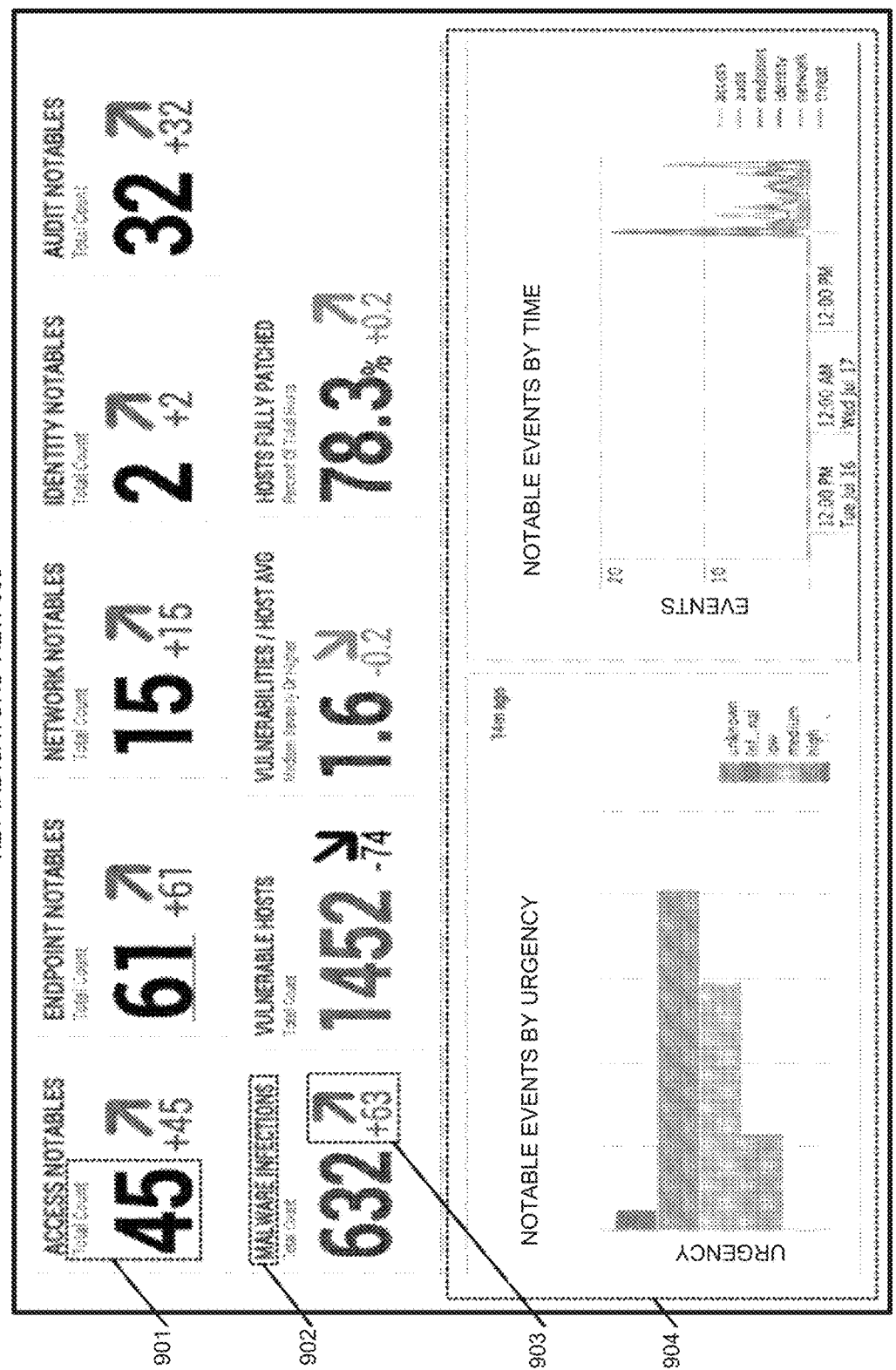
FIG. 9A illustrates a key indicators view in accordance with the disclosed embodiments.

The SPLUNK® APP FOR ENTERPRISE SECURITY provides various visualizations to aid in discovering security threats, such as a "key indicators view" that enables a user to view security metrics, such as counts of different types of notable events. For example, FIG. 9A illustrates an example key indicators view 900 that comprises a dashboard, which can display a value 901, for various security-related metrics, such as malware infections 902. It can also display a change in a metric value 903, which indicates that the number of malware infections increased by 63 during the preceding interval. Key indicators view 900 additionally displays a histogram panel 904 that displays a histogram of notable events organized by urgency values, and a histogram of notable events organized by time intervals. This key indicators view is described in further detail in pending U.S. patent application Ser. No. 13/956,338, entitled "KEY INDICATORS VIEW", filed on 31 Jul. 2013, and which is hereby incorporated by reference in its entirety for all purposes.

Figure 9B:
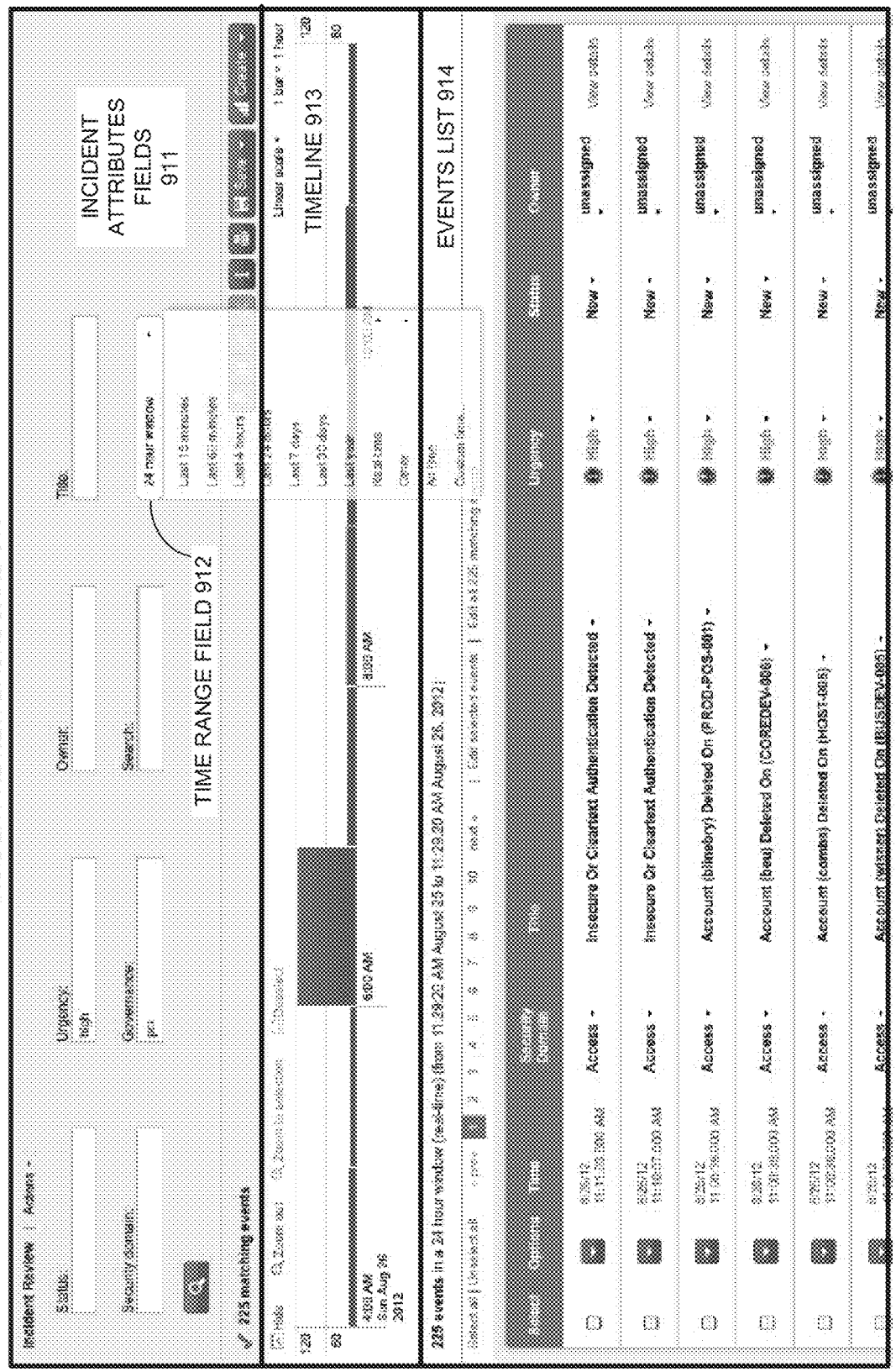
FIG. 9B illustrates an incident review dashboard in accordance with the disclosed embodiments.

These visualizations can also include an "incident review dashboard" that enables a user to view and act on "notable events." These notable events can include: (1) a single event of high importance, such as any activity from a known web attacker; or (2) multiple events that collectively warrant review, such as a large number of authentication failures on a host followed by a successful authentication. For example, FIG. 9B illustrates an example incident review dashboard 910 that includes a set of incident attribute fields 911 that, for example, enables a user to specify a time range field 912 for the displayed events. It also includes a timeline 913 that graphically illustrates the number of incidents that occurred in time intervals over the selected time range. It additionally displays an events list 914 that enables a user to view a list of all of the notable events that match the criteria in the incident attributes fields 911. To facilitate identifying patterns among the notable events, each notable event can be associated with an urgency value (e.g., low, medium, high, critical), which is indicated in the incident review dashboard. The urgency value for a detected event can be determined based on the severity of the event and the priority of the system component associated with the event.

2.12. Data Center Monitoring

As mentioned above, the SPLUNK® ENTERPRISE platform provides various features that simplify the developer's task to create various applications. One such application is SPLUNK® APP FOR VMWARE® that provides operational visibility into granular performance metrics, logs, tasks and events, and topology from hosts, virtual machines and virtual centers. It empowers administrators with an accurate real-time picture of the health of the environment, proactively identifying performance and capacity bottlenecks.

Conventional data-center-monitoring systems lack the infrastructure to effectively store and analyze large volumes of machine-generated data, such as performance information and log data obtained from the data center. In conventional data-center-monitoring systems, machine-generated data is typically pre-processed prior to being stored, for example, by extracting pre-specified data items and storing them in a database to facilitate subsequent retrieval and analysis at search time. However, the rest of the data is not saved and discarded during pre-processing.

In contrast, the SPLUNK® APP FOR VMWARE® stores large volumes of minimally processed machine data, such as performance information and log data, at ingestion time for later retrieval and analysis at search time when a live performance issue is being investigated. In addition to data obtained from various log files, this performance-related information can include values for performance metrics obtained through an application programming interface (API) provided as part of the vSphere Hypervisor™ system distributed by VMware, Inc. of Palo Alto, California. For example, these performance metrics can include: (1) CPU-related performance metrics; (2) disk-related performance metrics; (3) memory-related performance metrics; (4) network-related performance metrics; (5) energy-usage statistics; (6) data-traffic-related performance metrics; (7) overall system availability performance metrics; (8) cluster-related performance metrics; and (9) virtual machine performance statistics. Such performance metrics are described in U.S. patent application Ser. No. 14/167,316, entitled "CORRELATION FOR USER-SELECTED TIME RANGES OF VALUES FOR PERFORMANCE METRICS OF COMPONENTS IN AN INFORMATION-TECHNOLOGY ENVIRONMENT WITH LOG DATA FROM THAT INFORMATION-TECHNOLOGY ENVIRONMENT", filed on 29 Jan. 2014, and which is hereby incorporated by reference in its entirety for all purposes.

To facilitate retrieving information of interest from performance data and log files, the SPLUNK® APP FOR VMWARE® provides pre-specified schemas for extracting relevant values from different types of performance-related event data, and also enables a user to define such schemas.

Figure 9C:
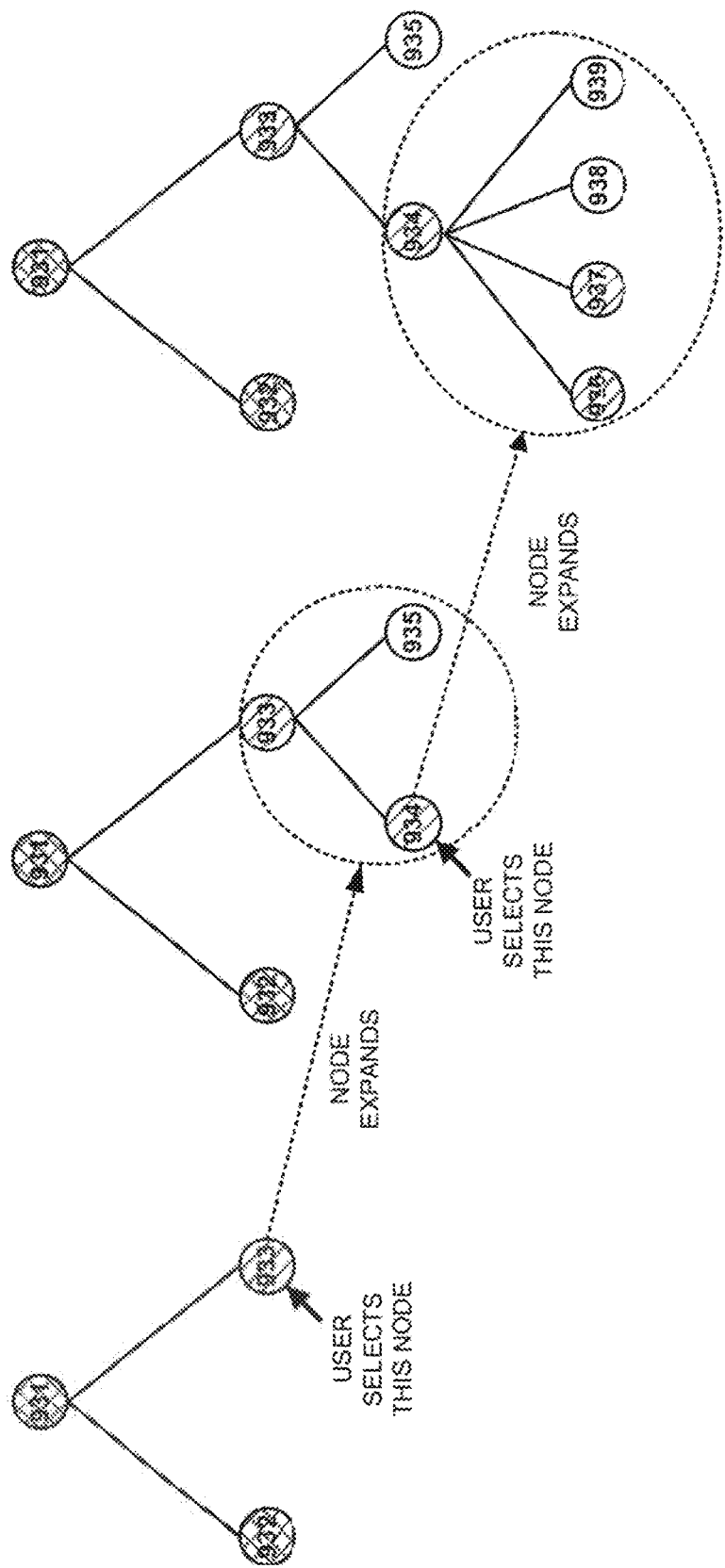
FIG. 9C illustrates a proactive monitoring tree in accordance with the disclosed embodiments.

The SPLUNK® APP FOR VMWARE® additionally provides various visualizations to facilitate detecting and diagnosing the root cause of performance problems. For example, one such visualization is a "proactive monitoring tree" that enables a user to easily view and understand relationships among various factors that affect the performance of a hierarchically structured computing system. This proactive monitoring tree enables a user to easily navigate the hierarchy by selectively expanding nodes representing various entities (e.g., virtual centers or computing clusters) to view performance information for lower-level nodes associated with lower-level entities (e.g., virtual machines or host systems). Example node-expansion operations are illustrated in FIG. 9C, wherein nodes 933 and 934 are selectively expanded. Note that nodes 931-939 can be displayed using different patterns or colors to represent different performance states, such as a critical state, a warning state, a normal state or an unknown/offline state. The ease of navigation provided by selective expansion in combination with the associated performance-state information enables a user to quickly diagnose the root cause of a performance problem. The proactive monitoring tree is described in further detail in U.S. patent application Ser. No. 14/253,490, entitled "PROACTIVE MONITORING TREE WITH SEVERITY STATE SORTING", filed on 15 Apr. 2014, and U.S. patent application Ser. No. 14/812,948, also entitled "PROACTIVE MONITORING TREE WITH SEVERITY STATE SORTING", filed on 29 Jul. 2015, each of which is hereby incorporated by reference in its entirety for all purposes.

Figure 9D:
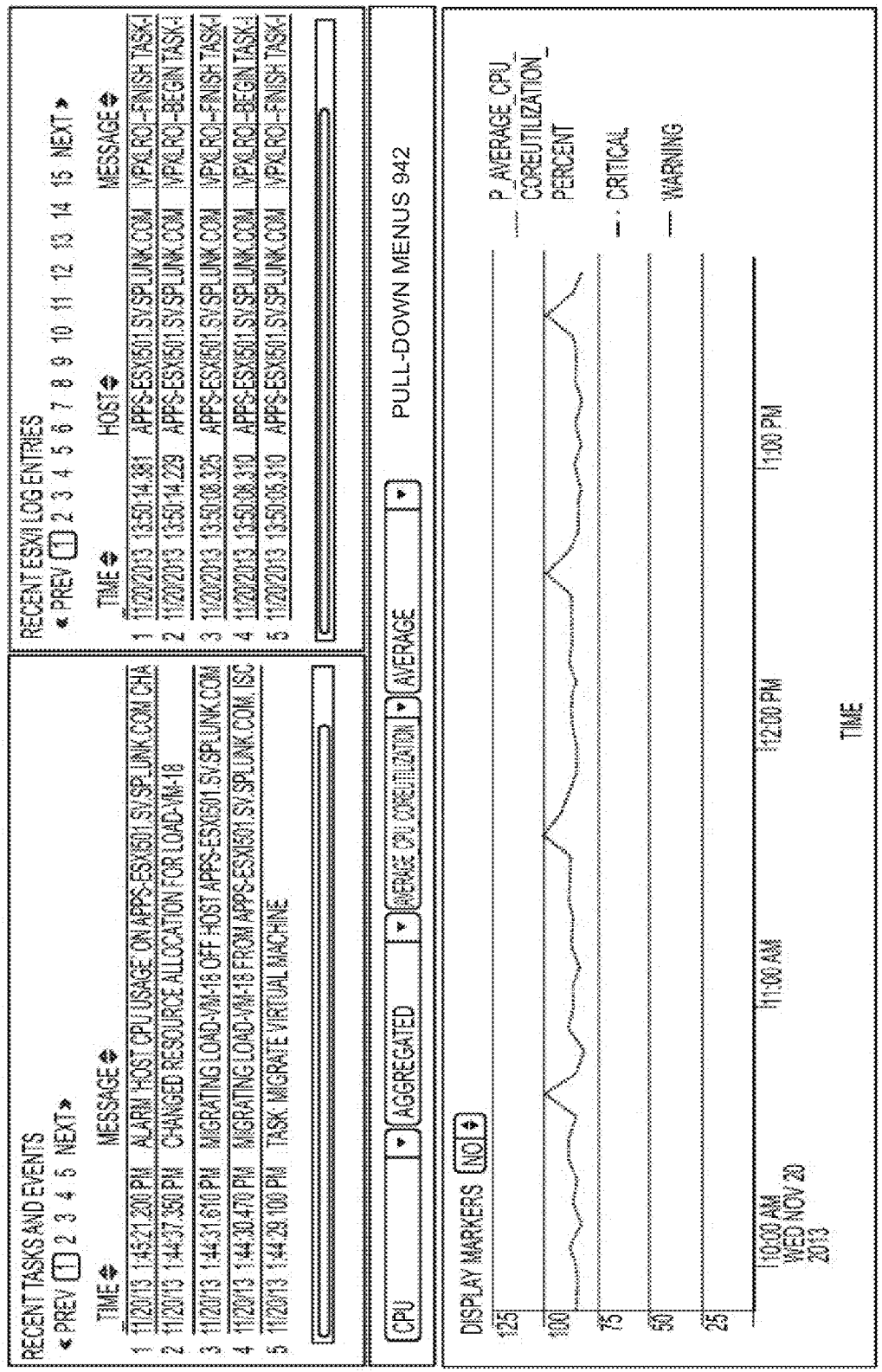
FIG. 9D illustrates a user interface screen displaying both log data and performance data in accordance with the disclosed embodiments.

The SPLUNK® APP FOR VMWARE® also provides a user interface that enables a user to select a specific time range and then view heterogeneous data comprising events, log data, and associated performance metrics for the selected time range. For example, the screen illustrated in FIG. 9D displays a listing of recent "tasks and events" and a listing of recent "log entries" for a selected time range above a performance-metric graph for "average CPU core utilization" for the selected time range. Note that a user is able to operate pull-down menus 942 to selectively display different performance metric graphs for the selected time range. This enables the user to correlate trends in the performance-metric graph with corresponding event and log data to quickly determine the root cause of a performance problem. This user interface is described in more detail in U.S. patent application Ser. No. 14/167,316, entitled "CORRELATION FOR USER-SELECTED TIME RANGES OF VALUES FOR PERFORMANCE METRICS OF COMPONENTS IN AN INFORMATION-TECHNOLOGY ENVIRONMENT WITH LOG DATA FROM THAT INFORMATION-TECH- NOLOGY ENVIRONMENT", filed on 29 Jan. 2014, and which is hereby incorporated by reference in its entirety for all purposes.

2.13. Cloud-Based System Overview

The example data intake and query system 108 described in reference to FIG. 2 comprises several system components, including one or more forwarders, indexers, and search heads. In some environments, a user of a data intake and query system 108 may install and configure, on computing devices owned and operated by the user, one or more software applications that implement some or all of these system components. For example, a user may install a software application on server computers owned by the user and configure each server to operate as one or more of a forwarder, an indexer, a search head, etc. This arrangement generally may be referred to as an "on-premises" solution. That is, the system 108 is installed and operates on computing devices directly controlled by the user of the system. Some users may prefer an on-premises solution because it may provide a greater level of control over the configuration of certain aspects of the system (e.g., security, privacy, standards, controls, etc.). However, other users may instead prefer an arrangement in which the user is not directly responsible for providing and managing the computing devices upon which various components of system 108 operate.

In one embodiment, to provide an alternative to an entirely on-premises environment for system 108, one or more of the components of a data intake and query system instead may be provided as a cloud-based service. In this context, a cloud-based service refers to a service hosted by one more computing resources that are accessible to end users over a network, for example, by using a web browser or other application on a client device to interface with the remote computing resources. For example, a service provider may provide a cloud-based data intake and query system by managing computing resources configured to implement various aspects of the system (e.g., forwarders, indexers, search heads, etc.) and by providing access to the system to end users via a network. Typically, a user may pay a subscription or other fee to use such a service. Each subscribing user of the cloud-based service may be provided with an account that enables the user to configure a customized cloud-based system based on the user's preferences.

Figure 10:
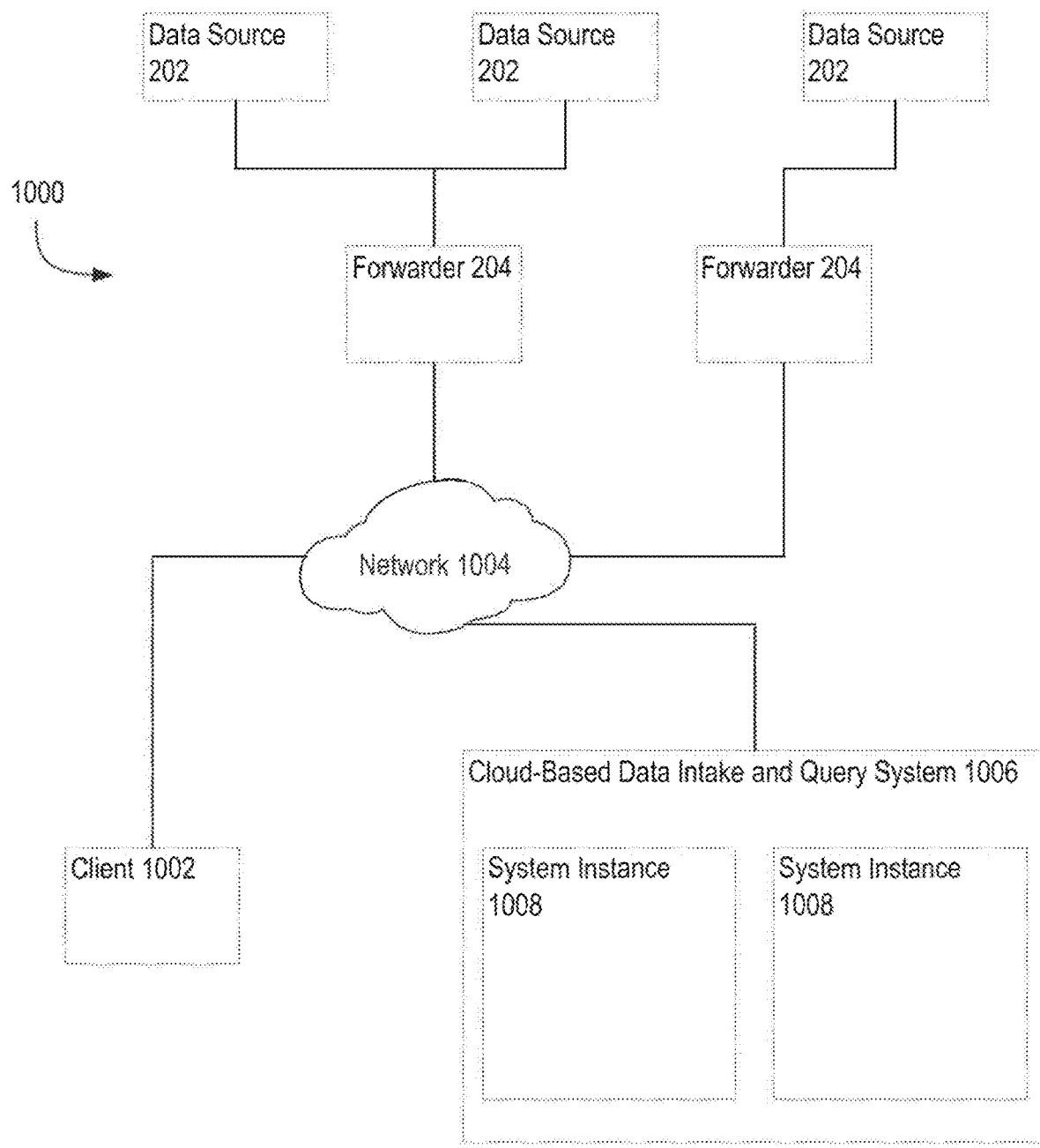
FIG. 10 illustrates a block diagram of an example cloud-based data intake and query system in which an embodiment may be implemented.

FIG. 10 illustrates a block diagram of an example cloud-based data intake and query system. Similar to the system of FIG. 2, the networked computer system 1000 includes input data sources 202 and forwarders 204. These input data sources and forwarders may be in a subscriber's private computing environment. Alternatively, they might be directly managed by the service provider as part of the cloud service. In the example system 1000, one or more forwarders 204 and client devices 1002 are coupled to a cloud-based data intake and query system 1006 via one or more networks 1004. Network 1004 broadly represents one or more LANs, WANs, cellular networks, intranetworks, internetworks, etc., using any of wired, wireless, terrestrial microwave, satellite links, etc., and may include the public Internet, and is used by client devices 1002 and forwarders 204 to access the system 1006. Similar to the system of 108, each of the forwarders 204 may be configured to receive data from an input source and to forward the data to other components of the system 1006 for further processing.

In an embodiment, a cloud-based data intake and query system 1006 may comprise a plurality of system instances 1008. In general, each system instance 1008 may include one or more computing resources managed by a provider of the cloud-based system 1006 made available to a particular subscriber. The computing resources comprising a system instance 1008 may, for example, include one or more servers or other devices configured to implement one or more forwarders, indexers, search heads, and other components of a data intake and query system, similar to system 108. As indicated above, a subscriber may use a web browser or other application of a client device 1002 to access a web portal or other interface that enables the subscriber to configure an instance 1008.

Providing a data intake and query system as described in reference to system 108 as a cloud-based service presents a number of challenges. Each of the components of a system 108 (e.g., forwarders, indexers and search heads) may at times refer to various configuration files stored locally at each component. These configuration files typically may involve some level of user configuration to accommodate particular types of data a user desires to analyze and to account for other user preferences. However, in a cloud-based service context, users typically may not have direct access to the underlying computing resources implementing the various system components (e.g., the computing resources comprising each system instance 1008) and may desire to make such configurations indirectly, for example, using one or more web-based interfaces. Thus, the techniques and systems described herein for providing user interfaces that enable a user to configure source type definitions are applicable to both on-premises and cloud-based service contexts, or some combination thereof (e.g., a hybrid system where both an on-premises environment such as SPLUNK® ENTERPRISE and a cloud-based environment such as SPLUNK CLOUD™ are centrally visible).

2.14. Searching Externally Archived Data

Figure 11:
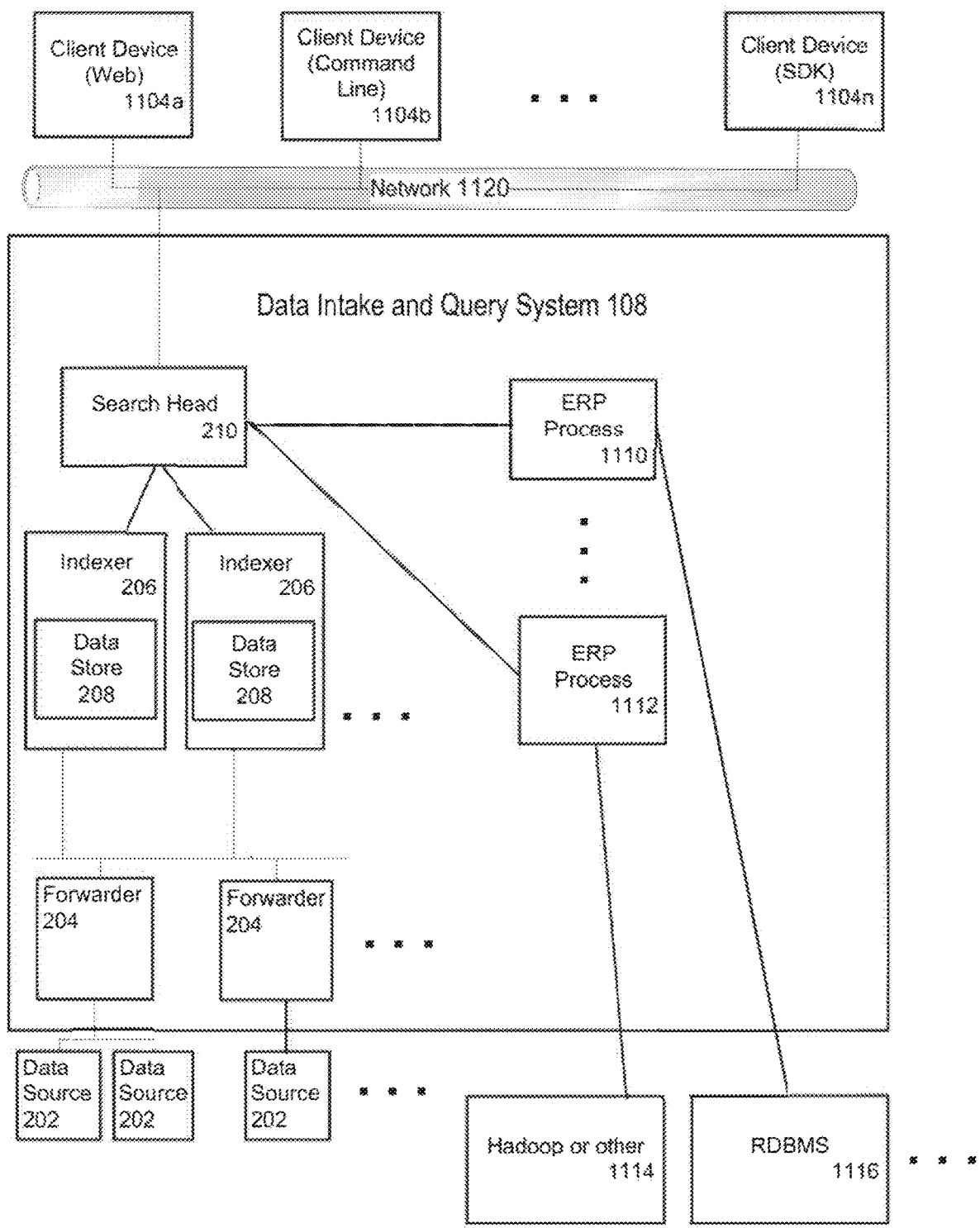
FIG. 11 illustrates a block diagram of an example data intake and query system that performs searches across external data systems in accordance with the disclosed embodiments.

FIG. 11 shows a block diagram of an example of a data intake and query system 108 that provides transparent search facilities for data systems that are external to the data intake and query system. Such facilities are available in the HUNK® system provided by Splunk Inc. of San Francisco, California. HUNK® represents an analytics platform that enables business and IT teams to rapidly explore, analyze, and visualize data in Hadoop and NoSQL data stores.

The search head 210 of the data intake and query system receives search requests from one or more client devices 1104 over network connections 1120. As discussed above, the data intake and query system 108 may reside in an enterprise location, in the cloud, etc. FIG. 11 illustrates that multiple client devices 1104a, 1104b, . . . , 1104n may communicate with the data intake and query system 108. The client devices 1104 may communicate with the data intake and query system using a variety of connections. For example, one client device in FIG. 11 is illustrated as communicating over an Internet (Web) protocol, another client device is illustrated as communicating via a command line interface, and another client device is illustrated as communicating via a system developer kit (SDK).

The search head 210 analyzes the received search request to identify request parameters. If a search request received from one of the client devices 1104 references an index maintained by the data intake and query system, then the search head 210 connects to one or more indexers 206 of the data intake and query system for the index referenced in the request parameters. That is, if the request parameters of the search request reference an index, then the search head accesses the data in the index via the indexer. The data intake and query system 108 may include one or more indexers 206, depending on system access resources and requirements. As described further below, the indexers 206 retrieve data from their respective local data stores 208 as specified in the search request. The indexers and their respective data stores can comprise one or more storage devices and typically reside on the same system, though they may be connected via a local network connection.

If the request parameters of the received search request reference an external data collection, which is not accessible to the indexers 206 or under the management of the data intake and query system, then the search head 210 can access the external data collection through an External Result Provider (ERP) process 1110. An external data collection may be referred to as a "virtual index" (plural, "virtual indices"). An ERP process provides an interface through which the search head 210 may access virtual indices.

Thus, a search reference to an index of the system relates to a locally stored and managed data collection. In contrast, a search reference to a virtual index relates to an externally stored and managed data collection, which the search head may access through one or more ERP processes 1110, 1112. FIG. 11 shows two ERP processes 1110, 1112 that connect to respective remote (external) virtual indices, which are indicated as a Hadoop or another system 1114 (e.g., Amazon S3, Amazon EMR, other Hadoop Compatible File Systems (HCFS), etc.) and a relational database management system (RDBMS) 1116. Other virtual indices may include other file organizations and protocols, such as Structured Query Language (SQL) and the like. The ellipses between the ERP processes 1110, 1112 indicate optional additional ERP processes of the data intake and query system 108. An ERP process may be a computer process that is initiated or spawned by the search head 210 and is executed by the search data intake and query system 108. Alternatively or additionally, an ERP process may be a process spawned by the search head 210 on the same or different host system as the search head 210 resides.

The search head 210 may spawn a single ERP process in response to multiple virtual indices referenced in a search request, or the search head may spawn different ERP processes for different virtual indices. Generally, virtual indices that share common data configurations or protocols may share ERP processes. For example, all search query references to a Hadoop file system may be processed by the same ERP process, if the ERP process is suitably configured. Likewise, all search query references to an SQL database may be processed by the same ERP process. In addition, the search head may provide a common ERP process for common external data source types (e.g., a common vendor may utilize a common ERP process, even if the vendor includes different data storage system types, such as Hadoop and SQL). Common indexing schemes also may be handled by common ERP processes, such as flat text files or Weblog files.

The search head 210 determines the number of ERP processes to be initiated via the use of configuration parameters that are included in a search request message. Generally, there is a one-to-many relationship between an external results provider "family" and ERP processes. There is also a one-to-many relationship between an ERP process and corresponding virtual indices that are referred to in a search request. For example, using RDBMS, assume two independent instances of such a system by one vendor, such as one RDBMS for production and another RDBMS used for development. In such a situation, it is likely preferable (but optional) to use two ERP processes to maintain the independent operation as between production and development data. Both of the ERPs, however, will belong to the same family, because the two RDBMS system types are from the same vendor.

The ERP processes 1110, 1112 receive a search request from the search head 210. The search head may optimize the received search request for execution at the respective external virtual index. Alternatively, the ERP process may receive a search request as a result of analysis performed by the search head or by a different system process. The ERP processes 1110, 1112 can communicate with the search head 210 via conventional input/output routines (e.g., standard in/standard out, etc.). In this way, the ERP process receives the search request from a client device such that the search request may be efficiently executed at the corresponding external virtual index.

The ERP processes 1110, 1112 may be implemented as a process of the data intake and query system. Each ERP process may be provided by the data intake and query system, or may be provided by process or application providers who are independent of the data intake and query system. Each respective ERP process may include an interface application installed at a computer of the external result provider that ensures proper communication between the search support system and the external result provider. The ERP processes 1110, 1112 generate appropriate search requests in the protocol and syntax of the respective virtual indices 1114, 1116, each of which corresponds to the search request received by the search head 210. Upon receiving search results from their corresponding virtual indices, the respective ERP process passes the result to the search head 210, which may return or display the results or a processed set of results based on the returned results to the respective client device.

Client devices 1104 may communicate with the data intake and query system 108 through a network interface 1120, e.g., one or more LANs, WANs, cellular networks, intranetworks, and/or internetworks using any of wired, wireless, terrestrial microwave, satellite links, etc., and may include the public Internet.

The analytics platform utilizing the External Result Provider process described in more detail in U.S. Pat. No. 8,738,629, entitled "EXTERNAL RESULT PROVIDED PROCESS FOR RETRIEVING DATA STORED USING A DIFFERENT CONFIGURATION OR PROTOCOL", issued on 27 May 2014, U.S. Pat. No. 8,738,587, entitled "PROCESSING A SYSTEM SEARCH REQUEST BY RETRIEVING RESULTS FROM BOTH A NATIVE INDEX AND A VIRTUAL INDEX", issued on 25 Jul. 2013, U.S. patent application Ser. No. 14/266,832, entitled "PROCESSING A SYSTEM SEARCH REQUEST ACROSS DISPARATE DATA COLLECTION SYSTEMS", filed on 1 May 2014, and U.S. patent application Ser. No. 14/449,144, entitled "PROCESSING A SYSTEM SEARCH REQUEST INCLUDING EXTERNAL DATA SOURCES", filed on 31 Jul. 2014, each of which is hereby incorporated by reference in its entirety for all purposes.

2.14.1. ERP Process Features

The ERP processes described above may include two operation modes: a streaming mode and a reporting mode. The ERP processes can operate in streaming mode only, in reporting mode only, or in both modes simultaneously. Operating in both modes simultaneously is referred to as mixed mode operation. In a mixed mode operation, the ERP at some point can stop providing the search head with streaming results and only provide reporting results thereafter, or the search head at some point may start ignoring streaming results it has been using and only use reporting results thereafter.

The streaming mode returns search results in real time, with minimal processing, in response to the search request. The reporting mode provides results of a search request with processing of the search results prior to providing them to the requesting search head, which in turn provides results to the requesting client device. ERP operation with such multiple modes provides greater performance flexibility with regard to report time, search latency, and resource utilization.

In a mixed mode operation, both streaming mode and reporting mode are operating simultaneously. The streaming mode results (e.g., the raw data obtained from the external data source) are provided to the search head, which can then process the results data (e.g., break the raw data into events, timestamp it, filter it, etc.) and integrate the results data with the results data from other external data sources, and/or from data stores of the search head. The search head performs such processing and can immediately start returning interim (streaming mode) results to the user at the requesting client device; simultaneously, the search head is waiting for the ERP process to process the data it is retrieving from the external data source as a result of the concurrently executing reporting mode.

In some instances, the ERP process initially operates in a mixed mode, such that the streaming mode operates to enable the ERP quickly to return interim results (e.g., some of the raw or unprocessed data necessary to respond to a search request) to the search head, enabling the search head to process the interim results and begin providing to the client or search requester interim results that are responsive to the query. Meanwhile, in this mixed mode, the ERP also operates concurrently in reporting mode, processing portions of raw data in a manner responsive to the search query. Upon determining that it has results from the reporting mode available to return to the search head, the ERP may halt processing in the mixed mode at that time (or some later time) by stopping the return of data in streaming mode to the search head and switching to reporting mode only. The ERP at this point starts sending interim results in reporting mode to the search head, which in turn may then present this processed data responsive to the search request to the client or search requester. Typically the search head switches from using results from the ERP's streaming mode of operation to results from the ERP's reporting mode of operation when the higher bandwidth results from the reporting mode outstrip the amount of data processed by the search head in the ]streaming mode of ERP operation.

A reporting mode may have a higher bandwidth because the ERP does not have to spend time transferring data to the search head for processing all the raw data. In addition, the ERP may optionally direct another processor to do the processing.

The streaming mode of operation does not need to be stopped to gain the higher bandwidth benefits of a reporting mode; the search head could simply stop using the streaming mode results—and start using the reporting mode results—when the bandwidth of the reporting mode has caught up with or exceeded the amount of bandwidth provided by the streaming mode. Thus, a variety of triggers and ways to accomplish a search head's switch from using streaming mode results to using reporting mode results may be appreciated by one skilled in the art.

The reporting mode can involve the ERP process (or an external system) performing event breaking, time stamping, filtering of events to match the search query request, and calculating statistics on the results. The user can request particular types of data, such as if the search query itself involves types of events, or the search request may ask for statistics on data, such as on events that meet the search request. In either case, the search head understands the query language used in the received query request, which may be a proprietary language. One exemplary query language is Splunk Processing Language (SPL) developed by the assignee of the application, Splunk Inc. The search head typically understands how to use that language to obtain data from the indexers, which store data in a format used by the SPLUNK® Enterprise system.

The ERP processes support the search head, as the search head is not ordinarily configured to understand the format in which data is stored in external data sources such as Hadoop or SQL data systems. Rather, the ERP process performs that translation from the query submitted in the search support system's native format (e.g., SPL if SPLUNK® ENTERPRISE is used as the search support system) to a search query request format that will be accepted by the corresponding external data system. The external data system typically stores data in a different format from that of the search support system's native index format, and it utilizes a different query language (e.g., SQL or MapReduce, rather than SPL or the like).

As noted, the ERP process can operate in the streaming mode alone. After the ERP process has performed the translation of the query request and received raw results from the streaming mode, the search head can integrate the returned data with any data obtained from local data sources (e.g., native to the search support system), other external data sources, and other ERP processes (if such operations were required to satisfy the terms of the search query). An advantage of mixed mode operation is that, in addition to streaming mode, the ERP process is also executing concurrently in reporting mode. Thus, the ERP process (rather than the search head) is processing query results (e.g., performing event breaking, timestamping, filtering, possibly calculating statistics if required to be responsive to the search query request, etc.). It should be apparent to those skilled in the art that additional time is needed for the ERP process to perform the processing in such a configuration. Therefore, the streaming mode will allow the search head to start returning interim results to the user at the client device before the ERP process can complete sufficient processing to start returning any search results. The switchover between streaming and reporting mode happens when the ERP process determines that the switchover is appropriate, such as when the ERP process determines it can begin returning meaningful results from its reporting mode.

The operation described above illustrates the source of operational latency: streaming mode has low latency (immediate results) and usually has relatively low bandwidth (fewer results can be returned per unit of time). In contrast, the concurrently running reporting mode has relatively high latency (it has to perform a lot more processing before returning any results) and usually has relatively high bandwidth (more results can be processed per unit of time). For example, when the ERP process does begin returning report results, it returns more processed results than in the streaming mode, because, e.g., statistics only need to be calculated to be responsive to the search request. That is, the ERP process doesn't have to take time to first return raw data to the search head. As noted, the ERP process could be configured to operate in streaming mode alone and return just the raw data for the search head to process in a way that is responsive to the search request. Alternatively, the ERP process can be configured to operate in the reporting mode only. Also, the ERP process can be configured to operate in streaming mode and reporting mode concurrently, as described, with the ERP process stopping the transmission of streaming results to the search head when the concurrently running reporting mode has caught up and started providing results. The reporting mode does not require the processing of all raw data that is responsive to the search query request before the ERP process starts returning results; rather, the reporting mode usually performs processing of chunks of events and returns the processing results to the search head for each chunk.

For example, an ERP process can be configured to merely return the contents of a search result file verbatim, with little or no processing of results. That way, the search head performs all processing (such as parsing byte streams into events, filtering, etc.). The ERP process can be configured to perform additional intelligence, such as analyzing the search request and handling all the computation that a native search indexer process would otherwise perform. In this way, the configured ERP process provides greater flexibility in features while operating according to desired preferences, such as response latency and resource requirements.

3.1. Http Event Collector

As described herein, data may be provided from a variety of data sources. One manner of providing data to a data intake and query system may be to provide the data via a protocol such as the hypertext transfer protocol (HTTP). Although the present disclosure may describe providing data to the data intake and query system via HTTP to create events (HTTP events), it will be understood that any suitable protocol that facilitates communication with servers over a network over the internet may be implemented in accordance with the present disclosure (e.g., internet protocol (IP) events). In an embodiment as described herein, the data that is sent may be described as raw machine data. However, it will be understood that any suitable data strings (e.g., structured data, unstructured data, raw data, etc.) may be "event data" that may be sent via HTTP to create events for storage.

Raw machine data may be provided from any suitable data source with access to a network such as the internet (e.g., computers, smart phones, smart watches, connected home devices, vehicles, drones, internet of things (IOT) devices, etc.) by embedding raw machine data within HTTP messages. In some embodiments, the data intake and storage system may provide a structured methodology for providing raw machine data and associated metadata for events via HTTP. Such a structure may allow for developers to quickly and easily create applications that are capable of providing events to the system and providing metadata for event storage.

In some embodiments, the HTTP event storage system may provide for a tiered system of configuration for system settings. Although it will be understood that a tiered system may be provided in any suitable manner, in some embodiments an installation of the system may include global-level settings, token-level settings, and message-level settings. Global event settings may apply to an entire installation, and may provide the defaults that apply to all raw machine data provided to the data intake and query system for that installation. In some embodiments, some or all of the global event settings may be overridden by other tiers of event settings, such as the token-level settings or message-level settings. As is described herein, a user interface may be provided that allows a user (e.g., a system administrator) to assign the global event settings remotely, and to update those settings as desired.

In some embodiments, tokens may provide a basis for identifying an HTTP message including raw machine data as originating from an authorized user of the system. As is described herein, multiple tokens may be authorized for a single installation of a data intake and storage system. Each token may be individually configurable by a user (e.g., a system administrator), such that each individual token may provide unique event settings that are applicable to HTTP messages including that token. In this manner, a user (e.g., a system administrator) is capable of providing tokens for a variety of purposes, facilitating a large, scalable system for storing raw machine data from a variety of devices operating a variety of applications, all within a single installation of the data intake and storage system. For example, unique tokens may be provided at any suitable level of a system at which configurability is needed, for example, to different types of devices, devices from different manufacturers, for particular software applications or versions, for each unique device, or at any other suitable level at which configuration is desired. In an embodiment of a tiered HTTP event storage system, some or all of the token-level event settings may override global event settings, such that a user (e.g., a system administrator) may utilize tokens to provide customized configurations as desired.

Once the data intake and query system and tokens associated with the system are initialized and configured, raw machine data may be provided to the system by devices via HTTP messages. Although raw machine data be provided in any suitable manner, in some embodiments raw machine data may be provided in a variety of manners formats, including as raw data (e.g., sent as a message payload or provided within a URI) or within a structured messaging format. In some embodiments, a structured messaging format may include a custom JavaScript Object Notation (JSON) that provides a standardized format for providing raw machine data and event settings to the data intake and query system, as described in more detail herein. A developer may utilize any of these methods to create executable code and applications that provide raw machine data to the data intake and query system. In some embodiments, raw machine data may be provided as both raw data and within the custom JSON, allowing developers flexibility in creating applications that provide event data.

The data intake and query system may include a variety of components for receiving and processing raw machine data received via HTTP messages. In some embodiments, the system may also process data received from a variety of other sources in addition to HTTP messages as described herein, providing an integrated system for storage of a large variety of raw machine data from different types of data sources. The data intake and query system may be highly scalable, and may include any suitable storage components, as discussed herein, to support the intake and querying of events generated from raw machine data, including events generated based on raw machine data provided in HTTP messages. In some embodiments, one or more event collectors may be provided for facilitating intake and querying of events generated based on raw machine data provided in HTTP messages. An event collector may be implemented at any suitable level of the data intake and query system (e.g., at forwarders, indexers, etc.) and may include any other suitable components such as traffic load balancers, deployment servers, etc.

Although it will be understood that an event collector may process incoming raw machine data from an HTTP message in any suitable manner, in some embodiments, the event collector may identify a token associated with the raw machine data (e.g., based on an identifier provided in the HTTP message). The token may provide for authentication of the data source within the data intake and query system. Global event settings may be accessed for the system. In an embodiment where the token has been configured to have token event settings that override the global event settings, the token event settings may also be accessed (e.g., from storage at the event collector). The underlying HTTP message may be processed to identify raw machine data and any message event settings (e.g., metadata) provided within the HTTP message. As described herein, in some embodiments the message event settings may override the global event settings and token event settings, providing a developer the ability to specify settings at a variety of degrees of granularity, depending on application. Once the raw machine data and settings (e.g., metadata) have been accessed, the event may be generated and stored (e.g., at an indexer). In some embodiments, a timestamp may be provided with raw machine data within the HTTP message or the raw machine data itself. If a timestamp is not identified from the HTTP message, one may be assigned to the raw machine data when the event is generated.

In some embodiments, it may also be desired to provide information back to the device that sent the HTTP message. Although any suitable information may be provided in accordance with the present disclosure, in some embodiments, the event collector may send an HTTP message including an acknowledgement regarding a generated event. While an acknowledgement may provide any suitable information regarding a generated event, in some embodiments an acknowledgement may allow a device to determine whether the generated was stored (e.g., at an indexer). In some embodiments, an event collector may simply provide an acknowledgement indicating when a message has successfully been stored (e.g., a synchronous acknowledgement message). In some embodiments, an acknowledgement message may include information such as an identifier that allows a device to query the event collector at a later time to determine whether a generated event was successfully indexed.

In some embodiments, the event collector and device may establish a unique channel for acknowledgments back to the device that sent the HTTP message. Although a unique channel may be provided in any suitable manner, in an embodiment the unique channel may be a global unique identifier (GUID) for a particular channel. In some embodiments, a unique channel may assist in preventing an attacker from accessing or stealing acknowledgments. For example, when a device sends an HTTP message including raw machine data to the event collector, it may include the channel GUID with the message and may send the message securely (e.g., using HTTPS). A plurality of client devices that have the same token will have different channel GUIDs. Thus, each of the server and client may only respond to acknowledgement communications that include a correct channel GUID. This may assist in preventing certain types of attacks, such as spoofing of acknowledgement messages or sending numerous requests including bogus data (e.g., to slow down processing by the data intake and query system).

In some embodiments, a device sending HTTP event requests, a data intake and query system (e.g., an event collector), or both collectively, may establish and apply limits to acknowledgement or other activities in order to thwart attacks (e.g., malicious attacks such as denial-of-service (DOS) attacks). For example, limits may be established for parameters such as the total number or frequency of acknowledgement requests, channels, and acknowledgement requests per channel. If any such limit is exceeded, a server such of a data intake and query system (e.g., an event collector) may not process a request related to an acknowledgement (e.g., by not processing the request and returning a server busy message to a device).

In some embodiments, the data intake and query system may also store detailed metrics regarding operations of an HTTP event collector system. In some embodiments, these metrics may be logged and stored (e.g., in a log file) which may be updated (e.g., periodically updated) based on system or administrator settings. This logged data may then be accessed (e.g., by an administrator) and analyzed (e.g., generating analysis, statistics, and visualizations as described herein) in order to monitor the operation of the system. Although any suitable metrics may be logged, in an embodiment the data intake and query system may include metrics that are logged system-wide (e.g., for an installation or instance) and metrics that are logged for each token.

Although any suitable system-wide metrics may be logged and accessed, exemplary system-wide metrics may include a number of authentication errors due to an invalid token, a total number of per-token errors (e.g., due to multiple causes such as improper data format, no authorization request, a failure of an authorization request, connectivity failures, etc.), a total number of per-token events received by each HTTP event collector endpoint, a total number of per-token parser errors as a result of improperly formatted event data, a total number of per-token individual HTTP requests received by each HTTP event collector endpoint (e.g., including HTTP requests that provide information for multiple events), a total number of requests to an incorrect URL, a total number of requests from certain programs or systems (e.g., a total number of requests from a SPLUNK Mobile INTelligence (MINT) system), a total number of per-token requests to disable a token, information about types of metrics data, a total amount of per-token data (e.g., in bytes) sent to the indexer, a total amount of per-token data (e.g., in bytes) received by each endpoint, log severity information, data transport protocol information for collected events, and date and time information for collected events.

Although any suitable per-token metrics may be logged and accessed, exemplary per-token metrics may include a total number of per-token errors (e.g., due to multiple causes such as improper data format, no authorization request, a failure of an authorization request, connectivity failures, etc.), a total number of events received for the token, a total number of parser errors as a result of improperly formatted event data for the token, a total number of individual HTTP requests received by the token (e.g., including HTTP requests that provide information for multiple events), a total number of request to an incorrect URL for the token, a total number of requests from certain programs or systems (e.g., a total number of requests from the SPLUNK Mobile MINT system) for the token, a total number of per-token requests to disable the token, information about types of metrics data, a total amount of data (e.g., in bytes) sent to the indexer for the token, a total amount of data (e.g., in bytes) received for the token, log severity information, data transport protocol information for collected events, and date and time information for collected events.

In some embodiments, the data intake and query system may also provide analytics and visualizations to a user (e.g., a system administrator) to allow the user to determine information about events being stored within the system (e.g., events stored at indexers) and the operation of the system (e.g., logged metrics for the system), or a combination thereof. Data, analyses, performance metrics, and other information may be used to generate the visualization. Any suitable analysis and visualizations may be provided for HTTP events, as described herein. Analytics and visualizations may be provided for the entire system, for particular tokens, and for certain components of the data intake and query system (e.g., event collectors, forwarders, and indexers). In this manner, a user may be allowed to monitor information about events being stored at the system, about the operation of the system (e.g., throughput, amount of data, etc.), and about their products and systems (e.g., based on different tokens associated with different types of devices providing events to the data intake and storage system).

3.1.1. Global Event Settings

As described herein, a user (e.g., system administrator) may be able to configure global settings for the HTTP event collector of the data intake and query system. Global settings may be used to configure any suitable information about the operation of the system and the devices providing data to the system, including information about how events are submitted via HTTP messages and processed by the system (e.g., whether to use a deployment server, whether to enable secure socket layer (SSL) encryption, HTTP port number, whether to use tokens, etc.) and information about metadata for raw machine data provided to the system (a default source type, default index, default output group, etc.).

Figure 18:
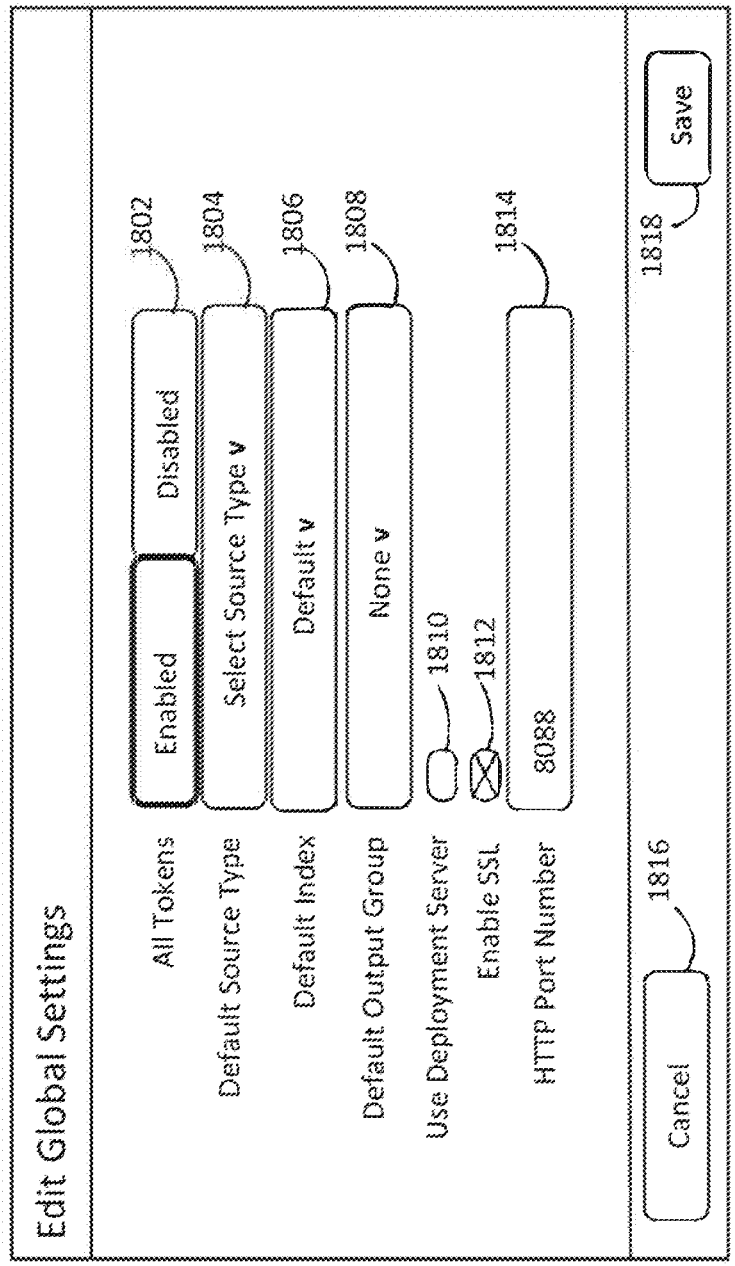
FIG. 18 illustrates an exemplary global settings user interface in accordance with some embodiments of the present disclosure.

FIG. 18 depicts an exemplary global settings user interface in accordance with some embodiments of the present disclosure. Although a global settings user interface may include any suitable information, in some embodiments, a global settings user interface may allow a user (e.g., system administrator) to configure information relating to tokens, a default source type, a default index, a default output group, whether to use a deployment server, whether to enable SSL, and an HTTP port number. Although the global settings interface depicts certain user interface elements (e.g., radio buttons, pull-down menus, text entry boxes), it will be understood that any suitable user interface elements may be utilized with a global settings interface in accordance with the present disclosure, and that any suitable setting may be associated with any suitable user interface element.

Token selection interface 1802 allows a user to selectively enable or disable the tokens associated with the installation of the data intake and query system. In some embodiments, it may be desired to temporarily disable tokens, which may effectively disable the logging of events to the system. For example, it may be desired to distribute and deploy new tokens or software to devices that are providing data to the system. As described herein, a data intake and query system enables analytics that may cause a user to identify errors, attacks, or other issues that are occurring within their systems. In some embodiments, it may be desirable to disable tokens once an error or attack is identified.

Default source type selection interface 1804 allows a user to select a default source type that will be applied to all raw machine data unless otherwise specified (e.g., using token event settings or message event settings). In some embodiments, the source type selections available as defaults may be provided from a listing of known source types, which may indicate a known data structure for events, which may be used for data intake and querying. In addition, a customer source type may be defined, and in some embodiments, provided as an option for the default source type.

Default index selection interface 1806 allows a user to select a default index that raw machine data will be stored in by the data intake and query system. The selection of an index may provide the location where events including raw machine data, searchable data, and metadata are stored within the data intake and query system. By selecting among indexes, the user may be able to balance the storage, processing, and search demands on different components of the system.

Default output group selection 1808 allows a user to define a default group of indexers (the output group) that is to store events for a particular installation. In some embodiments, available output groups may be provided based on the indexers that are associated with the selected index. In some embodiments, one or more output groups may be customized by a user, and available for default selection.

Deployment server selection interface 1810 may allow the user to determine whether a deployment server will be used for the installation. In some embodiments, a deployment server may be an instance that acts as a centralized configuration manager for managing a set of event collectors, forwarders, and indexers. The deployment server may download updated content, such as configuration files and apps, to the managed devices. Deployment server selection interface 1810 may allow a user to determine whether a deployment server will be utilized.

Enable SSL selection interface 1812 may allow a user to enable SSL for HTTP messages that provide raw machine data to the system. Although SSL encryption may be specified in accordance with the global settings interface of FIG. 18, it will be understood that other forms of encryption (e.g., transport layer security (TLS)) may be used, and in some embodiments, an encryption selection interface 1812 may facilitate a selection between different encryption options.

HTTP port number selection 1814 may provide an input (e.g., a text input) that allows a user to define a default HTTP port number. In some embodiments, a set of default selections may be provided by the system, and an option may be provided for the port number to be user-assigned.

Cancel selection 1816 and save selection 1818 allow a user to save or cancel default settings. When the save button is selected, the update settings may be transmitted to the system and saved.

3.1.2. Token Setup and Configuration

A plurality of tokens may be set up for a particular installation of the data intake and query system. Each token may be individually configurable, and a variety of aspects of the token may be configurable, such as any suitable metadata settings, messaging settings for providing HTTP messages to the system, and any other suitable configuration of the system. By setting up a variety of tokens, it may be possible to manage the manner in which disparate data sources provide events to the system and how those events are stored an accessed. As described herein, tokens may be individually analyzed, allowing for a granular-level analysis of particular data sources. Moreover, security features may be realized, for example, by configuring tokens in different manners (e.g., storing events in a different manner or at certain indexers) based on different users or user types (e.g., as established by possession of a particular token).

Figure 19:
FIG. 19 illustrates an exemplary token setup and configuration user interface in accordance with some embodiments of the present disclosure.

FIG. 19 depicts an exemplary user interface for setting up and configuring a token in accordance with some embodiments of the present disclosure. Although particular information as depicted as being configured for a token in FIG. 19, it will be understood that any suitable information may be configured for a token, including any metadata, any event storage requirements, and data communication parameters (e.g., encryption, etc.), any other suitable information, or any combination thereof. For example, a token may be configured to include metadata for data sources and indexes, and in some embodiments, provide a timestamp for data (e.g., a token could be associated with data sources that do not natively provide timestamps for events).

Name user input 1902 may allow a user to define a name of a token, while description user input 1906 may allow a user to define a description for the token. As will be described herein, in some embodiments a token identifier may be provided for identifying the token at both the data source and the event collector. A token name and description may utilized by a user (e.g., system administrator) to provide a short-hand description for tokens. For example, in an implementation of in a home automation system, different types of devices could be assigned different tokens, and the name and description provided within the token setup and configuration interface may provide a shorthand for understanding the application or use of the token. In some embodiments, a token name may be used for storage and access of per-token metrics.

Source name override 1904 may provide an override of the default source type for the system. For example, a source type indicated in source name override selection 1904 of FIG. 19 may override a source type defined in default source type selection 1804 of FIG. 18. In some embodiments, source name override 1904 may provide for selections that are available, and may indicate the source type that is currently set as the default within the global settings.

Output group selection 1908 may allow a user to select an output group to receive events generated based on HTTP messages that include the token. In some embodiments, this may allow an override of a default output group (e.g., an output group specified in output group selection 1808 of FIG. 18). In some embodiments, output group selection 1908 may provide for selections that are available, and may indicate the output group that is currently set as the default within the global settings.

Enable indexer acknowledgement selection 1910 allows a user to specify that an event collector should provide acknowledgement messages for events generated based on HTTP messages provided for a particular token. As is described herein, in some embodiments an event collector may communicate with a data source to indicate whether raw machine data received within HTTP messages have been indexed. In some embodiments, providing acknowledgements may result in additional processing and messaging overhead, and in some embodiments users may wish to selectively enable or disable acknowledgements.

Next selection 1912 may result in the token settings being saved for the token. Once a token is created, a token identifier may be generated. The token identifier may be stored at the event collector, such that saved settings may accessed for purposes of handling events provided in HTTP messages.

FIG. 20 illustrates an exemplary event collector user interface in accordance with some embodiments of the present disclosure. Although particular user interface elements are depicted in FIG. 20, it will be understood that any suitable user interface elements may be provided for an event collector in accordance with the present disclosure. As depicted in FIG. 20, an event collector includes user interface elements that allow a user to create, view, and modify event collector settings, including settings for global events and tokens.

Token filter field 2002 allows a user to search for tokens that are associated with a particular installation of an event collector. Although FIG. 20 depicts only three tokens, in some embodiments, an event collector may have hundreds or even thousands of tokens associated therewith. Although token filter field 2002 depicts a text search box, it will be understood that any suitable search mechanism may be provided in accordance with the present disclosure. In some embodiments, a listing of available tokens may be dynamically updated as the user enters the search criteria into the filter. Although the token filter field 2002 provides for searching of the token name field, the token filter could be applied to any searchable field of the filter.

Global settings selection 2004 may allow the user to access the global settings user interface (e.g., of FIG. 18) to modify global settings for the event collector installation. New token selection 2006 may allow the user to access a token setup and configuration interface (e.g., of FIG. 19) to create a new token. In some embodiments (not depicted herein), new token selection 2006 may provide for the selection of token templates as a starting point for creation of the new token.

FIG. 20 depicts a variety fields that provide a view of selected settings and parameters for tokens that are associated with an event collector. Although particular fields are depicted in FIG. 20, it will be understood that any suitable additional fields may be added, that any of the fields may be modified, and that any of the fields may be deleted. Any of the fields may be searched, ordered, and filtered in any suitable manner (e.g., by selecting a field heading, and requesting ascending or descending order for the display).

Token name field 2008 provides the token name for each of the token (e.g., as specified in the token setup and configuration user interface of FIG. 19).

Action field 2010 allows a user to select actions to perform with the token. A selection to edit a token may result in the opening of a user interface to modify token settings (e.g., the setup and configuration interface of FIG. 19), allow editing within the fields of the event collector user interface, or facilitate editing of tokens in any other suitable manner. A selection to disable a token may cause the token to disable, such that events associated with a token are not indexed, and in some embodiments, are discarded. The token status field 2018 may be updated based on a selection to enable or disable a token.

Token value field 2012 may depict token unique identifiers for tokens, which may be used by event collector to authenticate data sources and access stored information (e.g., metadata) that is associated with a token.

Token source type field 2014 and token index field 2016 may depict token settings for source type and index, which, as described herein, may be independently configurable for each token.

3.1.3. Sending Raw Machine Data to the Event Collector

Once a data source is configured, it may provide raw machine data to the event collector such that events may be generated and indexed. As described herein, configuration of a data source may include configuring global settings and tokens. In some embodiments, once these configurations are complete, the event collector may accept raw machine data from a data source.

Developers are provided with a variety of options for providing raw machine data to the configured event collector. In some embodiments, raw machine data and event settings may be provided within a uniform resource identifier (URI), as raw data, within a custom JSON, using logging libraries (e.g. Logback, Log4j2, java.util.logging, SLF4J, etc.), in any other suitable manner, or any combination thereof. Certain methods of providing raw machine data to the event collector (e.g., embedding raw machine data and settings within a URI or in a raw data payload) may simply embed the raw machine data and metadata within an HTTP message. Such methods may require analysis by the event collector (e.g., as described herein for any other suitable raw machine data) for parsing the raw machine data and indexing events generated for the raw machine data. For example, in some embodiments it may be determined whether a message event format for message event settings is present within the HTTP message. In some embodiments, a token must be provided with the raw data in order to authorize the data source and determine global and token settings.

Other methods of providing raw machine data to the event collector (e.g., using a custom JSON or logging library) may provide tools to assist a developer in providing raw machine data and event settings to the event collector. An exemplary custom JSON or logging library may include key/value pairs that may have a message event format that allows for the raw machine data and event metadata to be specified. Although any suitable key/value pairs may be supported in accordance with the present disclosure, exemplary keys include a time key, a host key, a source key, a sourcetype key, an event key (e.g., for the raw machine data) and an index value. Values may be assigned to each of these keys during operation of a data source and provided to the event collector for processing and indexing. In some embodiments, providing a value within the custom JSON or logging library may override a default setting provided within one or both of the global settings (e.g., a sourcetype value or index value). A time value may provide a timestamp for the raw machine data. Although a time value may be provided in any suitable manner, in some embodiments the time value may provide seconds and milliseconds in epoch time format. A host value may include information such as a hostname of the client that is sending the raw machine data, while a source value is user-assigned for the raw machine data, and may relate to any suitable information such as an application that is providing the raw machine data.

FIG. 21 depicts an exemplary HTTP message utilizing a custom JSON in accordance with some embodiments of the present disclosure. Although an exemplary HTTP message may include any suitable components in accordance with the present disclosure, in an exemplary embodiment a HTTP message includes a destination endpoint 2102, an authorization header 2104, and a plurality of raw machine data fields 2106 and 2018 implemented within the custom JSON format.

A destination endpoint 2102 may provide the destination of the event collector that will process the received HTTP message. Authorization header 2104 may provide authorization information for determining whether a data source is authorized to transmit events to the event collector for indexing. Although any suitable information may be utilized to determine the authorization, in an embodiment the authorization header may include the token identifier, as described herein.

Raw machine data fields 2106 and 2108 may be provided in the custom JSON format. Although any suitable events and event metadata may be provided in the custom JSON, an exemplary first event 2106 may include keys "event," "time," and "host," having associated values "event3", 1450127100, and "foo1". Similarly, a second event 2106 may include keys "event," "time," and "host," having associated values "event4", 1450127194, and "foo2".

3.1.4. Processing and Indexing of Raw Machine Data

HTTP messages including tokens, raw machine data, and event metadata are transmitted to an event collector over a network. A system for indexing and querying the received data may be configured in any suitable manner based on issues such as the volume and complexity of raw machine data that will be provided to the system. In some embodiments, an event collector may be implemented on a single forwarder, which may then forward events generated events to a plurality of output groups, each including a plurality of indexers. In some embodiments, event collectors may be implemented at indexers. In more complex configurations, additional components such as a traffic load balancer and deployment server may be provided as separate components to manage large volumes of data and more complex management tasks.

Figure 22:
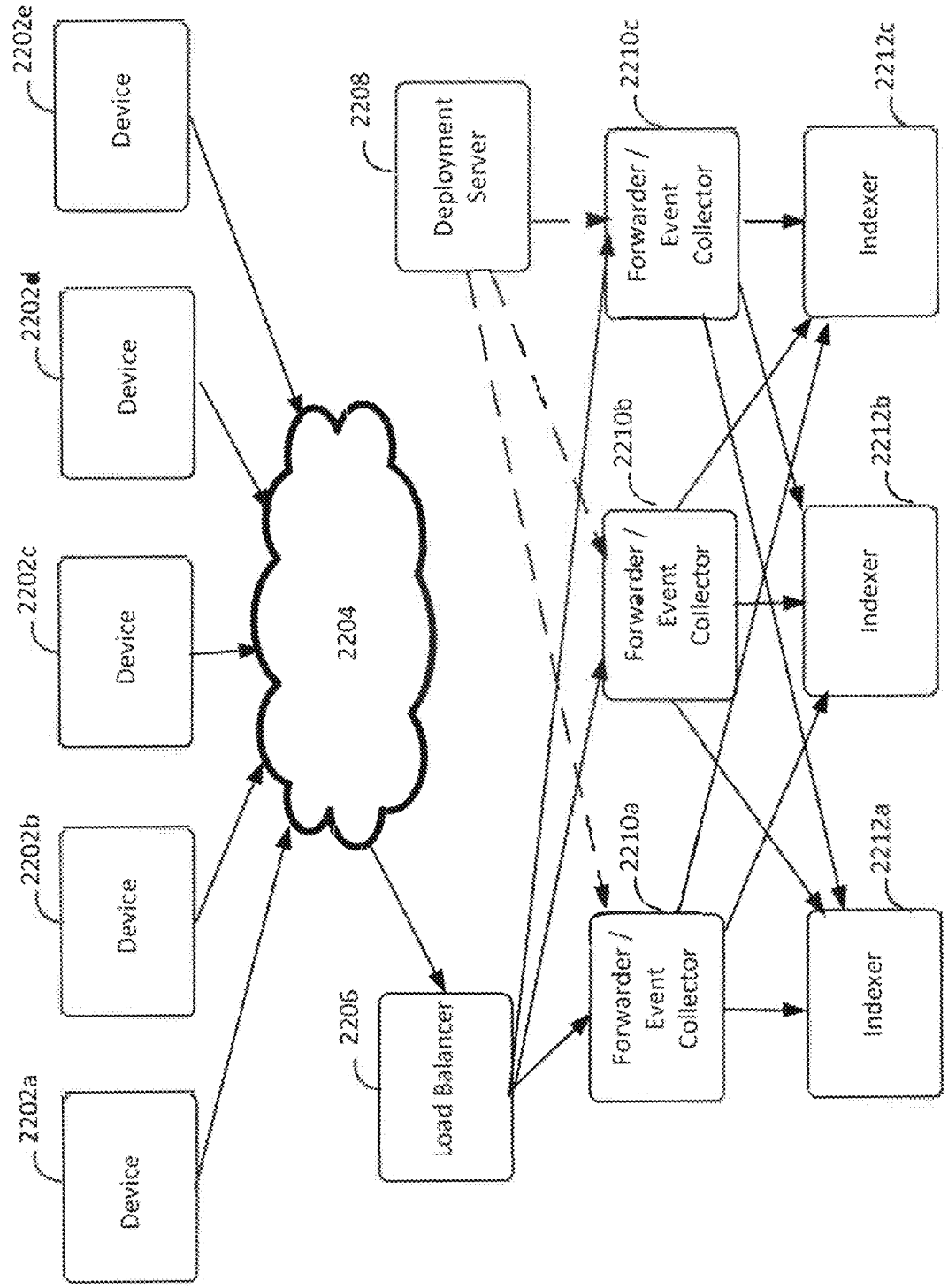
FIG. 22 illustrates an exemplary event collector implementation in accordance with some embodiments.

FIG. 22 illustrates an exemplary event collector implementation in accordance with some embodiments of the present disclosure. Although it will be understood that event collectors may be implemented in any suitable manner in accordance with the present disclosure, in an exemplary embodiment event collectors may be implemented at each of a plurality of forwarders, in a system that further includes a load balancer and deployment server. FIG. 22 depicts communications that transmit raw machine data (e.g., HTTP messages, raw machine data, event metadata, and generated events) as solid lines and other communications with dashed lines.

Devices 2202*a*-2202*e* may be any suitable devices that are capable of processing information to generate raw machine data and transmit raw machine data over a network. Although five devices are depicted it will be understood that the data intake and query system may be configured to handle any suitable number of devices generating any suitable amount of raw machine data for storage. Devices 2202*a*-2202*e* may include instructions stored in memory, that when executed by a processor, cause HTTP messages to be generated as described herein (e.g., including a token identifier, raw machine data, and event metadata provided in a custom JSON). The HTTP messages are transmitted over a network 2204, which may be any suitable network or combination thereof (e.g., the internet, WiFi, cellular, mesh networks, etc.). The destination endpoint specified in the HTTP messages may route the messages to load balancer 2206 via the network.

Load balancer 2206 may receive the HTTP messages and use traffic load balancing to route them to a plurality of event collectors. Although any suitable load balancer may be implemented in any suitable manner, in an exemplary embodiment a load balancer such NGINX may distribute messages between event collectors at regular intervals.

Deployment server 2208 may provide for centralized configuration and management of the data intake and query system, for example, by distributing configuration settings through the deployment server 2208. In this manner, a plurality of event collectors (e.g., implemented on forwarders 2210a-2210c in FIG. 22) may be utilized to process, index, and query large volumes of data.

In one embodiment, each of forwarders 2210a-2210c may function as a heavy forwarder, performing both forwarding functions and processing of incoming HTTP messages received from load balancer 2206. Raw machine data, event metadata, and events generated therefrom may be distributed by the forwarders 2212a-2212c, in any suitable manner, and in some embodiments may be distributed to each available indexer.

Figure 23:
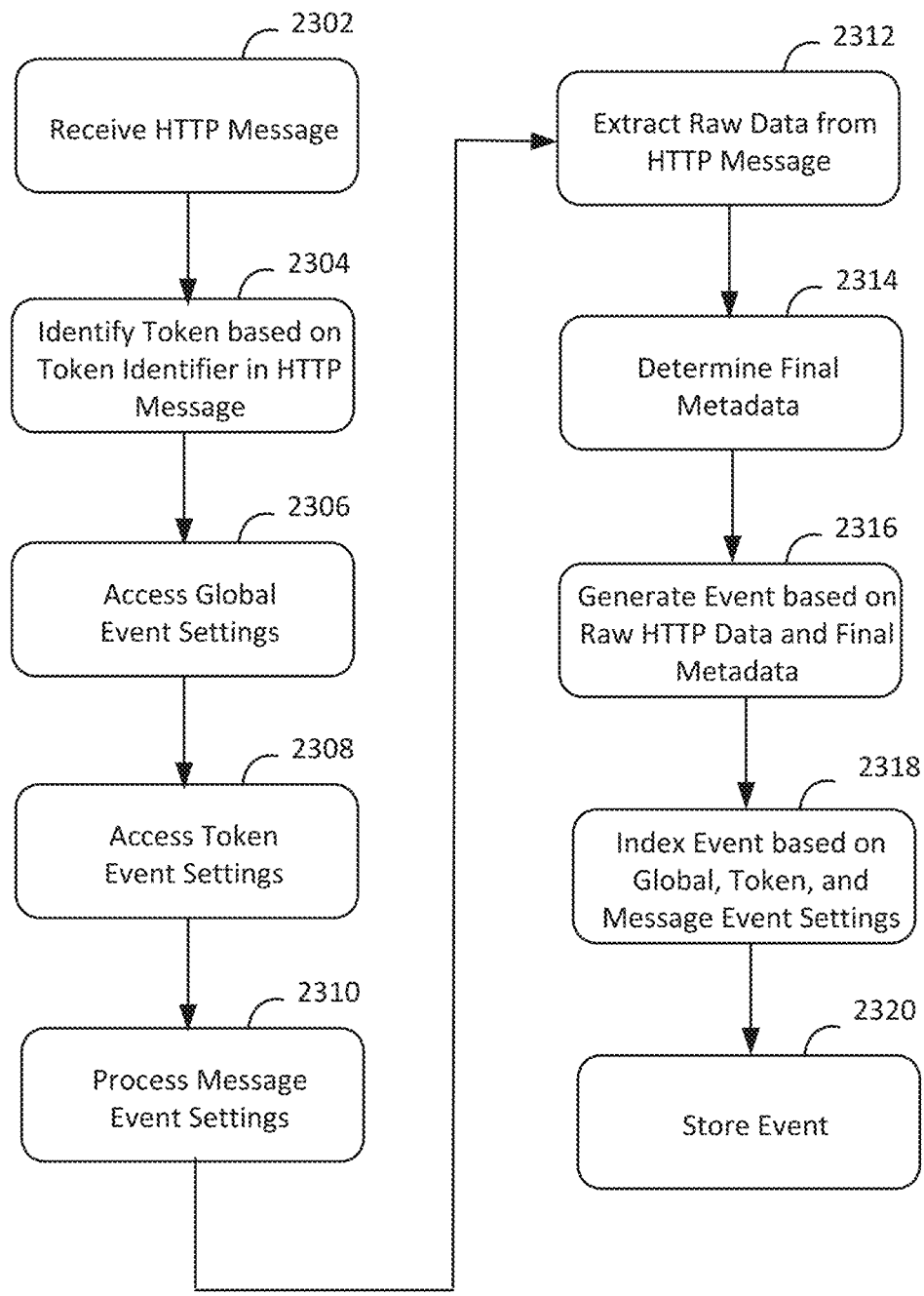
FIG. 23 illustrates exemplary steps for receiving, processing, and indexing HTTP data in accordance with some embodiments of the present disclosure.

FIG. 23 illustrates exemplary steps for receiving, processing, and indexing of raw machine data received in HTTP events in accordance with some embodiments of the present disclosure. The steps depicted by FIG. 23 are provided for illustrative purposes only; those skilled in the art will understand that additional steps may be included, that or more steps may be removed, and that the ordering of the steps of FIG. 23 may be modified in any suitable manner. It will be understood that while particular hardware, software, system components, HTTP messages, and processing and indexing techniques may be described in the context of FIG. 23, that the steps described herein are not so limited. Although the steps of FIG. 23 are provided in the context of HTTP messages, it will be understood that similar steps may be applicable to messages sent using different protocols.

At step 2302, an event collector (e.g., an event collector running on any one of forwarders 2210a-2210c) may receive a HTTP message (e.g., from devices 2202a-2202e via network 2204 and 2206). Once the message is received at step 2302, processing may continue to step 2304.

At step 2304, the event collector may identify a token from the HTTP message. Although a token may be identified in any suitable manner, in an exemplary embodiment a token identifier may be provided within an authorization header (e.g., the token identifier of authorization header 2104). The event collector may also determine whether the token is authorized based on the provided token information. Once the token is identified, processing may continue to step 2306.

At step 2306, the event collector may access global event settings. Although global event settings may be accessed in any suitable manner, in some embodiments the global event settings may be accessed once the token is confirmed to be valid and enabled (e.g., based on token setup and settings as described with respect to FIGS. 19-20). The global settings may include default metadata for events, for example, as was described herein with respect to FIG. 18. Once global settings have been accessed, processing may continue to step 2308.

At step 2308, the event collector may access token event settings. Although token event settings may be accessed in any suitable manner, in some embodiments the token event settings may be accessed if tokens are enabled within the global settings (e.g., as based on settings provided in the global event settings user interface of FIG. 18) and the token settings (e.g., based on settings provided in the token event settings interface of FIGS. 19-20). The token event settings may include settings that override global event settings, based on based on settings provided in the token event settings interface of FIGS. 19-20. Processing may then continue to step 2310.

At step 2310, the event collector may process message event information, such as the message event settings, received within the HTTP message, e.g., within a URI of the HTTP message or via a custom interface such as a custom JSON (e.g., a custom JSON as depicted in FIG. 21) or log file. In some embodiments, it may be determined whether message event information is being received based on a determination that data having a proper format (e.g., a message event format) is being provided within the HTTP message. For example, it may be determined whether raw machine data and metadata may be extracted from the JSON as described with respect to FIG. 21. The message event settings may override both global event settings and token event settings. Once the event information has been processed, processing may continue to step 2312.

At step 2312, the event collector may process data provided in raw format via the HTTP message (e.g., information provided in a raw message or URI), extracting raw machine data and event settings, as described herein. Once the raw format information has been processed, processing may continue to step 2314.

At step 2314, based on the tiered event settings hierarchy as described herein. For example, message event settings may override token event settings, which override global event settings. Once the final metadata has been determined, processing may continue to step 2316.

At step 2316, the event may be generated based on the raw machine data and the final metadata, and at step 2318 the event may be indexed based on the global, token, and message event settings, and at step 2320 the event may be stored (e.g., at an indexer). Processing of the steps of FIG. 23 may then end.

3.1.5. Processing of Acknowledgements

Figure 24:
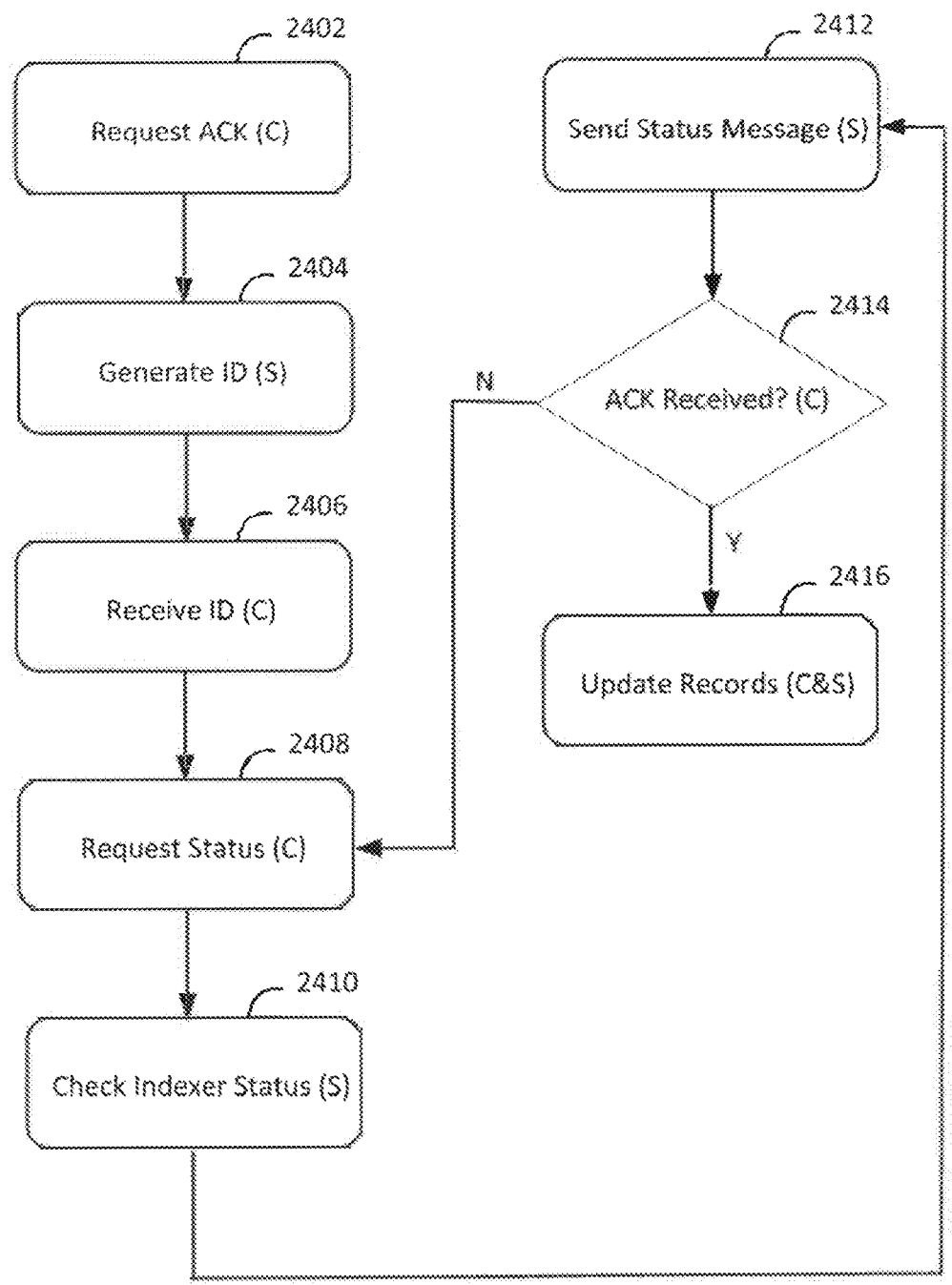
FIG. 24 illustrates exemplary steps for processing acknowledgements in accordance with some embodiments of the present disclosure.

FIG. 24 illustrates exemplary steps for processing acknowledgements in accordance with some embodiments of the present disclosure. The steps depicted by FIG. 24 are provided for illustrative purposes only; those skilled in the art will understand that additional steps may be included, that or more steps may be removed, and that the ordering of the steps of FIG. 24 may be modified in any suitable manner. It will be understood that while particular hardware, software, system components, HTTP messages, and acknowledgement techniques may be described in the context of FIG. 24, that the steps described herein are not so limited. Although the steps of FIG. 24 are provided in the context of acknowledgements for events received via HTTP messages, it will be understood that similar steps may be applicable to messages sent using different protocols. Moreover, the steps of FIG. 24 disclose an acknowledgement procedure whereby the data source receives an identifier and polls the event collector to determine the status of the acknowledgement of indexing. It will be understood that the present disclosure contemplates other procedures, such as sending a positive acknowledgement from the event collector once an event is indexed (e.g., a synchronous acknowledgement). As depicted in FIG. 24, certain steps are performed by a client device (C) and certain steps are performed by a server (S) such as an event collector or other component of a data intake and query system.

At step 2402, a data source (e.g., such as a device 2202a-2202e) may request an acknowledgement. Although an acknowledgement may be requested in any suitable manner, in one embodiment a request for an acknowledgement may be included with the HTTP message that includes the raw machine data and event metadata. The event may be generated and transmitted to an event collector (e.g., a forwarder 2210a-2210c, via network 2204 and load balancer 2206) for eventual storage at one of indexers 2212a-2212c. Processing may then continue to step 2404.

At step 2404, the event collector (e.g., a forwarder 2210a-2210c) may generate an acknowledgement identifier that is associated with the event. Although any suitable identifier may be generated, in some embodiments acknowledgement identifiers may be consecutively numbered for events processed by a forwarder or forwarder to an indexer. The event collector (or in some embodiments, an indexer) may store the acknowledgment identifier, an identifier for the event, and information about the status of the event, such as a positive indicator that the event was indexed. Processing may then continue to step 2406.

At step 2406, the event collector (e.g., a forwarder 2210a-2210c) may provide the acknowledgement identifier to the data source (e.g., a device such as 2202a-2202e) that provided the event (e.g., via load balancer 2206 and via network 2204). In some embodiments, the data source may store the acknowledgement identifier (e.g., within a table, database, memory, or other data store) for future use in checking the status of the acknowledgement. Once the acknowledgement identifier is received and stored by the device, processing may continue to step 2408.

At step 2408, the data source (e.g., as a device such as 2202a-2202e) may transmit a request to check the event status to the event collector (e.g., to one of forwarders 2210a-2210c via network 2204 and via load balancer 2206). Although the request may include any suitable information, in some embodiments the request may include the acknowledgement identifier. Once the status has been requested, processing may continue to step 2410.

At step 2410, the event collector (e.g., one of forwarders 2210a-2210c) may check the status of the event at the indexer. In some embodiments, the indexer may provide an indication to the event collector (or in some embodiments, may implement the event collector) that indicates when an event has been indexed. In other embodiments, an indexed status may be requested, or it may simply be determined whether the event is available from the indexer. In some embodiments, the event collector may receive either a positive indication that the event has been indexed, or a negative indicator. In some embodiments, the negative indicator may not provide information that the event has not been indexed, but only information that it is unknown whether the event was indexed. Once the status of the event at the indexer has been checked, processing may continue to step 2412.

At step 2412, the event collector (e.g., one of forwarders 2210a-2210c) may send an acknowledgement status message to the data source (e.g., a device such as 2202a-2202e via network 2204 and via load balancer 2206). The acknowledgement status message may include the indicator that was determined at step 2410 as well as the identifier for the event. Once the acknowledgement message is received, processing may continue to step 2414.

At step 2414, the data source may determine from the received message whether the acknowledgement was received. If the acknowledgement was received (e.g., a positive indication that the event was indexed), processing may continue to step 2416. If the acknowledgement was not received (e.g., an indication that it is not known whether the event was indexed), in some embodiments, processing may continue to step 2408, at which the data source continues to check for the event. In some embodiments (not depicted in FIG. 14), if a timeout has expired and the event is not received, the data source may take corrective action such as sending the HTTP message including the raw machine data a second time. In additional embodiments (not depicted in FIG. 14) where a negative indicator means that it is not known that the message was not received, the data source may take corrective action such as sending the HTTP message including the raw machine data a second time.

At step 2416, both the data source and the event collector may update their records, for example, by clearing the event from a listing of unacknowledged events, clearing indicators or flags relating to the event and acknowledgement, or taking any other suitable action. Once records have been updated at the data source and event collector, processing may end.

3.1.6. Analysis and Visualization of Http Event Collection

Figure 25:
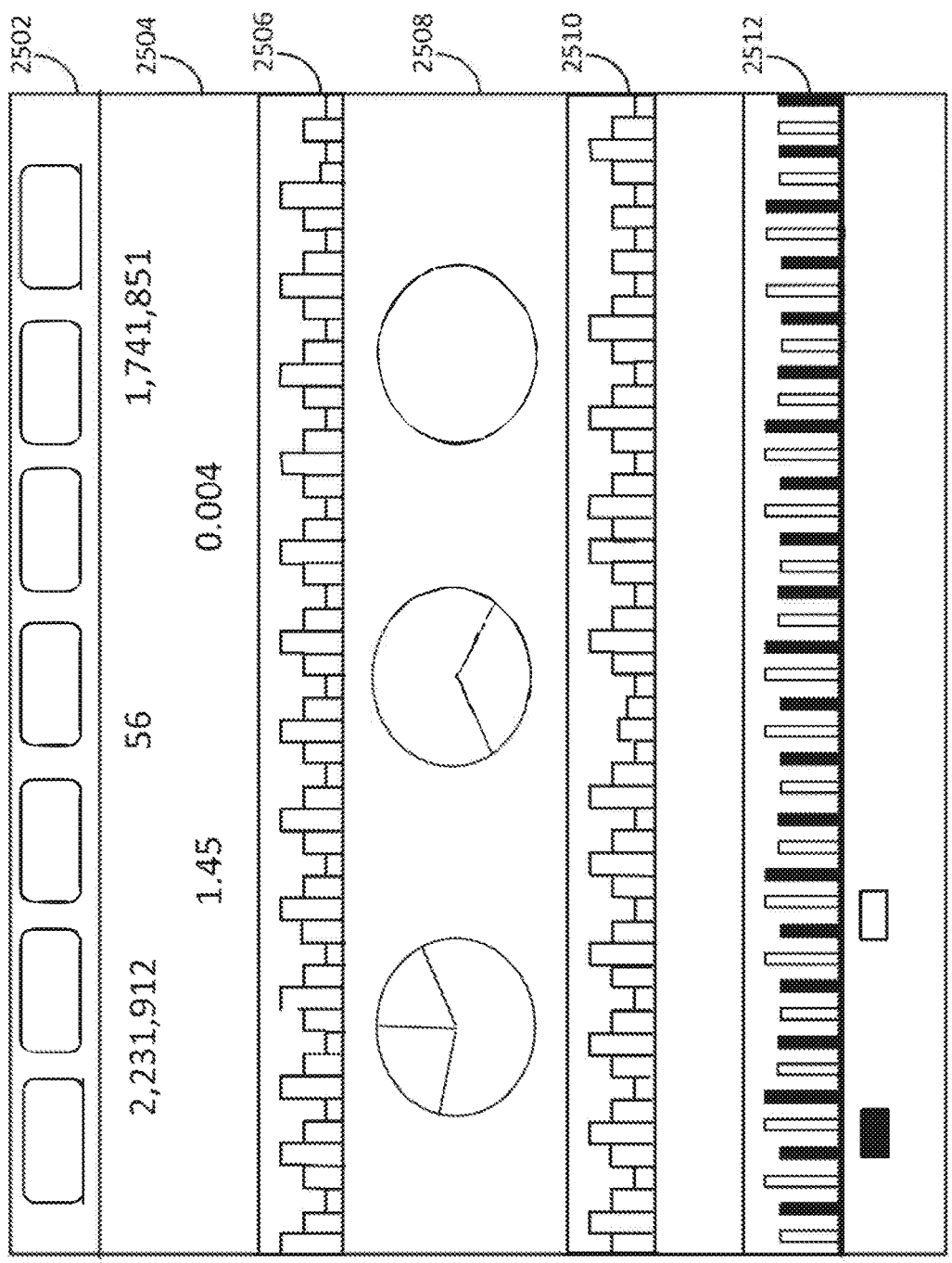
FIG. 25 illustrates an exemplary visualization in accordance with some embodiments of the present disclosure.

FIG. 25 illustrates an exemplary visualization of HTTP event collection in accordance with some embodiments of the present disclosure. As described herein, a data intake and query system may perform various types of analysis, statistics, and visualizations. An HTTP event collector may provide a powerful tool for providing such analysis for disparate and distributed data sources, based on individual token identifiers, event collectors, indexers, forwarders, and groupings thereof. In an embodiment, the visualization may be based on data regarding events stored at indexers as well information related to the data intake and query system (e.g., based on metrics for the data intake and query system and tokens, as described herein). This data and information, analyses thereof, statistics based on this data, and performance metrics related thereto may be referred to as visualization data, which may be accessed or calculated for the purpose of generating visualizations.

An exemplary visualization is provided in FIG. 25. In the visualization of FIG. 25, selection menus 2502 are provided. Selection menus 2502 may include any suitable user interface elements that allow selection or entry of various options, such as pull-down menus, search boxes, radio buttons, listings of selectable options, or any combination thereof. The selection menus 2502 may allow users to select data types, analyses, statistics, and visualizations, which determine the type of visualization data that is received and utilized for the depiction of the visualizations (e.g., in windows 2504-2506).

One exemplary data type that may be analyzed is an analysis of data storage components, such as indexers, event collectors, or forwarders. For example, a selection menu 2502 may provide options to select some or all data storage components for analysis, or categories (e.g., indexers, event collectors, forwarders, or any combination thereof) of data storage components. Visualization data related to the data storage components may provide information regarding overall system volume, peaks and spikes in usage of underlying data sources, times when the data storage components collectors are becoming overloaded or receiving bad data, and various other parameters. In some embodiments it may be desired, for one or more data storage components, to determine a percentage of events that were successfully received, of HTTP messages that were authorized, a percentage of HTTP messages that were improperly formatted, an amount of data that was received, and other information as described herein. As another example, comparing the operation of different data storage components may provide information about system setup and loading. As a result, system setup (e.g., token index settings) may be appropriately modified.

Another exemplary data type that may be analyzed is tokens. A selection menu 2502 may allow the selection of some or all tokens to be analyzed. As described herein, different tokens may be created and assigned to particular devices for numerous reasons, including to provide monitoring of levels of activity of devices assigned different tokens. In one exemplary embodiment, tokens may be assigned to different device types, or for similar devices deployed to different customers. By monitoring the volume of events, content of events, error rates, and similar information, it may be possible to determine granular performance information on a large scale, all based on the ability to monitor particular tokens. In some embodiments it may be desired, for one or more tokens, to determine a percentage of events that were successfully received, of HTTP messages that were authorized, a percentage of HTTP messages that were improperly formatted, an amount of data that was received, and other information as described herein.

In some embodiments, various data types may be combined, for example to monitor how particular tokens are impacting particular event collectors. In some embodiments, data types may be viewed over multiple customers, for example to analyze operations of related companies and businesses.

Although it will be understood that any suitable visualization data may be determined for the purposes of generating visualizations, in some embodiments the visualization data may include event collector metrics, token metrics, events, event fields, event values, event counts, acknowledgements, percentage utilization, underlying event data, CPU-related performance metrics, disk-related performance metrics, memory-related performance metrics, network-related performance metrics, energy-usage statistics, data-traffic-related performance metrics, overall system availability performance metrics, cluster-related performance metrics, virtual machine performance statistics, any statistics or analysis relating to any of the above, or any combination thereof. Any suitable visualizations may be provided based on this data as are described herein (e.g., bar charts, scatter plots, area charts, line charts, pie charts, radial gauges, marker gauges, or filler gauges). For example, data may be analyzed for particular (e.g., selectable) time periods, as time series data, as aggregated data, to identify any suitable changes in data over time (e.g., comparisons to thresholds, statistical analysis, etc.), any other suitable analysis, or any combination thereof.

The foregoing provides illustrative examples of the present disclosure, which are not presented for purposes of limitation. It will be understood by a person having ordinary skill in the art that various modifications may be made by within the scope of the present disclosure. It will also be understood that the present disclosure need not take the specific form explicitly described herein, and the present disclosure is intended to include variations to and modifications thereof, consistent with the appended claims. It will also be understood that variations of the systems, apparatuses, and processes may be made to further optimize those systems, apparatuses, and processes. The disclosed subject matter is not limited to any single embodiment described herein, but rather should be construed in breadth and scope in accordance with the appended claims.

What is claimed is:

1. A computer-implemented method, comprising:
    receiving a message over a network, wherein the message is formatted according to an internet protocol, wherein a payload of the message includes a key-value pair, wherein a key of the key-value pair identifies a value of the key-value pair as recording an event associated with a computing device, and wherein the value of the key-value pair includes machine data produced by the computing device;
    extracting, from the value of the key-value pair, using the key of the key-value pair, the machine data from the payload of the message to obtain extracted machine data;
    determining, using the extracted machine data, a timestamp associated with the event;
    processing the extracted machine data to obtain processed machine data;
    generating the event using the processed machine data and the timestamp to obtain a generated event, wherein the generated event includes a portion of the processed machine data and the timestamp; and
    outputting the generated event for storage in a field-searchable data store.

2. The computer-implemented method of claim 1, wherein the message includes a header.

3. The computer-implemented method of claim 1, wherein the message includes a header, wherein the header of the message and the payload of the message are distinct.

4. The computer-implemented method of claim 1, further comprising identifying the machine data in the payload of the message based on the value of the key-value pair.

5. The computer-implemented method of claim 1, wherein the message comprises a hypertext transfer protocol (HTTP) message.

6. The computer-implemented method of claim 1, wherein the message includes a token identifier and message event settings metadata, the computer-implemented method further comprising:
    accessing token event settings based on the token identifier; and
    processing message event settings from the message event settings metadata, wherein generating the event is based at least in part on the token event settings and the message event settings.

7. The computer-implemented method of claim 1, wherein the message includes a token identifier and message event settings metadata, the computer-implemented method further comprising:
    accessing token event settings based on the token identifier;
    processing message event settings from the message event settings metadata; and
    establishing second metadata based on a hierarchy of the token event settings and the message event settings, wherein generating the event is based at least in part on the second metadata.

8. The computer-implemented method of claim 1, wherein
    receiving the message over the network comprises receiving, at a component of a data intake and query system, the message over the network, wherein the message identifies the component of the data intake and query system as a destination for the message.

9. The computer-implemented method of claim 1, wherein the field-searchable data store comprises a plurality of time series buckets.

10. The computer-implemented method of claim 1, wherein the message comprises a JavaScript Object Notation (JSON) format, wherein generating the event comprises:
    parsing the message based on the JSON format; and identifying the payload of the message based on a payload definition of the JSON format.

11. The computer-implemented method of claim 1, further comprising receiving a request for acknowledgement, wherein the request for acknowledgement is included in the message.

12. The computer-implemented method of claim 1, further comprising generating an acknowledgement identifier associated with the event.

13. The computer-implemented method of claim 1, further comprising storing an event status indicator and an acknowledgment identifier associated with the event.

14. The computer-implemented method of claim 1, wherein the computing device comprises a first computing device, wherein the machine data reflects activity between the first computing device and a second computing device in an information technology environment.

15. The computer-implemented method of claim 1, further comprising receiving a request to check an event status of the event.

16. The computer-implemented method of claim 1, wherein the message includes a token identifier that identifies a token, the computer-implemented method further comprising:
accessing token event settings for the token based on the token identifier, wherein the token event settings are accessed for handling events provided in messages.

17. A computing system comprising:
a communication interface;
at least one memory having instructions stored thereon; and
at least one processor configured to execute the instructions, wherein the at least one processor is configured to:
receive a message over a network, wherein the message is formatted according to an internet protocol, wherein a payload of the message includes a key-value pair, wherein a key of the key-value pair identifies a value of the key-value pair as recording an event associated with a computing device, and wherein the value of the key-value pair includes machine data produced by the computing device;
extract, from the value of the key-value pair, using the key of the key-value pair, the machine data from the payload of the message to obtain extracted machine data;
determine, using the extracted machine data, a timestamp associated with the event;
process the extracted machine data to obtain processed machine data;
generate the event using the processed machine data and the timestamp to obtain a generated event, wherein the generated event includes a portion of the processed machine data and the timestamp; and
output the generated event for storage in a field-searchable data store.

18. The computing system of claim 17, wherein the message includes a token identifier that identifies a token, wherein the at least one processor is further configured to access token event settings for the token based on the token identifier, wherein the token event settings are accessed for handling events provided in messages.

19. A non-transitory computer-readable storage medium comprising computer-executable instructions stored thereon, which when executed by one or more processors associated with a component of a data intake and query system, cause the one or more processors to:
receive a message over a network, wherein the message is formatted according to an internet protocol, wherein a payload of the message includes a key-value pair, wherein a key of the key-value pair identifies a value of the key-value pair as recording an event associated with a computing device, and wherein the value of the key-value pair includes machine data produced by the computing device;
extract, from the value of the key-value pair, using the key of the key-value pair, the machine data from the payload of the message to obtain extracted machine data;
determine, using the extracted machine data, a timestamp associated with the event;
process the extracted machine data to obtain processed machine data;
generate the event using the processed machine data and the timestamp to obtain a generated event, wherein the generated event includes a portion of the processed machine data and the timestamp; and
output the generated event for storage in a field-searchable data store.

20. The non-transitory computer-readable storage medium of claim 19, wherein the message includes a token identifier that identifies a token, wherein execution of the computer-executable instructions by the one or more processors further causes the one or more processors to access token event settings for the token based on the token identifier, wherein the token event settings are accessed for handling events provided in messages.

* * * * *